US011119496B1

(12) United States Patent
Ebrahimi Afrouzi et al.

(10) Patent No.: US 11,119,496 B1
(45) Date of Patent: Sep. 14, 2021

(54) METHODS AND SYSTEMS FOR ROBOTIC SURFACE COVERAGE

(71) Applicants: Ali Ebrahimi Afrouzi, San Diego, CA (US); Lukas Fath, York (CA)

(72) Inventors: Ali Ebrahimi Afrouzi, San Diego, CA (US); Lukas Fath, York (CA)

(73) Assignee: AI Incorporated, Toronto (CA)

( * ) Notice: Subject to any disclaimer, the term of this patent is extended or adjusted under 35 U.S.C. 154(b) by 55 days.

(21) Appl. No.: 16/599,169

(22) Filed: Oct. 11, 2019

Related U.S. Application Data

(63) Continuation of application No. 16/198,393, filed on Nov. 21, 2018, now Pat. No. 10,488,865, which is a continuation-in-part of application No. 15/619,449, filed on Jun. 10, 2017, now Pat. No. 10,343,280, which is a continuation of application No. 14/817,952, filed on Aug. 4, 2015, now Pat. No. 9,701,020.

(60) Provisional application No. 62/092,800, filed on Dec. 16, 2014, provisional application No. 62/644,708, filed on Mar. 19, 2018, provisional application No. 62/658,705, filed on Apr. 17, 2018, provisional application No. 62/666,266, filed on May 3, 2018, provisional application No. 62/590,205, filed on Nov. 22, 2017.

(51) Int. Cl.
*G05D 1/00* (2006.01)
*G05D 1/02* (2020.01)

(52) U.S. Cl.
CPC ......... *G05D 1/0219* (2013.01); *G05D 1/0217* (2013.01); *G05D 1/0274* (2013.01); *G05D 2201/0203* (2013.01); *Y10S 901/01* (2013.01)

(58) Field of Classification Search
USPC ............. 700/245–264; 701/23–26, 400–411
See application file for complete search history.

(56) References Cited

U.S. PATENT DOCUMENTS 6,236,365 B1 * 5/2001 LeBlanc ............. G01C 21/206
342/457
8,930,023 B2 * 1/2015 Gutmann ............... B25J 9/1694
700/258

(Continued)

OTHER PUBLICATIONS

Kleiner et al., "A Solution to Room-by-Room Coverage for Autonomous Cleaning Robots", 2017 IEEE/RSJ International Conference on Intelligent Robots and Systems (IROS), Sep. 2017, pp. 5347 to 5352.

*Primary Examiner* — Jonathan L Sample

(57) ABSTRACT

Some aspects include a method including: generating, with a processor of the robot, a map of the workspace; segmenting, with the processor of the robot, the map into a plurality of zones; transmitting, with the processor of the robot, the map to an application of a communication device; receiving, with the application, the map; displaying, with the application, the map; receiving, with the application, at least one input for the map; implementing, with the application, the at least one input into the map to generate an updated map of the workspace; transmitting, with the application, the updated map to the processor of the robot; receiving, with the processor of the robot, the updated map; generating, with the processor of the robot, a movement path based on the map or the updated map; and actuating, with the processor of the robot, the robot to traverse the movement path.

19 Claims, 28 Drawing Sheets

(56) References Cited

U.S. PATENT DOCUMENTS

| | | | | |
|---|---|---|---|---|
| 9,250,081 B2* | 2/2016 | Gutmann | | G01C 21/12 |
| 9,323,250 B2* | 4/2016 | Wang | | B25J 11/009 |
| 9,360,300 B2* | 6/2016 | DiBernado | | G05D 1/0234 |
| 9,375,847 B2* | 6/2016 | Angle | | G05D 1/0022 |
| 2004/0117079 A1* | 6/2004 | Hulden | | G05D 1/0219 |
| | | | | 701/23 |
| 2005/0159879 A1 | 7/2005 | Graeve et al. | | |
| 2005/0213082 A1* | 9/2005 | DiBernardo | | G01S 17/06 |
| | | | | 356/139.03 |
| 2006/0061478 A1* | 3/2006 | Kim | | G08B 25/10 |
| | | | | 340/628 |
| 2007/0096676 A1* | 5/2007 | Im | | G05D 1/0242 |
| | | | | 318/587 |
| 2007/0213892 A1* | 9/2007 | Jones | | G05D 1/0227 |
| | | | | 701/23 |
| 2007/0271011 A1* | 11/2007 | Lee | | G05D 1/028 |
| | | | | 700/245 |
| 2007/0285041 A1* | 12/2007 | Jones | | G05D 1/0227 |
| | | | | 318/568.12 |
| 2009/0055020 A1* | 2/2009 | Jeong | | G05D 1/0272 |
| | | | | 700/251 |
| 2009/0082879 A1* | 3/2009 | Dooley | | B25J 9/0084 |
| | | | | 700/3 |
| 2009/0149990 A1* | 6/2009 | Myeong | | G05D 1/0274 |
| | | | | 700/245 |
| 2009/0182464 A1* | 7/2009 | Myeong | | G05D 1/0246 |
| | | | | 701/25 |
| 2010/0049364 A1* | 2/2010 | Landry | | G05D 1/0272 |
| | | | | 700/245 |
| 2010/0063628 A1* | 3/2010 | Landry | | A47L 11/4011 |
| | | | | 700/258 |
| 2010/0293517 A1 | 11/2010 | Graeve et al. | | |
| 2010/0305752 A1* | 12/2010 | Abramson | | G01S 1/7034 |
| | | | | 700/245 |
| 2011/0153136 A1* | 6/2011 | Anderson | | G05D 1/0219 |
| | | | | 701/25 |
| 2011/0167574 A1* | 7/2011 | Stout | | G05D 1/0219 |
| | | | | 15/3 |
| 2011/0202175 A1* | 8/2011 | Romanov | | B25J 5/00 |
| | | | | 700/250 |
| 2012/0221237 A1* | 8/2012 | Jung | | G05D 1/0274 |
| | | | | 701/400 |
| 2012/0223216 A1* | 9/2012 | Flaherty | | A61L 2/10 |
| | | | | 250/214.1 |
| 2013/0006419 A1* | 1/2013 | Bergstrom | | A01D 34/008 |
| | | | | 700/245 |
| 2013/0040648 A1* | 2/2013 | Yang | | H04W 16/18 |
| | | | | 455/446 |
| 2013/0138246 A1* | 5/2013 | Gutmann | | G05D 1/0274 |
| | | | | 700/253 |
| 2013/0218342 A1* | 8/2013 | Teng | | G05D 1/0234 |
| | | | | 700/259 |
| 2013/0288692 A1* | 10/2013 | Dupray | | H04W 76/50 |
| | | | | 455/450 |
| 2014/0100736 A1* | 4/2014 | Kim | | B25J 9/0003 |
| | | | | 701/26 |
| 2014/0243012 A1* | 8/2014 | Wirola | | H04W 16/18 |
| | | | | 455/456.1 |
| 2014/0316636 A1* | 10/2014 | Hong | | G05D 1/0016 |
| | | | | 701/27 |
| 2015/0323934 A1* | 11/2015 | Lin | | G01S 5/02 |
| | | | | 701/26 |
| 2016/0271795 A1* | 9/2016 | Vicenti | | G05D 1/0272 |
| 2018/0164806 A1* | 6/2018 | Pulling | | G06Q 30/0601 |
| 2019/0121361 A1* | 4/2019 | Afrouzi | | G01C 21/30 |

\* cited by examiner

| Session (501) | Zone Division Method (502) | Order of Zones Serviced (503) | Net Rewards (504) |
|---|---|---|---|
| 1 | Random | A,B,D,F,E,H,C,G... | 250 |
| 2 | Largest possible zones | D,B,H,A,G,E,C,F... | 285 |
| 3 | Zones with area equivalent to approximately 3 sq. feet | B,D,A,H,F,C,E,G... | 195 |
| 4 | Zones of approximately equal size | B,A,G,E,C,F,D,H... | 190 |
| 5 | Random | H,F,C,E,B,A,G,D... | 268 |
| 6 | Zones with area less than 3.5 sq. feet | H,F,C,E,B,A,G,D... | 224 |
| 7 | Largest possible zones | D,B,H,E,A,G,C,F... | 292 |

Total Cost: 122

Total Cost: 104

Total Cost: 106

Total Cost: 104

Total Cost: 104

METHODS AND SYSTEMS FOR ROBOTIC SURFACE COVERAGE

CROSS-REFERENCE TO RELATED APPLICATIONS

This application is a Continuation of U.S. Non-Provisional patent application Ser. No. 16/198,393, filed Nov. 21, 2018, which is a Continuation-in-Part of U.S. Non-Provisional patent application Ser. No. 15/619,449, filed Jun. 10, 2017, which claims the benefit of U.S. Provisional Patent Application Nos. 62/644,708, filed Mar. 19, 2018, 62/658,705, filed Apr. 17, 2018, 62/666,266, filed May 3, 2018, and 62/590,205, filed on Nov. 22, 2017, each of which is hereby incorporated by reference. U.S. Non-Provisional patent application Ser. No. 15/619,449, filed Jun. 10, 2017, is a Continuation of U.S. Non-Provisional patent application Ser. No. 14/817,952, filed Aug. 4, 2015, which claims the benefit of U.S. Non-Provisional Provisional Patent Application No. 62/092,800, filed Dec. 16, 2014, each of which is hereby incorporated by reference.

In this patent, certain U.S. patents, U.S. patent applications, or other materials (e.g., articles) have been incorporated by reference. Specifically, U.S. patent application Ser. Nos. 16/048,179, 16/048,185, 16/163,541, 16/163,562, 16/163,508, 62/614,449, 16/051,328, 15/449,660, 62/740,558, 62/618,964, 62/613,005, 62/599,216, 62/573,579, 62/573,598, 62/591,217, 62/573,591, 62/637,185, 62/616,928, 15/614,284, 62/613,005, 62/610,633, 16/185,000, 15/048,827, 15/981,643, 15/986,670, 16/041,286, 15/406,890, 14/673,633, 16/163,530, 62/637,156, 15/272,752, and 15/949,708 as well as U.S. Pat. No. 9,764,472, are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The present disclosure generally relates to programmatic techniques to analyze surface coverage of a workspace by a robotic device.

BACKGROUND

It is often difficult for autonomous cleaning robots to ensure full (e.g., above a specified amount, like 95% or 99%) coverage of a workspace, particularly given time, compute, and power constraints imposed by many commercial use cases. Several efforts have been made to address this challenge. During operation, some traditional surface coverage robotic devices cover (e.g., apply some cleaning treatment, like vacuuming or mopping to) the surface of a workspace by moving over the workspace randomly or some devices follow a particular surface coverage pattern. With random surface coverage, the robotic device will likely reach all areas of the workspace, so long as it is operated long enough. However, such approaches are often inefficient and result in uneven cleaning. Furthermore, overlapping of serviced areas is likely to occur with random coverage.

Robotic cleaning devices may also follow a systematic surface coverage pattern. With systematic surface coverage, the robotic device follows a predetermined (e.g., hand-coded without contextual logic) pattern of movement, such as crossing the floor in parallel rows. This approach often provides an even and controlled surface coverage method for the robotic device. However, since systematic paths are predetermined, the structure of the pattern may not be able to adapt to different workspaces and may therefore be too rigid to cover all areas of the workspace without, for example, repeat coverage of areas or increased coverage time.

Additional attempts to improve surface coverage efficiency may involve complex mapping systems requiring expensive technology, including additional sensors, image processors, advanced processors, GPS etc. for monitoring covered surfaces of the workspace to, for example, ensure all areas are reached by the robotic device in a timely manner and avoid repeat coverage of areas. In those instances, acquisition and maintenance costs may be prohibitive. A need exists for a more economical and practical solution to reduce or eliminate surface coverage redundancy and improve surface coverage efficiency of a workspace. As such, methods and systems for surface coverage of a workspace by a robotic device are presented herein. None of the preceding should be read as a disclaimer of subject matter, which is not to suggest than any other discussion of design tradeoffs herein is such a disclaimer.

SUMMARY

The following is a non-exhaustive listing of some aspects of the present techniques. These and other aspects are described in the following disclosure.

Some aspects include a system for robotic coverage of a workspace, including: a robot, including: an actuator configured to move the robot in the workspace; at least one sensor configured to sense the workspace; a processor configured to at least obtain data from the at least one sensor and control the actuator; and memory communicatively coupled with the processor and storing instructions that when executed by the processor effectuates operations including: capturing, with the at least one sensor, first data indicative of a position of the robot relative to objects within the workspace and second data indicative of movement of the robot; generating or updating, with the processor, a map of the workspace based on at least one of: at least a part of the first data and at least a part of the second data; segmenting, with the processor, the map into a plurality of zones; transmitting, with the processor, the map to an application of a communication device; receiving, with the processor, an updated map of the workspace from the application of the communication device; generating, with the processor, a movement path based on the map or the updated map; and actuating, with the processor, the robot to traverse the movement path; and the application of the communication device, configured to: receive the map from the processor of the robot; display the map; receive at least one input for the map designating at least one of: a new, modification, or deletion of a boundary; a new, modification, or deletion of a zone; a new, modification, or deletion of a no-entry zone; a new, modification, or deletion of a zone name; a new, modification, or deletion of an object; a new, modification, or deletion of a floor type; and a new, modification, or deletion of a debris accumulation level; implement the at least one input into the map to generate the updated map; and transmit the updated map to the processor of the robot.

Some aspects include a method for robotic coverage of a workspace, including: capturing, with at least one sensor of a robot, first data indicative of a position of the robot relative to objects within the workspace and second data indicative of movement of the robot; generating or updating, with a processor of the robot, a map of the workspace based on at least one of: at least a part of the first data and at least a part of the second data; segmenting, with the processor of the robot, the map into a plurality of zones; transmitting, with the processor of the robot, the map to an application of a communication device; receiving, with the application, the map; displaying, with the application, the map; receiving, with the application, at least one input for the map designating at least one of: a new, modification, or deletion of a boundary; a new, modification, or deletion of a zone; a new, modification, or deletion of a no-entry zone; a new, modification, or deletion of a zone name; implementing, with the application, the at least one input into the map to generate an updated map of the workspace; transmitting, with the application, the updated map to the processor of the robot; receiving, with the processor of the robot, the updated map; generating, with the processor of the robot, a movement path based on the map or the updated map; and actuating, with the processor of the robot, the robot to traverse the movement path.

BRIEF DESCRIPTION OF THE DRAWINGS

Non-limiting and non-exhaustive features of the present invention are described with reference to the following figures, wherein like reference numerals refer to like parts throughout the various figures.

FIG. 5 illustrates examples of net rewards received for different surface coverage policies, acted upon by systems embodying features of the present techniques;

DETAILED DESCRIPTION OF SOME EMBODIMENTS

Figure 1A:
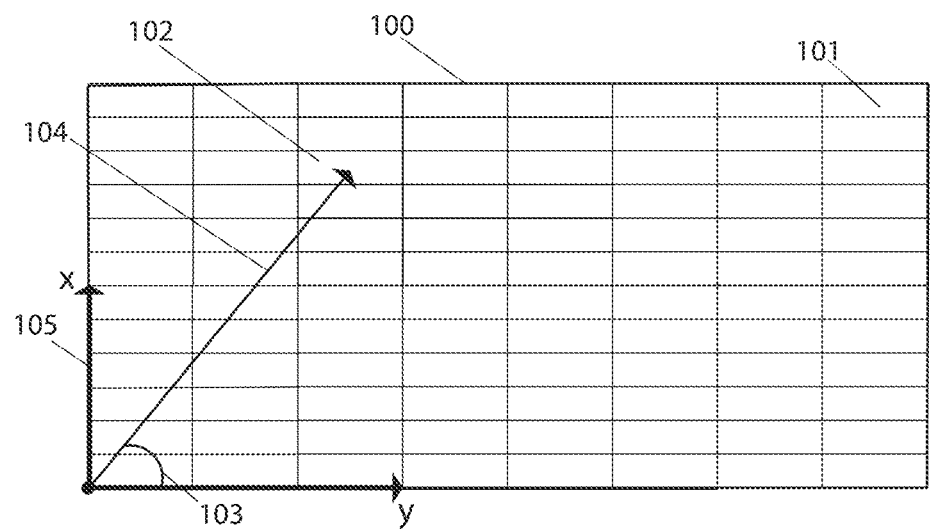
FIGS. 1A and 1B illustrate a coordinate map of a workspace and corresponding workspace matrix, acted upon by systems embodying features of the present techniques.

The present inventions will now be described in detail with reference to a few embodiments thereof as illustrated in the accompanying drawings. In the following description, numerous specific details are set forth in order to provide a thorough understanding of the present invention. It will be apparent, however, to one skilled in the art, that the present inventions may be practiced without some or all of these specific details. In other instances, well known process steps and/or structures have not been described in detail in order to not unnecessarily obscure the present inventions.

Although various methods and techniques are described herein, it should be kept in mind that the present techniques may also be implemented as articles of manufacture that include a computer readable medium (a term which as used herein broadly refers to a single medium storing all instructions or media in use cases where different subsets of instructions are stored on different media) on which computer-readable instructions for carrying out embodiments of the inventive methods or technique are stored. The computer readable medium may include, for example, semiconductor, magnetic, opto-magnetic, optical, or other forms of computer readable medium for storing computer readable code. Further, the inventions may also be embodied as apparatuses. Such apparatus may include circuits, dedicated and/or programmable, to carry out tasks pertaining to embodiments of the invention. Examples of such apparatus may include a specialized computer and/or a dedicated computing device when appropriately programmed and may include a combination of a computer/computing device and dedicated/programmable circuits adapted for the various tasks pertaining to embodiments of the inventions.

In some embodiments, a control system (such as a processor) of a robotic device (which may be on-board, at a docking station, or provided by a remote processor to which the present computational acts are offloaded) may create a map of a workspace comprising a number (e.g., a plurality) of cells for coverage of a workspace by the robotic device. In some embodiments, the map of the workspace may be an ordered list comprising the cells, a matrix comprising the cells as entries, a visual grid map of the cells, or various other types of representation of the cells defining the workspace. In some embodiments, each cell may be defined by an ordered pair wherein a first value represents an angle and a second value represents a distance from an origin of a coordinate system. The map of the workspace may be divided into zones by the control system wherein each zone may be defined by a zone matrix including a portion of the cells of the map as entries. In other instances, each zone may be defined by the control system by an ordered list of its cells, by a visual grid map of its cells, or by any other type of representation of its cells.

In some embodiments, the robotic device may perform a task, such as vacuuming or mopping, on a zone-by-zone basis. The task performed may be the same in each zone or it may be different depending on factors such as the size and shape of the zone or characteristics of the workspace. In some embodiments, a user may instruct the robotic device to perform certain tasks in each of the zones and set a schedule for when tasks are performed. Methods for providing user instructions to a robotic device include those described in U.S. patent application Ser. Nos. 15/272,752 and 15/949,708, the entirety of the contents of which are incorporated herein by reference. For example, a map of a workspace is generated from data acquired by sensors positioned on a robotic floor-cleaning device, the map including free space and obstacles. The map is sent to a user interface on a device such as a smartphone, computer, tablet, dedicated remote control, or any device that may receive and display outputs from the robotic floor-cleaning device and receive inputs from a user. In some cases, a user interface may be provided through a software application on a computer, tablet, smartphone, or a dedicated remote control. Maps may be sent to a user interface at any stage; they do not need to be complete. Through the user interface, a user may view the map and take any of a variety of actions. For instance, a user may make changes to the map boundaries and select settings for the robotic floor-cleaning device to carry out in user-identified areas of the workspace. In some instances, a user may adjust or correct the map boundaries within the user interface by selecting all or part of a boundary line using a cursor, pointer, stylus, mouse, the user's finger, a button or buttons, or other input device on the user interface. Once a boundary line is selected, a user may be provided with various options, such as, but not limited to, deleting, trimming, rotating, elongating, redrawing, moving in a left direction, moving in a right direction, moving in an upward direction, moving in a downward direction, etc. A user may be given the option to redraw a boundary line using a cursor, pointer, stylus, mouse, the user's finger, a button or buttons, or other input devices. In some cases, a user may adjust the map boundaries to keep the robotic device from entering some areas or colliding with obstacles. For example, a map of a workspace shows the obstacles that are detected by the robotic floor-cleaning device. A user may correct the boundary lines to match the actual obstacles. In some instances, the robotic floor-cleaning device may have a plurality of tools that may be used concurrently or independently, such as, but not limited to, a suction tool, a mopping tool, and a UV light for killing bacteria. The robotic floor-cleaning device may also have various settings, such as a deep cleaning setting, a regular cleaning setting, movement pattern settings, cleaning frequency settings, cleaning mode settings, intensity of cleaning settings, navigation settings, driving speed settings, etc. In some cases, a user is enabled to adjust all of these settings through the user interface. A user may select with a cursor, pointer, stylus, mouse, the user's finger, a button or buttons, a keyboard, or other input devices any portion of the workspace and select one or more settings to be applied to the area. A user may select any size area and the area selected may include a small portion of the workspace or may encompass the entire workspace. A user may identify areas within the map to be treated in specific ways by delineating a portion of the map and select settings for that area. For example, a user may delineate four sections of the workspace, the four sections to be serviced in different ways by the robotic floor-cleaning device. The user may select the settings of the robotic floor-cleaning device within each section independently of the other sections using the user interface. In another example, a user may identify an area and select weekly cleaning, as opposed to daily or standard cleaning for that area. In a like manner, a user may an area and turn on a mopping function for that area while the remaining area may be treated in a default manner. In some instances, the user interface may allow a user to instruct the real-time operation of the robotic floor-cleaning device regardless of the device's location within the map. Instructions may include any of turning on or off a mop tool, turning on or off a UV light tool, turning on or off a suction tool, turning on or off an automatic shutoff timer, increasing speed, decreasing speed, driving to a user-identified location, turning in a left or right direction, driving forward, driving backward, stopping movement, commencing one or a series of movement patterns, or any other action. User inputs are sent from the user interface to the robotic floor-cleaning device to implement the changes. Data may be sent between the robotic floor-cleaning device and the user interface through one or more network communication connections, including, but not limited to, radio signals, Wi-Fi signals, and Bluetooth signals.

Methods for setting a schedule of a robotic device include those described in U.S. patent application Ser. Nos. 16/051,328 and 15/449,660, the entirety of the contents of which are incorporated herein by reference. For example, some embodiments provide methods and systems to send scheduling information to a robot regardless of the status of the robot and the position of a docking (or charging) station, the robot, or communication device. In some embodiments, scheduling information may comprise time of operation, area of operation, frequency of operation, type of operation, duration of operation and/or any other information relating to the operation and/or function of the robot. In some embodiments, a user may send scheduling information remotely using a user interface of an application of a communication device via Wi-Fi and is not required to be within the vicinity of the robot or dock. In some embodiments, the user remotely monitors status information, such as the status of the robot or status of the workspace, such as room temperature, using the application of the communication device. Examples of communication devices include an electronic mobile device, smart phone, computer, tablet, or any device that has a Wi-Fi module that may be used to send scheduling information at any time. In some embodiments, the scheduling information is sent to a cloud service via Wi-Fi, to which the dock is connected. The dock is able to retrieve the information from the cloud service. Since the dock is available to receive information, information may be sent generally at any time and does not require the robot to be available. In some embodiments, once the robot is ready to accept the information, the dock may transmit the information to the robot via RF or another type of wireless connection, such as Bluetooth. In some embodiments, the application of the communication device may retrieve information from the cloud service and the docking station may transmit information to the cloud service. In some embodiments, the robot may transmit information to the docking station to transmit to the cloud service. Therefore, in some embodiments the robot, docking station, and application of the communication device may retrieve and transmit information to and from one another. In some embodiments, the robot may be able to retrieve the information from the cloud service and bypass the docking station. In some embodiments, the communication methods described may be used for transmitting and receiving several different types of information, such as scheduling information, mapping information, navigation information, cleaning information, operation information or any other type of information that may be useful to the operator of the communication device, the robot, and/or the docking station. For example, scheduling commands such as time of operation, area(s) of operation, the order in which areas are to be operated on, frequency of operation, type of operation corresponding to each area to be operated on, and duration of operation may be set or adjusted using the user interface of the application of the communication device before being transmitted to the robot. Another example of a type of information that may be transmitted to the robot is a cleaning mode comprising, for example, a service condition, a service type, a service parameter, or a service frequency. Service condition may indicate, for example, whether an area is to be serviced or not. In some embodiments, the robot may determine whether to service an area based on a specified service condition in memory. A service type may indicate, for example, what kind of cleaning is to occur. For example, a hard (e.g. non-absorbent) surface may receive a mopping service (or vacuuming service followed by a mopping service in a service sequence), while a carpeted service may receive a vacuuming service. Other services may include a UV light application service, and a sweeping service. A service parameter may indicate, for example, various settings for the robot. In some embodiments, service parameters may include, a drive speed parameter, a drive direction parameter, a movement pattern parameter, a cleaning intensity parameter, and a timer parameter. Any number of other parameters may be used without departing from embodiments disclosed herein, which is not to suggest that other descriptions are limiting. A service frequency parameter indicates how often an area is to be serviced. In some embodiments, service frequency parameters may include hourly frequency, daily frequency, weekly frequency, and default frequency. A service frequency parameter may be useful when an area is highly used or, conversely, when an area is lightly used. In some embodiments, the docking station may be replaced by any other stationary device capable of transmitting and receiving information to and from the cloud service, and capable of transmitting and receiving information to and from the robot.

In another example, a scheduling method includes monitoring use times of a robot over a preset period of time; storing the times and dates the robot was turned on in a database; devising a suggested work schedule from the stored data; proposing the suggested work schedule to users through an input/output device; accepting user adjustments to the suggested work schedule through the input/output device; adding the user adjustment data to the database for use in devising future work schedules. In some embodiments, inputs from a user and outputs from the robotic floor cleaning device may be provided through a software application installed on an internet-connected device, such as a smartphone, a computer, or a tablet. Examples of the input/output device includes, a dedicated remote control, a smartphone, an interface on the robot, a software interface on a computer, a software interface on a smartphone, and a software interface on a tablet. In some embodiments, the suggested work schedule based on the times in the database includes any of: using a start time that is the mean or median of the start times in the database, using a start time that is the mean or median of a subset of the start times in the database, using a machine learning algorithm to devise a work schedule based on the times in the database.

In some embodiments, the robotic device may include, but is not limited to, a set of wheels, a power source, a chassis, a suspension system, a rechargeable battery, a control module, a control system (such as a processor), and the like. In some embodiments, the robotic device may further include sensors such as imaging devices, sonar devices, LIDAR and LADAR devices, structured light devices, stereo vision devices, cameras, stereo imaging devices, signal detectors and receivers, gyroscope, optical encoder, optical flow sensor, depth sensors and other devices may be used to capture information that the control system of the robotic device may use to map and localize itself. For example, sensors may be used to collect various observations during operation in order to determine the most optimal path for the robotic device when navigating through the workspace, such as the number of collisions, travel time, number of stalls, and travel distance.

In embodiments, the robotic device may generate a map of the workspace as the robotic device navigates through the workspace. In some embodiments, with each working session, the robotic device may generate a new map of the workspace. In some embodiments, the map generated during a working session may be compiled with maps generated during prior working sessions. In some embodiments, compiling maps may generate a comprehensive map including all maps previously generated. In some embodiments, the comprehensive map may include data suggestive of trends in the workspace, such as types of obstacles encountered, locations of obstacles encountered, how often obstacles are encountered, the date and or time obstacles were encountered and the like. Such data may be used in planning a working session or a navigational route. In some embodiments, maps may be three dimensional maps, e.g., indicating the position of walls, furniture, doors, and the like in a room being mapped. In some embodiments, maps may be two dimensional maps, e.g., point clouds or polygons or finite ordered list indicating obstructions at a given height (or range of height, for instance from zero to 5 or 10 centimeters or less) above the floor. Two dimensional maps may be generated from two dimensional data or from three dimensional data where data at a given height above the driving surface is used and data pertaining to higher features are discarded. Maps may be encoded in vector graphic formats, bitmap formats, or other formats. The robotic device may, for example, use the map to autonomously navigate the workspace during operation, e.g., accessing the map to determine that a candidate route is blocked by an obstacle denoted in the map, to select a route with a route-finding algorithm from a current point to a target point, or the like. In some embodiments, the map may be stored in memory for future use. Storage of the map may be in temporary memory such that a stored map is only available during an operational session or in more permanent forms of memory such that the map is available at the next session or startup. In some embodiments, the map is further processed to identify rooms and other segments. In some embodiments, a new map is constructed at each use, or an extant map is updated based on newly acquired data. Some embodiments may reference previous maps during subsequent mapping operations. For example, embodiments may apply Bayesian techniques to simultaneous localization and mapping and update priors in existing maps based on mapping measurements taken in subsequent sessions. Some embodiments may reference previous maps and classify objects in a field of view as being moveable objects or debris upon detecting a difference of greater than a threshold size.

In some embodiments, the memory of the robotic device may include an internal database of obstacles likely to be encountered within the workspace. In some embodiments, an obstacle encountered in the workspace may be identified using various sensors to capture features of the obstacle and the control system may determine the type of obstacle based on the internal database. The control system may note the increased likelihood of that type of obstacle being located in the region of the workspace in which it was encountered. In some embodiments, the control system may mark the location in the map. For example, images sensors of the robotic device continuously capture images, and if the robotic device encounters a wire on the floor, the control system analyzes images of the wire to extract features of the obstacle and compares them with features of obstacles within the internal database to determine that it is a wire. The control system may mark the region in which the wire was encountered within an internal map as a region with increased likelihood of containing a wire. In some embodiments, the control system may further determine if an obstacle may be overcome by the robotic device. For example, the control system may determine if the wire is an obstacle that may be overcome by the robotic device by, for example, driving over the wire. If so, the robotic device may attempt to drive over the obstacle. If, however, the robotic device encounters a large obstacle, such as a chair or table, the control system may determine that it cannot overcome the obstacle and may attempt to maneuver around the obstacle and continue along its path. In some embodiments, regions wherein obstacles are consistently encountered may be classified by the control system as a high obstacle density area and may be marked in the map of the workspace. In some embodiments, the control system may attempt to alter its path to avoid high obstacle density areas. In some embodiments, the control system may alert a user when an unanticipated obstacle blocking the path of the robotic device is encountered, particularly when the robotic device may not overcome the obstacle by maneuvering around or driving over the obstacle. The robotic device may alert the user by generating a noise, sending a message to an application of a communication device paired with the robotic device or any other device paired with the robotic device, displaying a message on a screen of the robotic device, illuminating lights, and the like.

In some embodiments, the robotic device may be controlled to navigate and operate based on historical data, such as success of previously executed navigational routes, obstacles encountered, types of obstacles encountered, types of work surfaces operated on, scheduling information, preferences used in prior working sessions, number of robotic devices operating, battery efficiency, and the like information. For example, the robot may be controlled to prioritize operation in areas of the map with a low likelihood of encountering obstacles. In some embodiments, the robotic device may be controlled or directed to navigate or operate in areas of the workspace based on preferences set in prior working sessions or work surface type. For example, the robotic device may be controlled to operate at a faster driving speed on hard work surface types.

In some embodiments, the robotic device may attempt to make a determination as to whether or not it has visited a work area previously based on, for example, features of a workspace. In some embodiments, a unique characteristic may appear slightly different when identified a second time, and the control system of a robotic device may need to manipulate the data of the unique characteristic captured in order to determine whether or not the characteristic accurately matches what was previously captured when determining whether or not a work area has previously been operated in. In some embodiments, if the control system of the robotic device recognizes an area as having been previously visited, the control system may alter the operations or path of the robotic device. In some embodiments, the robotic device may be ordered to skip operations in a work area. For example, a button on a user interface of the robotic device, or an application of a communications device that is paired with the robotic device may be used to command the control system of the robotic device to skip operations in a given work area. An example of a communications device includes, but is not limited to, a smart phone, smart watch, laptop, tablet, remote control, or the like. In some embodiments, if the robotic device enters a work area, the robotic device may be commanded to leave the work area. In some embodiments, the robotic device may attempt to return to the work area for operations at a later time. In some embodiments, the robotic device may be commanded to execute an action at a particular point in a working session. In some embodiments, a selection may be made as to when a work area is to be operated in based on the number of times a button is pressed commanding the robot to skip a work area. In some embodiments, the robotic device may be commanded to leave an area, where after the robotic device may attempt to operate in the area during a different operational cycle. In some embodiments, the robotic device may store data regarding commands to leave a work area and use this data for future operational cycles. In some embodiments, the robotic device may alter a schedule it has set for recurring services based on commands received to vacate an area. In some embodiments, a command may be set for the robotic device to vacate an area but to return at an unspecified future time. In some embodiments, a command may be set for the robotic device to vacate an area but to return at a specified predetermined time. In some embodiments, if a first robotic device obtains a command to leave a work area, the control system of the first robotic device may communicate with additional robotic devices for the purposes of sharing this data in order to indicate that other robotic devices should not operate in a given area at a particular time or for the purposes of sharing other data. In some embodiments, the control system of the robotic device may use historical data with regards to prior work operations when planning an operational session.

In some embodiments, the control system of the robotic device may fail in a localization capacity and not recognize where it is located in a workspace. In some embodiments, if localization fails, the robotic device may begin a new mapping of the workspace, operating in a new functional and mapping capacity, visiting each work area, such as, each room, and mapping these areas beginning with the work area in which localization first failed. In some embodiments, the failure of localization may include the loss of data pertaining to the location of the robotic device's initial navigational starting point, such as the location of a docking or base station of the robotic device to which the robotic device returns following each work session. In some embodiments, when localization fails the control system of the robotic device may immediately begin to search for the base station. In some embodiments, when localization fails the robotic device may operate and map work areas while simultaneously searching for the base station. In some embodiments, when localization fails the robotic device may complete a work session, mapping the workspace as it does so, and return to each work area after the work session to search for the base station. In some embodiments, the control system of the robotic device may search for the base station by searching for an IR light emitted by a transmitter of the base station to be received by the robotic device which will signal the robotic device to return to the base station. In some embodiments, the control system of the robotic device may search for a base station by rotating in 360 degrees in each work area until a signal from the base station is received by the robotic device. In some embodiments, if the robotic device does not detect a signal from the base station in a work area, the robotic device may automatically navigate to a different work area. In some embodiments, if the robotic device detects a signal from the base station in a work area, the robotic device may automatically cease operations and navigate directly to the base station. In some embodiments, if the robotic device detects a signal from the base station in a work area, the robotic device may navigate to a new work area before navigating back to the base station. In some embodiments, if the base station is detected by the robotic device, and the robotic device thereafter navigates to a new work area, a path plan may be set by the control system for navigating back to the base station. In some embodiments, if a first robotic device's localization fails, a control system of the first robotic device may communicate with a centralized control system, a base station, other devices or control systems of other robotic devices to assist with the control system recovering a localization capacity. For example, if a first robotic device's localization fails, a control system of the first robotic device may send out, for example, a distress signal indicating that it has lost localization, and a control system of a second robotic device, may share data such as maps or other beneficial data with the control system of the first robotic device to assist the with recovering some form of a localization capacity. In an additional example, if the localization capacity of the control system of the robotic device fails, the control system may communicate with a centralized control system, base station, other devices or control systems of other robotic devices to attempt to recover data such as maps or other beneficial data to assist the with recovering some form of a localization capacity. In some embodiments, the signal transmitter used may be an omni-directional signal emitter such as, for example, an IR signal emitter. In some embodiments, the signal transmitter may be located on the robotic device and the signal may be received by the base station. In some embodiments, when localization fails, the robotic device may detect and mark obstacles encountered in the workspace within a new map generated during the operational cycle as the robotic device navigates in the workspace. In some embodiments, features on the base station may be used for the control system of the robotic device to easily distinguish when searching for the base station. For example, unique angles or physical characteristics of a base station may be implemented in memory of the control system to help the control system easily identify the base station. Further, characteristics of a surface of a base station such as printing, painting, patterns, and the like may be used by the control system to easily identify the base station. Methods for instructing a robot to skip a zone and recognize a previously visited zone and for recovering localization are further described in U.S. Patent App. No. 62/740,558, the entirety of the contents of which are incorporated herein by reference.

Initially, values of various variables may be acquired by (e.g., sensed by) the control system and used by the control system to divide the workspace into zones, such as the strength of a wireless signal (such as WI-FI™ or other radio frequency (RF) signal), or the location of doors. For example, a door may be indicated in such signals and cause embodiments of the control system to divide an area into two zones, one on either side of the door. In some embodiments, division of the workspace into zones by the control system may be (partially or entirely) arbitrary or may depend on the layout of the workspace, where, for example, furniture of the workspace may be sensed by embodiments of the control system and cause those embodiments to divide the workspace, or the workspace may be divided into zones based on various other logic.

The zones of the workspace may be ordered by the control system of the robotic device for surface coverage, and the robotic device may be actuated by the control system to cover the surface of each zone in the resulting sequential order. Initially, zones may be ordered, for example, arbitrarily or according to their size or based on the current position of the robotic device and/or the position of the zones relative to one another or by using various other types of measure or logic. The control system of the robotic device may use various devices to record the actual surface covered by the robot for each zone, such as an optical encoder, gyroscope, structure from motion, odometer, or any other device capable of tracking movement of the robotic device to determine which cells of the workspace the robotic device has covered. A coverage matrix of a zone corresponding to the zone matrix may be updated by the control system to indicate actual surface coverage.

For a given zone, in some embodiments, each entry of its coverage matrix corresponds to an entry of its zone matrix and hence a cell of the workspace. When a cell of a workspace is covered by the robotic device, the value of the corresponding entry in the coverage matrix may be updated by the control system to indicate coverage. For example, each time a cell of a zone is covered, the value of the corresponding entry in the coverage matrix of the zone may be increased by one, with all entries beginning with a value of zero to indicate no coverage. (Or values may be decremented by some amount in systems in which reversed signs convey the sematic equivalent to that described herein—a qualification that applies generally to this document, e.g., discussion of maximizing a reward function should be read as indicating the inventors also contemplate minimizing a cost function). In some embodiments, a reward may be computed and assigned to a policy by the control system based on performance of surface coverage of the workspace by the robotic device. In some embodiments, the policy may comprise the zones created, the order in which they were covered, and the coverage path (i.e., it may comprise data describing these things). In some embodiments, the policy may comprise a collection of states and actions experienced by the robotic device during surface coverage of the workspace as a result of the zones created, the order in which they were covered and coverage path. In embodiments, the reward may be based on actual surface coverage, repeat coverage, total coverage time, travel distance between zones etc. In embodiments, the process may be iteratively repeated to determine the policy that maximizes the reward. In some embodiments, coverage of the workspace by the robotic device may continue until the control system determines that each cell of the workspace is covered at least once.

Figure 1B:
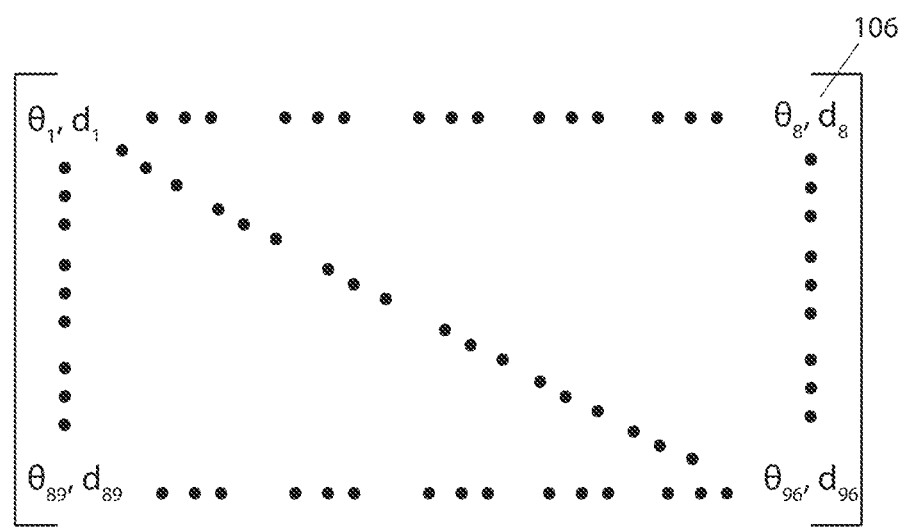

In some embodiments, the control system of a robotic device may create a coordinate map of the workspace comprising a number of cells. FIG. 1A illustrates a visual representation of coordinate map 100 of a workspace wherein each rectangular division 101 represents a cell of the map. The term "map" as used herein does not require a visual representation and is used more broadly to refer to a data structure that encodes a description of two or higher dimensional spatial attributes of an area. A regular rectangular tiling subdivision is depicted, but other forms are contemplated, such as regular or irregular hexagonal tilings or subdivision by space filing curves, like Hilbert curves or Morton curves. Each cell may be defined by an ordered pair (e.g., a vector with two dimensions) wherein the first value is an angle and the second value is a distance from an origin of a coordinate system (e.g., a polar coordinate). For example, cell 102 may be identified by the control system of the robotic device by an ordered pair comprising angle 103 and distance 104 with respect to coordinate system 105. In some embodiments, the map of the workspace may be represented by (e.g., encoded as), for example, an ordered list or matrix comprising the cells of the workspace as entries. For example, coordinate map 100 of the workspace, comprising 96 cells, may be represented by a workspace matrix. Assuming cells of coordinate map 100 of the workspace are numbered in order beginning with the top left-hand corner cell as cell number one and moving across rows from left to right, a workspace matrix such as that illustrated in FIG. 1B may be used by the control system (e.g., in program state of a process implementing some embodiments) to represent the workspace wherein subscripts represent the cell number. Each entry of the matrix corresponds to a cell of the workspace illustrated in FIG. 1A, and each cell in an entry of the matrix is defined by an angle θ and distance d from an origin of coordinate system 105 by the control system. For example, rectangular division 101 is cell number eight and corresponds to entry 106 of the workspace matrix in FIG. 1B. Any workspace embodiment may therefore be represented by the control system using an N×M matrix with each ordered pair of a cell used as an entry of the matrix. In some cases, cells are arranged in the matrix according to their relative position in the workspace, e.g., the left-most cell of a given row may be in the first column, and the right-most cell may be in a right-most column, or embodiments of the control system may arrange the cells in the matrix without regard to relative position in the area by encoding spatial coordinates in the value of the matrix (e.g., in a four or higher dimensional matrix in which one slice corresponds to the layer depicted).

The control system of the robotic device may divide the workspace into zones based on a variable or factor that the control system of the robotic device determines is most efficient for the workspace or based on a predetermined variable or factor. Zones may include multiple cells, e.g., spatially contiguous sets of multiple cells. For example, initially the control system may divide the workspace into zones using the strength of a wireless signal, such as WI-FI or other forms of RF. In some instances, initial division of the workspace into zones may depend on the location of doors. For example, a door may indicate a division of an area into two zones, one on either side of the door. An example of a door detection method for a robotic device may be found in U.S. Patent App. Nos. 62/616,928, 62/613,005, and Ser. No. 15/614,284, the contents of which are hereby incorporated by reference. For example, data points from a depth sensor are fitted to a line model and any deviation from the line model are identified as an opening in the wall by the control system. Similar to the line model method described above, in some embodiments a wall or opening in the wall is detected by the control using recursive line fitting of the data. In another example, the control system uses entropy to predict an opening in the wall, as an opening in the wall results in disordered measurement data and hence larger entropy value. When the entropy surpasses a certain threshold, it may be assumed to be an opening in the wall. In some cases, a probabilistic method is applied by pre-training the control system of the robot with a classifier to provide a priori prediction of a door. In some instances, Bayes Theorem is used by the control system to provide probability of an opening in the wall given that the robot is located near an opening in the wall, $$P(A|B) = \frac{P(B|A)P(A)}{P(B)}.$$

P(A|B) is the probability of an opening in the wall given that the robot is located close to an opening in the wall, P(A) is the probability of an opening in the wall, P(B) is the probability of the robot being located close to an opening in the wall and P(B|A) is the probability of the robot being located close to an opening the wall given that an opening in the wall is detected. In some embodiments, division of the workspace by the control system of the robotic device may be arbitrary or may depend on the layout of the workspace, where, for example, furniture of the workspace may be considered a divider of the workspace, or the workspace may be divided based on various other logic.

Figure 2A:
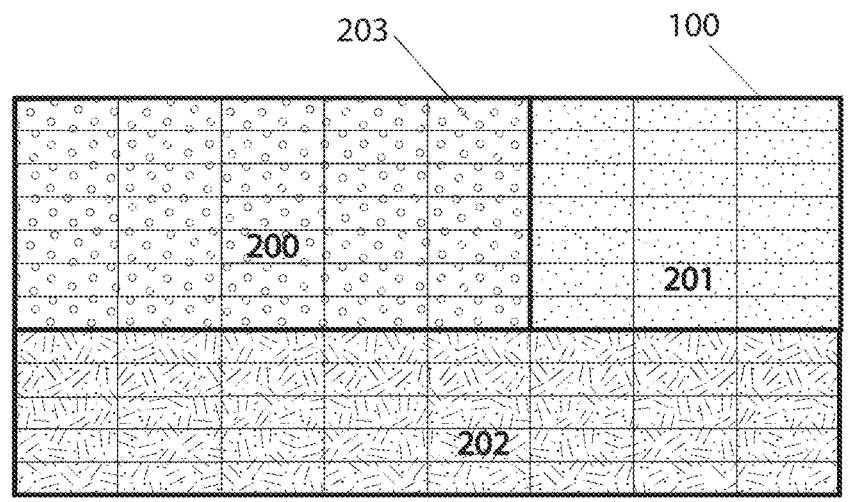
FIGS. 2A-2C illustrate zones of a workspace and corresponding zone and coverage matrices, acted upon by systems embodying features of the present techniques.
Figure 2B:
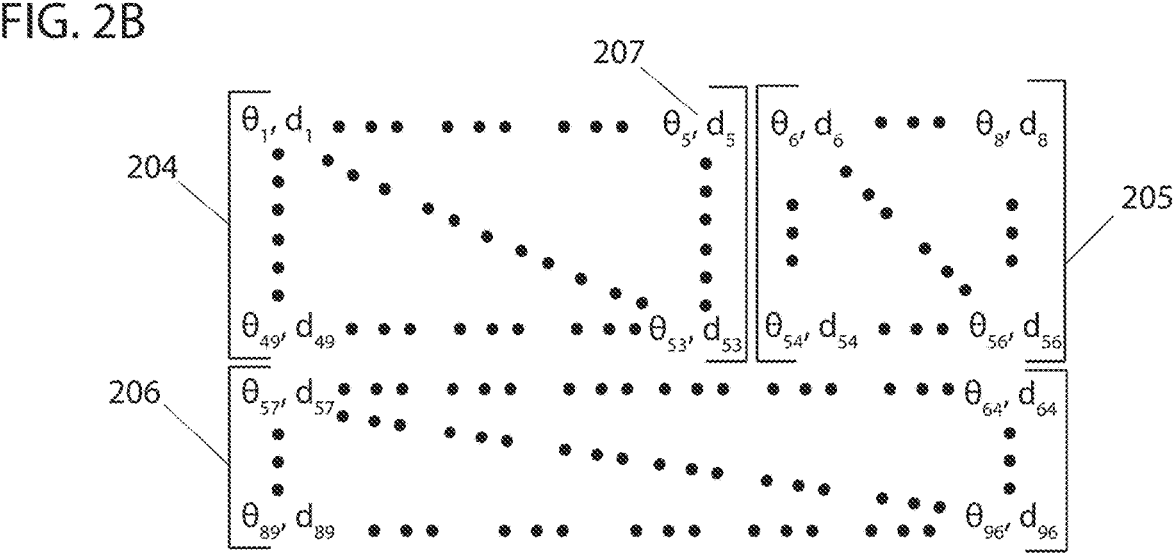

A zone may comprise a portion of the cells constituting the workspace, which may be represented by the control system as a set of entries or using a n×m matrix wherein n⊆N, m⊆M, and therefore n×m⊆N×M. For example, FIG. 2A illustrates a visual representation of coordinate map 100 of a workspace divided into rectangular zones 200, 201 and 202 by the control system. Each zone is defined by a spatially contiguous subset of the cells of the workspace. For example, zone 200 is defined by all cells with the same pattern as cell 203 within zone 200. FIG. 2B illustrates zone matrices 204, 205, and 206 corresponding to zones 200, 201, and 202, respectively. Each entry of the zone matrix of a zone corresponds to a cell of the workspace wherein entries of each zone matrix are a portion of the entries of the workspace matrix. For example, all entries of zone matrix 204 correspond to cells with the same pattern as cell 203 within zone 200 and thus comprise the portion of the entries of the workspace matrix of FIG. 1B corresponding to those cells. For example, cell 203 of zone 200 (cell number five of the workspace) corresponds with entry 207 of corresponding zone matrix 204. Together zone matrices 204, 205, and 206 form the workspace matrix illustrated in FIG. 1B. In some instances, the combination of all zones created by the control system of the robotic device may only comprise a portion of the workspace.

The control system of the robotic device, in some embodiments, may order zones 200, 201, and 202 for surface coverage. The initial order of zones by the control system may be arbitrary or may be dependent on the size of the zones or may be dependent on the current position of the robotic device and/or the position of the zones relative to one another or may be chosen based on any other measure or logic. The robotic device may be actuated by the control system to cover, in order, the surface of each zone. In some embodiments, the robot may cover an area at a given position that is less than the size of the zone, e.g., less than the size of a cell, and the robot may cover the zone by moving over a coverage path so that different parts of the zone are covered at different times. The control system of the robotic device may record, for each zone, the actual surface covered, e.g., by integrating an area produced by convolving a shape region cleaned by the robot at a given position with a path of the robot. In embodiments, the expected surface coverage of a zone may be estimated by the control system by determining the approximate area of the zone in the coordinate map. The actual surface coverage may be measured through dead reckoning, odometry, structure from motion, gyroscope or by any other method capable of tracking movement of the robotic device.

In some embodiments, the control system of the robotic device may update, for each zone, a coverage matrix of the zone corresponding to the zone matrix of the zone as (or after, with each iteration of coverage) the robotic device covers the zone surface. In embodiments, each entry of the coverage matrix corresponds to an entry of the zone matrix, positioned in the same row and column. Since each entry in the coverage matrix of a zone corresponds to an entry in the zone matrix of a zone, both matrices have the same dimensions in some embodiments. It should be emphasized that a data structure need not be labeled as a "matrix" in program code to constitute a matrix, and that matrices may be encoded in a variety of formats, including as an array of arrays, as an array of objects in an object oriented programming language, as a table in a relational database, or as entries in a key-value store, provided that the entries preserve the information encoded in a matrix, e.g., ordering of a collection of values in two or more dimensions. When a cell of a zone is covered by the robotic device, the entry of the coverage matrix corresponding to the entry of the zone matrix comprising the cell covered may be updated by the control system of the robotic device. Thus, a current entry may reflect multiple instances in which a zone was covered in the past. In some embodiments, all entries of the coverage matrix of a zone may initially have a value of zero, and an entry in the coverage matrix may be updated by a value of one (e.g., incremented) by the control system each time a cell contained in the corresponding entry of the zone matrix is covered. In some cases, values are updated by the same increment or decrement, or in some cases, values may be updated by amounts that vary, e.g., responsive to a duration of time that the robot spends in the corresponding area. As noted, updating may include incrementing, decrementing, appending, or otherwise modifying an extant value such that information reflecting multiple instances of coverage is reflected in the value after those instances occur. In some cases, the values updated are ordinal, cardinal, or nominal values. In some cases, the values are a single value, or in some cases, the values are a larger data structure, like a list of binary values with a 1 or 0 appended each time the zone is covered depending on whether the corresponding cell was covered.

Figure 2C:
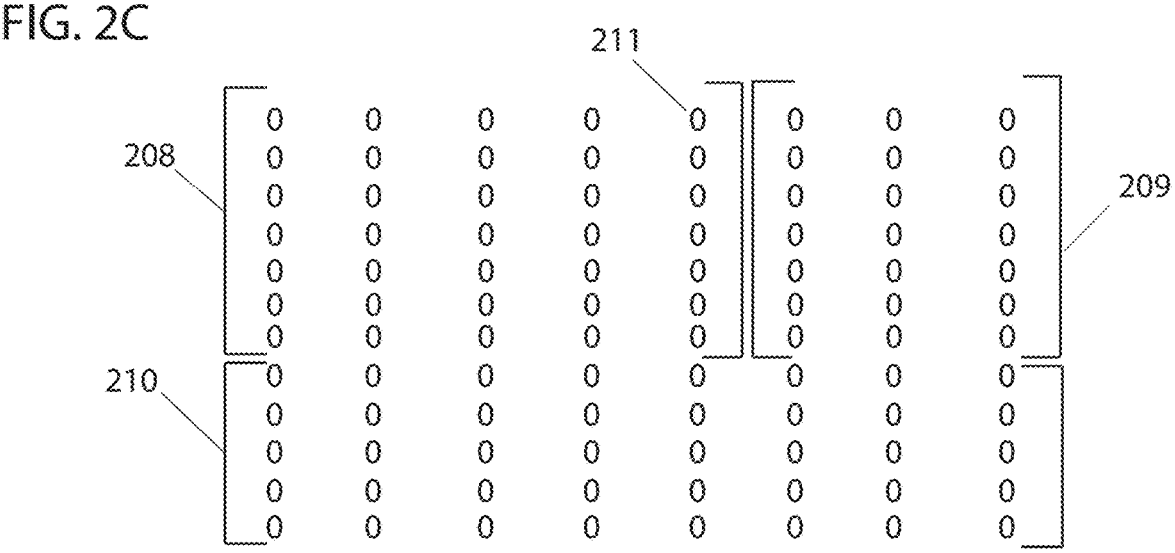

In some embodiments, some entries of the coverage matrix may initially have a specified value that indicates occupancy of the cell if (e.g., in response to embodiments determining that), for example, the corresponding cell of the workspace is occupied by an object, such as a piece of furniture. FIG. 2C illustrates coverage matrices 208, 209, and 210 corresponding to zone matrices 204, 205, and 206, respectively, with each matching pair of matrices having the same dimensions. Since each entry in a zone matrix corresponds to the same entry in a coverage matrix, entry 207 of zone matrix 204 corresponds to entry 211 of coverage matrix 208. Initially all entries have a value of zero to indicate no coverage. However, as the robotic device covers cells in entries of zone matrices 204, 205, and 206, the value of corresponding entries in coverage matrices 208, 209, and 210 are increased by a value of one by the control system each time a corresponding cell is covered. For example, when cell 203 in entry 207 of zone matrix 204 is covered by the robotic device, the value of entry 211 in the same row and column of corresponding coverage matrix 208 is updated by the control system to a value of one to indicate coverage of the cell one time. In embodiments, the entry of the zone matrix corresponding to the entry of the coverage matrix of a zone need not be in the same row and column.

Figure 3A:
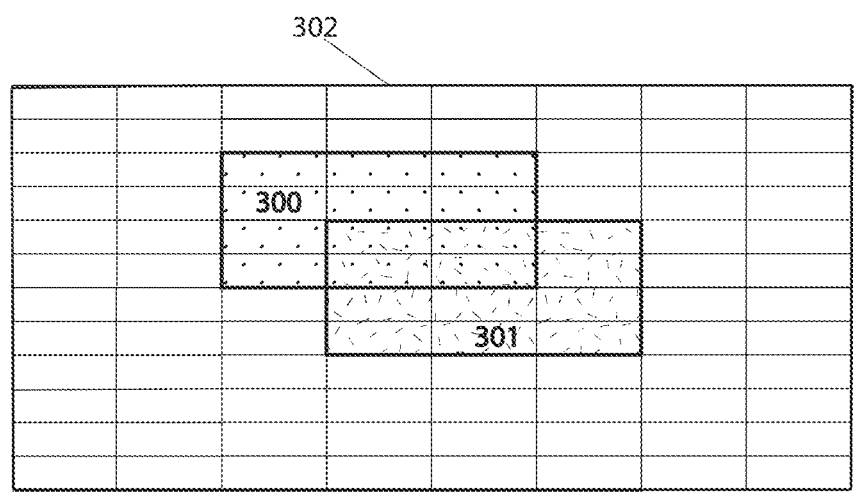
FIGS. 3A-3D illustrate zones of a workspace and corresponding zone and coverage matrices, acted upon by systems embodying features of the present techniques.
Figure 3B:
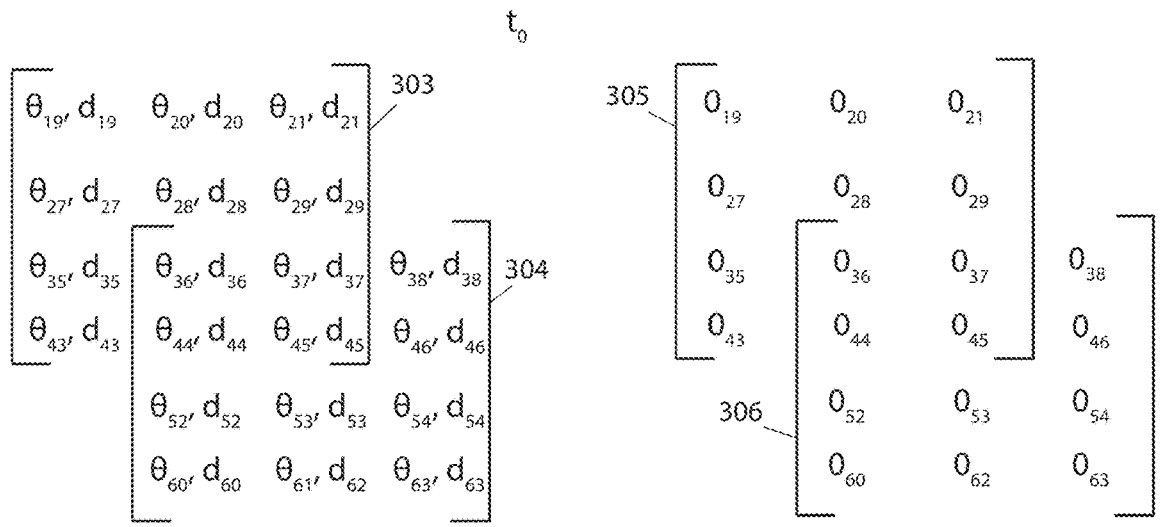
Figure 3C:
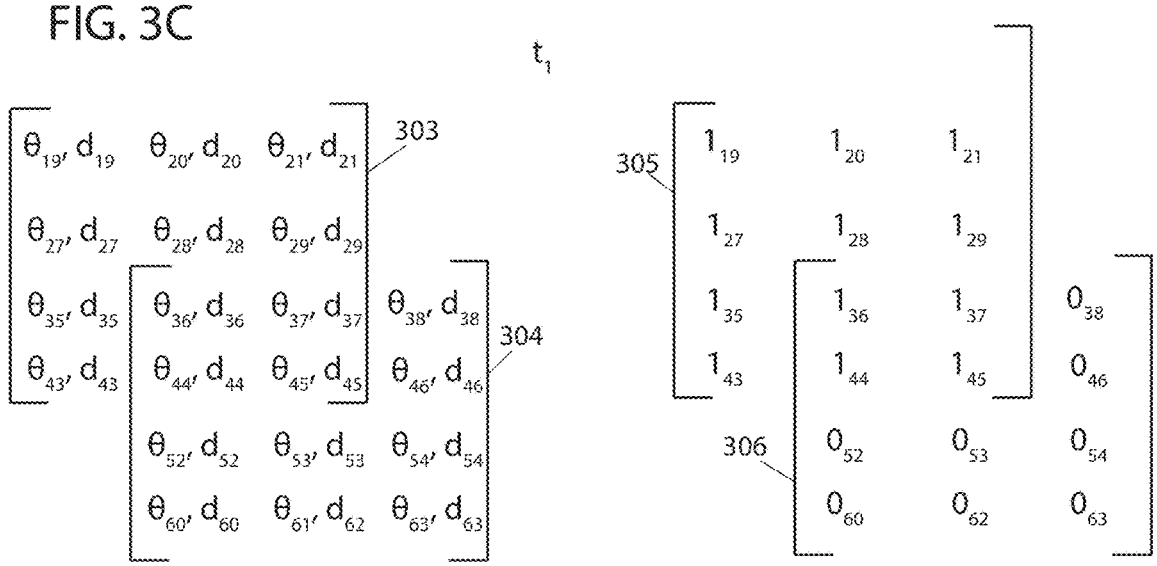
Figure 3D:
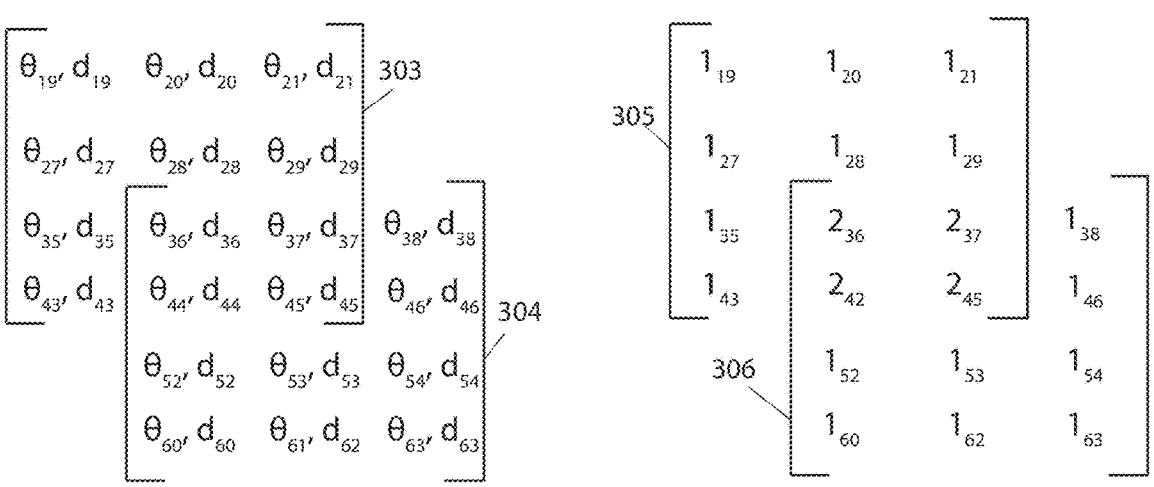

As a further example, FIG. 3A illustrates zones 300 and 301 of workspace coordinate map 302 processed by a robotic device. In the illustrated labeling schema, cells of coordinate map 302 of the workspace are numbered in order beginning with the top left-hand corner cell as cell number one and rastering across rows from left to right, top to bottom. Zone matrices 303 and 304 illustrated in FIG. 3B may be created and used by a control system of the robotic device to represent zones 300 and 301 of the workspace, wherein subscripts represent the cell number. Since some cells of zones 300 and 301 overlap, corresponding entries of zone matrices 303 and 304 of those cells overlap as well. FIG. 3B also illustrates corresponding coverage matrices 305 of zone 300 and 306 of zone 301. Coverage matrices are of the same dimension as corresponding zone matrices as each entry of the zone matrix has a corresponding entry in the coverage matrix of a zone. Each entry in the zone matrix of a zone represents a cell within the coordinate map of the workspace and each corresponding entry in the coverage matrix represents the number of times the corresponding cell has been covered. Initially at time $t_0$, all entries in both coverage matrices 305 and 306 are zero as no cells of zones 300 and 301 have been covered. Once a cell within a zone is covered by the robotic device, the control system of the robotic device may identify the cell as covered and update the value of the corresponding entry in the coverage matrix by a value of one, indicating coverage of that cell one time. As the robotic device covers the cells of zone 300, entries in coverage matrix 304 corresponding to entries in zone matrix 303 comprising the cells of the zone are updated by the control system, each entry in coverage matrix 305 being increased by a value of one (or some other increment) each time the cell contained in the corresponding entry of zone matrix 303 is covered. After complete coverage of zone 300 at a time $t_1$, in some embodiments, all entries of coverage matrix 305 have a value of one as illustrated in FIG. 3B, assuming each cell of zone 300 was covered one time. Since zone 301 overlaps with zone 300, a portion of the cells of zone 301 were covered during surface coverage of zone 300. As such, a portion of entries of coverage matrix 306 corresponding to cells of zone 301 overlapping with zone 300 have a value of one although zone 301 has yet to be covered. After surface coverage of zone 300, the robotic device moves on to cover the surface of zone 301 overlapping zone 300. Assuming zone 301 is completely covered at a time $t_2$ wherein each cell of zone 301 is covered once, coverage matrices 305 and 306 are updated by the control system as shown in FIG. 3C. Repeat coverage in the overlapping areas between zones 300 and 301 is reflected in coverage matrices 305 and 306, as entries in coverage matrices 305 and 306 corresponding to overlapping cells between zones 300 and 301 have a value of two, indicating that coverage of those particular cells occurred twice. In practice, the first zone covered yields an ideal coverage matrix, assuming all cells of the zone are covered once, as overlap between zones has not yet occurred as there is only one zone that has yet been covered at that point. However, as time goes on, overlap between zones becomes increasingly likely resulting in repeat coverage of cells. This is undesirable as repeat coverage is redundant and, thus, reduces coverage efficiency. Methods for eliminating or reducing such redundancies are discussed further below. In certain instances, repeat coverage of some cells may be desired when, for example, certain areas of the workspace require thorough cleaning by a robotic device.

In some embodiments, a work session of a robotic device may be determined by embodiments to be complete when all (or greater than a threshold amount) of the values of the coverage matrices representing zones of the workspace are nonzero. In some instances, a work session may be determined to be complete when a percentage of cells of the workspace are covered or when certain preselected cells have been covered. In response to the determination, cleaning of the current zone may be ceased, and the robot may move to a next zone in the ordered list of zones. In some cases, values of the matrices are reset to an initial value (e.g., of zero) each time the zone is cleaned, or the values may be resent less often, e.g., only once at initialization, weekly, yearly, every 10 sessions, or the like.

In some embodiments, the control system of the robotic device may compute a reward (e.g., an aggregate score, like an ordinal or cardinal value) based on surface coverage of the workspace and may assign the reward to a policy. In some embodiments, the policy may comprise (e.g., by having a copy of, or the same instance as discussed above of) the zones created (e.g. size, shape, location), the order in which they were covered and coverage path. In some embodiments, the policy may comprise a collection of states and actions (or stimuli) experienced (e.g., sensed) by the robotic device during surface coverage (e.g., associated with a location being covered) of the workspace as a result of the zones created, the order in which they were covered and coverage path.

In embodiments, the reward may be computed by embodiments based on actual surface coverage, repeat coverage, total coverage time, travel distance between zones etc., such as weighted combinations thereof. For example, a policy resulting in actual surface coverage equal to the expected surface coverage of the workspace may be assigned a greater reward by the control system of the robotic device than a policy resulting in an actual surface coverage that was only half of the expected surface coverage of the workspace. For instance, some embodiments may multiply each value greater than 1 by −1 and, then, compute a measure of central tendency (e.g., a mean, mode, or median) of a coverage matrix as a reward score. As a further example, a policy resulting in repeat coverage of many cells of the workspace may be assigned a smaller reward by the control system than a policy resulting in minimal repeat coverage of cells. In instances where travel distance between sequentially ordered zones is considered by the control system in computing the reward, the reward computed may be dependent on the difference between the actual distance traveled by the robotic device to move between sequential zones and the shortest possible distance between zones as calculated by the control system of the robotic device using the coordinate map of the workspace. Algorithms such as A* algorithm may be used by the control system to find the shortest path from a point A in one zone to a point B in another zone to minimize redundancy. In embodiments, the total work session time may also be considered by the control system of the robotic device in determining the reward wherein coverage of the workspace in less time may result in a greater reward. In embodiments, several factors such as those described above may be considered collectively in determining the reward. Some factors may have greater weight in determining the value of the reward. In some cases, the reward function is an objective function that embodiments optimize by adjusting the policies, e.g., with a greedy optimization that adjusts the zones or their sequence.

In embodiments, the method of surface coverage by a robotic device described herein may be iteratively repeated with adjustments to the policy at each iteration to determine the policy that maximizes (e.g., locally or globally) the reward and thereby minimizes redundancy of surface coverage (assuming that is the dominant metric in the objective function). A variety of techniques may be used to determine the adjustments. Some embodiments may model the workspace with a differentiable function and execute a gradient descent on the objective function as applied to the model. In many cases, such a model is non-differentiable or not available, in which cases, some embodiments may apply other techniques to optimize the policy. For instance, some embodiments may execute a Baysean optimization or other form of derivative-free optimization that does not require a differentiable function, like genetic algorithms, random search, or simulated annealing. In some cases, optimization may be offloaded (by conveying the policies and coverage matrices) to a remote cloud-based computing system, which may return optimized or improved policies.

Figure 4A:
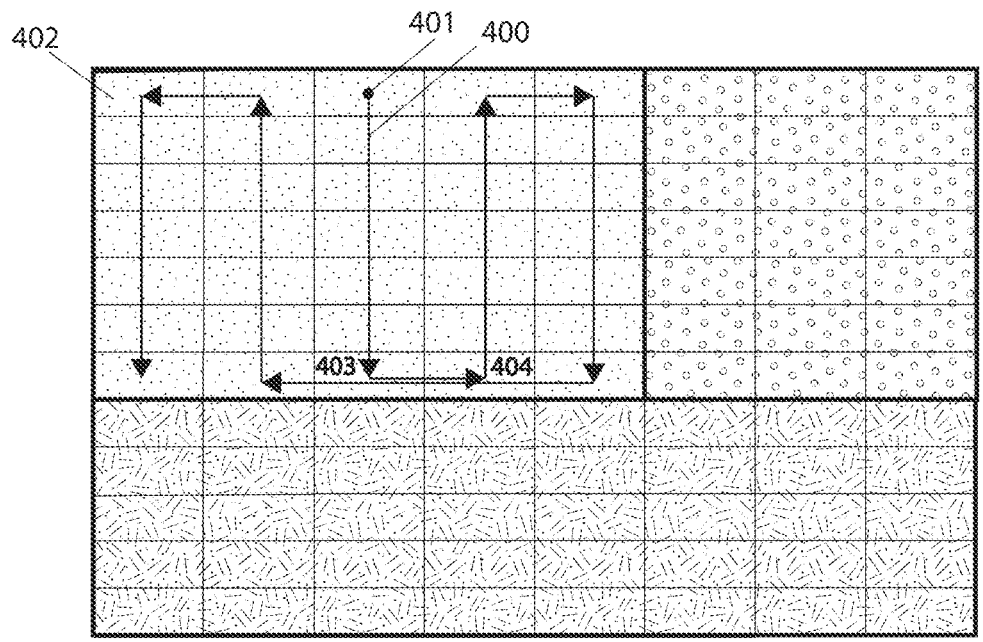
FIGS. 4A and 4B illustrate examples of redundancies that may occur during surface coverage of a workspace.
Figure 4B:
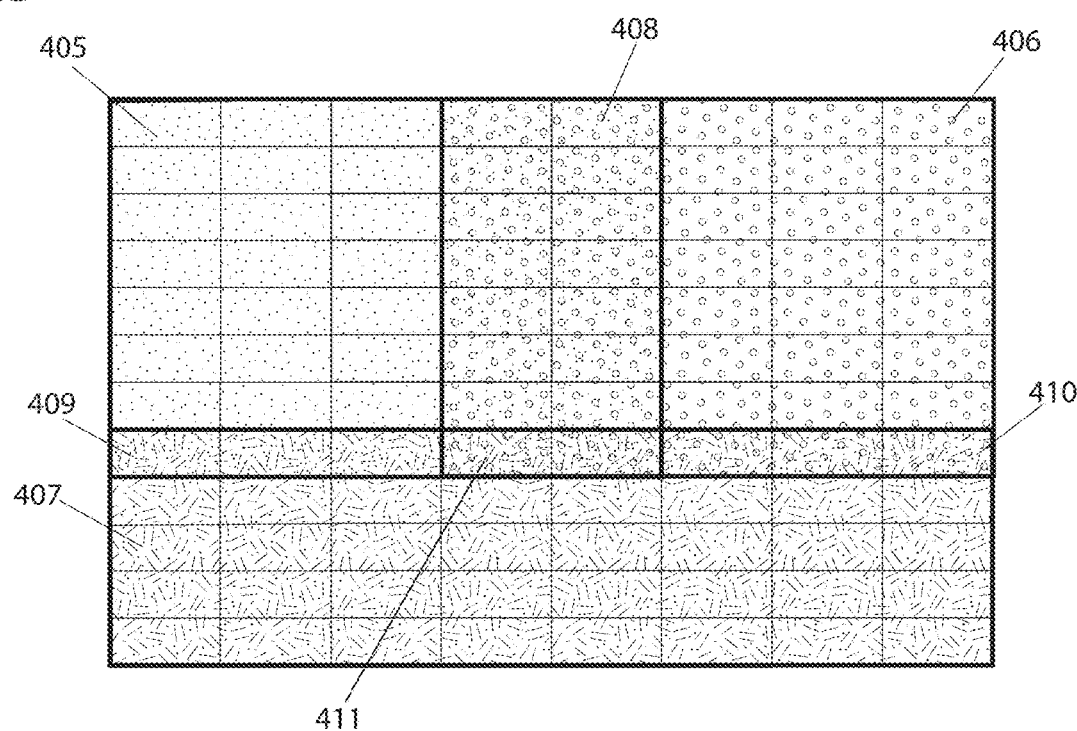

During operation, several types of redundancy may occur during surface coverage of a workspace by a robotic device. In some cases, coverage paths are determined that, within a zone, raster from one side to another, circle from a perimeter inward, or a combination thereof. For example, during surface coverage of a zone, the coverage path of the robotic device may overlap. FIG. 4A illustrates this embodiment, wherein coverage path 400 of a robotic device beginning at point 401 of zone 402 is shown. Overlap of the coverage path occurs at cells 403 and 404. This overlap results in redundancy as unnecessary repeat coverage of cells 403 and 404 of the workspace occurs due to overlapping of coverage path 400. Redundancy may also be encountered due to overlap between zones resulting in repeat coverage of cells within the overlapping area of the overlapping zones. FIG. 4B illustrates overlapping zones 405, 406, and 407. Cells within overlapping area 408 of overlapping zones 405 and 406 may be redundantly covered twice, once during coverage of zone 405 and again during coverage of zone 406. Similarly, cells within overlapping area 409 of overlapping zones 405 and 407 and overlapping area 410 of overlapping zones 406 and 407 may be covered twice. Cells within overlapping area 411 of overlapping zones 405, 406, and 407 may be covered three times, once during coverage of zone 406 and twice more during coverage of zones 406 and 407. Redundancy during surface coverage of a workspace may also occur when the robotic device is traveling between sequentially ordered zones for surface coverage wherein for example, the robotic device executes a travel path between two zones that is significantly longer than the shortest path between the zones.

Accordingly, in some embodiments, the control system of the robotic device may optimize surface coverage of a workspace by finding (e.g., searching within a parameter space of alternatives with various strategies described herein) the policy that maximizes the reward, e.g., using a Markov Decision Process (MDP) that includes states (e.g., which cell or zone is being processed), actions (e.g., which cell or zone to transition to next), and rewards. During operation, in some embodiments, the robotic device executes a chosen coverage path covering the surface of chosen zones in a chosen sequential order (e.g., as reflected in a current iteration of a policy), during which the robotic device may be considered to be constantly (or periodically or intermittently) transitioning from one state to another by the execution of actions, wherein movement from one state to the next is defined by a discrete time slot. This may be represented by a Markov chain consisting of a sequence of random variables $s_1$, $s_2$, $s_3$, . . . . The random variables are states the robotic device may experience and form a set S called the state space. The coverage of cells in a particular order may therefore be thought of as a sequence of states $s \in S$, where states are cells visited, each state with a discrete time stamp $t \in T$. For the robotic device to transition from a current state s to a next state s', the robotic device performs an action $a \in A$ over a time span of t to t', moving from one cell to another.

For a Markov chain, having the Markov property, the probability of moving to a next state may be dependent on the present state (or some embodiments may operate on higher order Markov chains, like $2^{nd}$ or $3^{rd}$ order Markov chains). This is mathematically represented by P(s'|s). A Markov chain may be further extended to a MDP through the addition of actions (choices) and rewards (motivation), such that there are multiple actions that may be chosen from a single state and a different reward associated with each action. MDP is a five-tuple comprising a finite set of states S, a finite set of actions A, the probability that action a will lead to state s' at time t' given by P(s'|s), the immediate reward after transitioning from state s to state s' given by r, and the discount factor $\gamma$, representing the difference in importance between future and present rewards. The goal of MDP is to find an optimal policy $\pi$ that specifies the highest rewarded action a to take for each state s. In some embodiments, the control system of the robotic device using a MDP, after completing each action and transitioning to a new state, assigns a reward and iteratively calculates a state-action value function as the expected value of the current reward plus the discounted maximum future reward at the next state. The state-action value function provides the value of a state. The control system of the robotic device does not require any visualization in choosing the next action of the robotic device. In some embodiments, the control system optimizes the state-action value function. In optimizing the state-action value function (which may be based on the above objective function, like the reward function above), the highest rewarded actions from each state are simultaneously (or concurrently, in the course of a given decision) identified by the control system and used in deriving the optimal policy. In one embodiment, the value of the reward may be dependent on achieving the desired surface coverage of a workspace. For example, transitioning to a cell which has already been covered may result in incurring a greater negative reward from the control system than transitioning to a cell which has not been covered yet. Assigned rewards during the work session are negative. Other optimization factors may also be considered in computing the reward, such as actual surface coverage, repeat coverage, total coverage time, travel distance between zones etc.

In some embodiments, once the robotic device completes the work session, a predetermined (or dynamically determined) positive reward value is assigned by the control system of the robotic device. A net reward value for the executed surface coverage of the workspace, consisting of a sequence of states and actions experienced, in some embodiments, is then calculated by the control system as (or based on, e.g., in a normalized value) the sum of the cumulative negative reward from the multiple actions taken while transitioning from one state to another and the positive reward upon completion of the work session.

Over time (e.g., over multiple cleaning sessions), optimal state-action value function and optimal policy from which actions from different states are selected may be found by the control system of the robotic device. For a single state, there may be several actions which can be executed. The sequence of states and actions that result in the maximum net reward provides the optimal state-action value function for a given state. In some embodiments, the action for a given state that results in maximum reward provides the optimal policy for the given state. Some embodiments may independently optimize path through a zone and zone configuration/sequence, or some embodiments may globally optimize these aspects. An optimal policy for a state space may then contain the highest valued actions corresponding to multiple states. As different zones, order of coverage of the zones, and coverage paths are executed over time, the number of states experienced, actions taken from each state, and transitions increase. In some embodiments, the surface coverage plan devised by the control system of the robotic device iteratively evolves to become more efficient by choosing transitions that result in most favorable outcomes and by avoiding situations which previously resulted in low net reward. After convergence (which some embodiments may determine has occurred based on changes in net reward between iterations indicating a local or global maximum), assuming the system did not fall into a local minimum or is able to get out of a local minimum by employing techniques such as stochastic perturbations and momentum methods (e.g., randomly changing parameters or changing parameters with a stride that varies), the evolved surface coverage plan of the workspace may be trusted to be more efficient than alternate surface coverage plans that may be devised.

In order to get out of local maximum, the control system of the robotic device, in some embodiments, employs stochastic optimization. Some embodiments may perform multiple optimizations from different randomly selected starting conditions and, then, select the parameters corresponding to the best result of each of the optimizations. This is expected to provide a reliable and efficient method for the control system of the robotic device to devise coverage of a workspace as actions are evaluated and optimized such that the most efficient surface coverage of a workspace is eventually executed and factors reducing surface coverage efficiency, including but not limited to (which is not to suggest other descriptions are limiting), actual surface coverage, repeat coverage, driving distance between zones and total coverage time are reduced with the fine-tuning of properties over time. An example of a MDP consisting of a sequence of states and actions followed by rewards may be mathematically represented below. Actions are taken to transition from one state to another and after transitioning to each new state a reward is assigned, in some embodiments. For a sequence of states and actions, in some embodiments, the net reward is the sum of rewards received for the sequence of states and actions, with future rewards discounted. MDP may be used to maximize rewards. MDP may be solved using Q-Learning which focuses on the expected net reward for the execution of a sequence of states and actions calculated by a state-action value function (or Q-function). Optimal state-action value function may be identified by a sequence of states and actions with highest net reward. Since multiple actions can be taken from each state, in some embodiments, the goal is to also find an optimal policy, which contains the action from each state with highest reward value. For example, in some embodiments, a sequence of states s and actions a followed by rewards r may be used by the control system to represent states and actions of the robotic device and rewards received and may be notated by $s_t, a_t, r_{t+1}, s_{t+1}, a_{t+1}, r_{t+2}, s_{t+2}, a_{t+2}, r_{t+3}, \ldots a_T, r_T, s_T$ wherein t is a time step. The net return $R_T$ to be expected in the future is the sum of the rewards received for the sequence of states and actions beginning from state $s_t$ and ending with terminal state $s_T$. This may be calculated by the control system of the robotic device using $R_T = r_{t+1} + \gamma^1 r_{t+2} + \ldots + \gamma^{T-t-1} r_T$ wherein $0 \leq \gamma < 1$ is a discount factor applied as distant rewards are less important. It may be desirable to find the sequence of states and actions that maximize the reward. Q-Learning may be used by the control system of the robotic device to maximize the reward by finding an optimal state-action value function Q (s, a). The value of a state-action pair $Q(s, a) = E[R_T | s_t = s, a_t = a]$ may be calculated by the control system and is defined as equivalent to the expected return $R_T$ for the sequence of states and actions beginning with state $s_t$ and action $a_t$ and ending with terminal state $s_T$. Over time the control system may find the sequence of states and actions which maximize the state-action value function Q (s, a) and hence the optimal value function $Q^*(s, a) = \max E[R_T | s_t = s, a_t = a]$. The optimal policy $\pi(S) = \text{argmax } Q^*(s, a)$ for each state may be derived by the control system of the robotic device by identifying the highest valued action which can be taken from each state. In some embodiments, the control system of the robotic device may iteratively calculate the state-action value function for a given state s and action a by applying the Bellman Optimality equation. The optimal value function obeys Bellman Optimality equation and may be expressed as $Q^*(s, a) = E[r + \gamma \max Q^*(s', a')]$. The equation expresses that the value for a given state s and action a should represent the current reward r observed at state s plus the maximum discounted future reward for the next state s' the robotic device would end up in. This equation may be used by the control system, in some embodiments, to iteratively calculate the state-action value, $Q_{i+1}(s, a) = E[r + \gamma \max Q_i(s', a')]$, for a given state s and action a as the sequence of states and actions are executed. i is the iteration number and begins at i=0, with $Q_0(s', a')$ being initially assumed based, for example, on previous experience, the midpoint of the min and max value possible, or an arbitrary value. Based on the definition of an expected value, the equation is equivalent to $Q_{i+1}(s, a) = \Sigma P(s'|s) [r + \gamma \max Q_i(s', a')]$ where P(s'|s) is the probability that action a will lead to state s', as previously described above. The sequence of states and actions may correspond to the states the robotic device visits and actions it takes while covering the workspace from start to finish, where actions are taken to transition from one cell of the workspace to another. Over time, as the robotic device visits more states and the control system evaluates different actions from each state, the system will converge to find the most optimal action to take from each state, thereby forming an optimal policy.

In some embodiments, the control system of the robotic device may apply the MDP described to optimize coverage of each zone separately and/or may apply the MDP to optimize coverage of the entire workspace. For example, MDP may be applied to each zone separately to determine the most efficient coverage path of each zone or the MDP may be applied to the entire workspace to determine best division of zones, the order in which they are covered, and the coverage path.

FIG. 5 illustrates an example of different surface coverage plans executed by a robotic device and the corresponding net reward received from a control system of the robotic device. In this particular example, the net reward received is compared for surface coverage plans employing different zone division methods and different order in which zones are serviced. Table 500 includes session column 501, zone division method column 502, order of zones serviced column 503, and net reward column 504. In other embodiments, coverage path or pattern within each zone may also be used by the control system in determining the net reward. The net reward received may be dependent on, for example, travel distance between zones, actual surface coverage, repeat coverage and total coverage time. After servicing a workspace a number of times, in some embodiments, the data may be used by the control system to determine which combination of zones and order of surface coverage produces the highest reward. In some embodiments, a reward function (or other objective function, like a cost function being minimized) may be defined and maximized by the control system to determine the division of zones and/or the order in which zones are covered and/or the coverage path that results in the most efficient surface coverage plan of a workspace. These different aspects may be optimized globally, or greedily, on a parameter-by-parameter basis.

Figure 6:
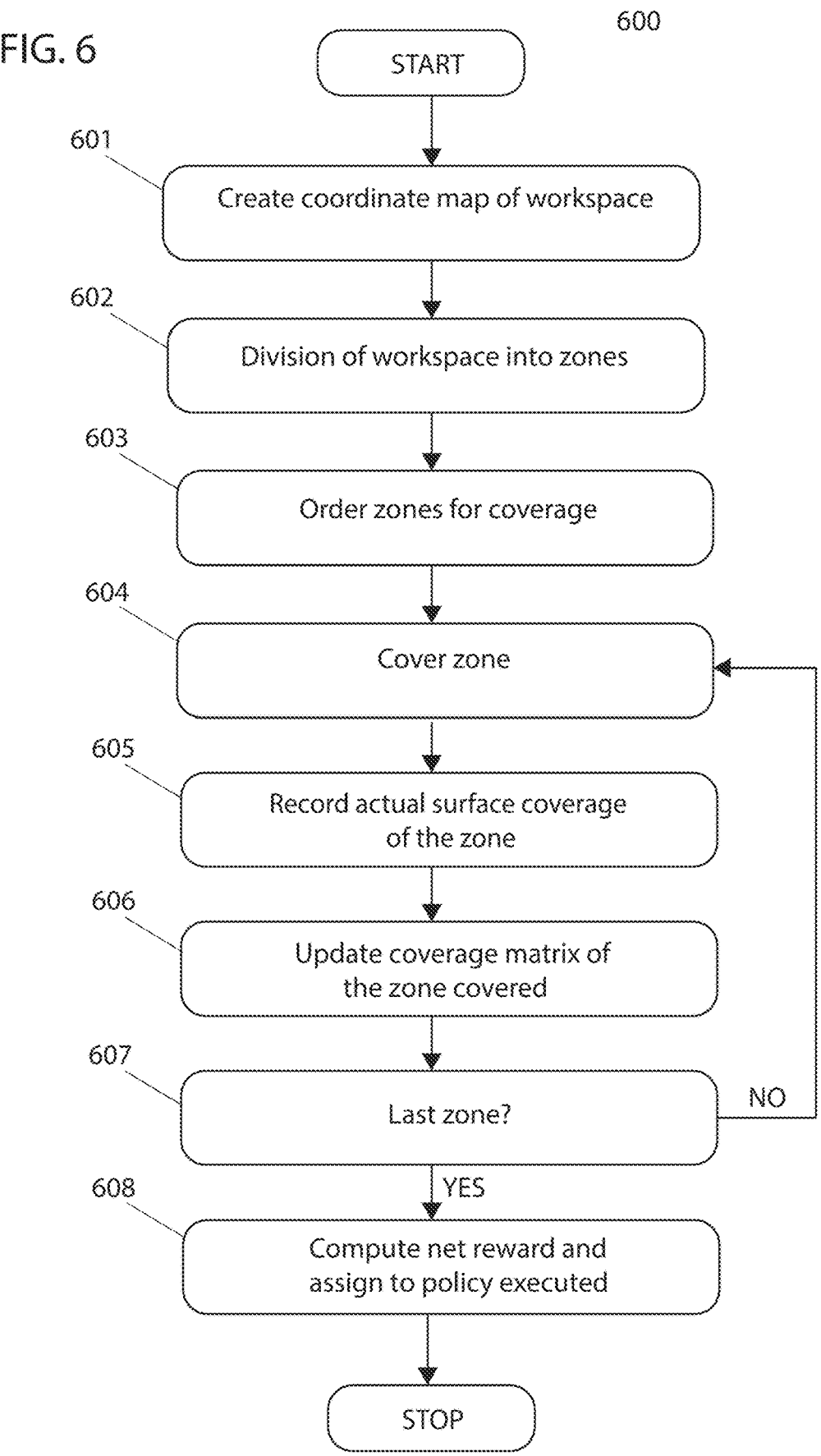
FIG. 6 is a flowchart illustrating an example of a method for optimizing surface coverage of a workspace, acted upon by systems embodying features of the present techniques.

FIG. 6 is a flowchart of a process 600 that, in some embodiments, directs surface coverage of a workspace by a robotic device. At a first step 601, a control system of the robotic device (e.g., on-board or remote) creates a map of the workspace comprising a number (e.g., a plurality, like more than 5 or more than 10) of cells. Each cell within the coordinate map may be defined by an ordered pair by the control system, wherein the first value of a given pair represents an angle and the second of the given pair value represents a distance from an origin of a coordinate system.

At a next step 602, in some embodiments, the control system divides the workspace into a number (e.g., a plurality, like more than 5 or more than 10) of zones each defined by the control system by a zone matrix comprising a portion of the cells of the map. Division of the workspace into zones may be implemented with various approaches.

In some embodiments, division may be based on criteria that may include without limitation (which is not to suggest other lists are limiting): the size of the zone, the location of the zone, the shape of the zone, etc. Initially, the workspace may be divided by the control system based on the strength of a wireless signal, such as a WI-FI or other RF signal. For example, a workspace with three rooms may have different WI-FI signal strength in each room, therefore embodiments may sense signal strength and cluster cells into zones based on signal strength, e.g., three different zones may initially be created based on the three different signal strengths observed by a WI-FI module of the robotic device in the three rooms of the workspace. Some embodiment may apply computer vision techniques to the signal strengths in each cell to define zones with, e.g., edge detection algorithms or blob detection algorithms. In some embodiments, initial division of the workspace may be based on sensed locations of doors. For example, a signal indicative of a door may cause embodiments to divide an area into two zones, one on either side of the door. Methods for detecting a door include those described in U.S. Patent App. Nos. 62/616,928, 62/613,005 and Ser. No. 15/614,284, the entirety of the contents of which are incorporated herein by reference. In some embodiments, division of the workspace may be arbitrary or may depend on the layout of the workspace, where for example furniture of the workspace may cause embodiments of the control system to divide the workspace, or the workspace may be divided based on any other logic.

At a next step 603, in some embodiments, the control system of the robotic device orders (e.g., sequences) the zones for surface coverage. The initial order of the zones may be arbitrary or may be dependent on the size of the zones or may be based on the current position of the robotic device and/or the position of the zones relative to one another or may be chosen based on various other measures or logic.

At a next step 604, in some embodiments, the robotic device covers a zone. The zones may be covered in sequential order (e.g., in response to the sequence) as determined in step 603.

At a next step 605, in some embodiments, the control system of the robotic device records actual surface coverage of the zone by methods such as dead reckoning, odometry, or structure from motion measured using devices such as an optical encoder or gyroscope.

At a next step 606, in some embodiments, the control system of the robotic device updates a coverage matrix of the zone. Each entry of the coverage matrix corresponds to an entry of the zone matrix, the entry being a cell of the workspace. When (e.g., in response to an event in which) a cell within an entry of the zone matrix is covered, the corresponding entry in the coverage matrix may be updated by the control system, for instance, increasing by a value of one each time the particular cell is covered. Various methods for covering a zone may be used in embodiments without limitation (which is not to imply other descriptions are limiting).

At a next step 607, in some embodiments, the control system of the robotic device determines whether the last zone has been covered. If (e.g., if and only if) the control system determines at a step 607 that the last zone has not been covered, the control system continues to a step 604 and actuates the robotic device to cover the surface of the next zone in the ordered list. If the control system determines at a step 607 that the last zone has been covered, the control system of the robotic device proceeds to step 608 to compute a net reward and assign it to the executed policy. The net reward may be dependent on actual surface coverage of the workspace, travel distance between zones, repeat coverage, total coverage time etc. In embodiments, the policy may comprise experienced states and actions of the robotic device during surface coverage of the workspace as a result of the zones created, the order in which they were covered and coverage path. In embodiments, the policy may comprise the zones created, the order in which they were covered and coverage path. In embodiments, only zones created and the order in which they were covered are considered in the policy. It may be desirable for the control system to find the policy that maximizes the reward and thus (according to some objective functions) the surface coverage plan that minimizes redundancy during coverage of a workspace by a robotic device. For example, it may be desirable for the control system to find the policy with the division of zones, order of zones for surface coverage, and coverage path (i.e. the policy) that results in maximum surface coverage of the workspace, smallest travel distances between zones, minimal repeat coverage, and minimal total coverage time (translating to a large reward, e.g., with a reward function that determines a weighted combination of these aspects).

Figure 7:
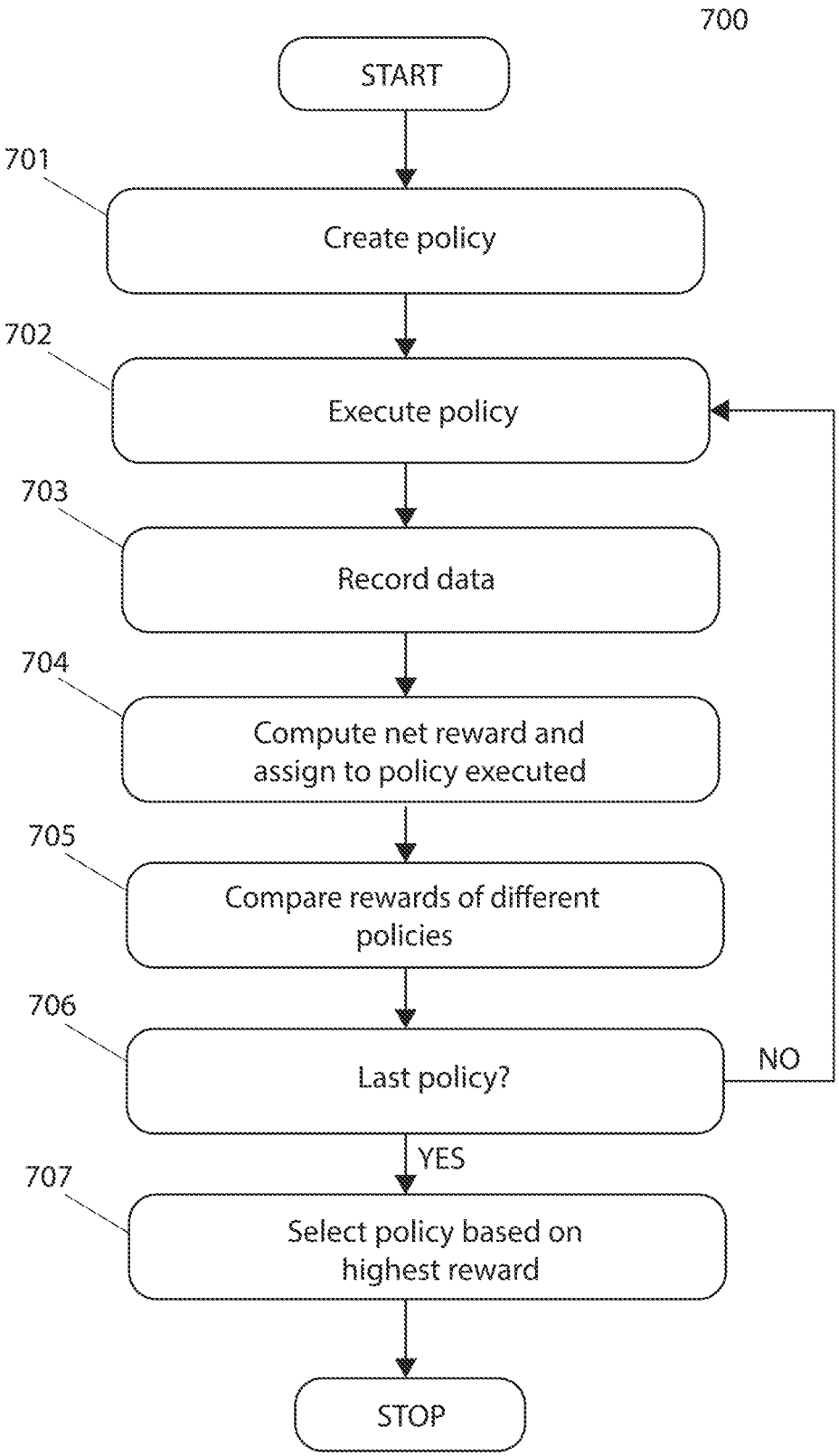
FIG. 7 is a flowchart illustrating an example of a method for optimizing surface coverage of a workspace, embodying features of the present techniques and executed by some embodiments.

FIG. 7 is a flowchart of a process 700 that in some embodiments determines surface coverage of a workspace by a robotic device. At a step 701, in some embodiments, a control system of the robotic device creates a policy. For example, a created policy may comprise created zones (e.g. location, size, shape, etc.), the order of surface coverage of the zones and coverage path. In a MDP, a created policy may comprise a collection of states and actions of the robotic device corresponding to coverage of the created zones, the order of surface coverage of the zones, and coverage path within and between zones.

At a step 702, in some embodiments, the control system actuates the robotic device and executes the policy. In executing the policy, the control system of the robotic device may iteratively follow steps 603 to 608 as illustrated and disclosed above in FIG. 6. While a policy is executed, in some embodiments, the control system records data at a step 703 and after execution of the policy a net reward may be calculated and assigned to the policy by the control system of the robotic device at a step 704. At a next step 705, in some embodiments, the control system compares rewards of different policies. At a next step 706, in some embodiments, the control system of the robotic device determines whether the last policy has been executed. If the control system determines at a step 706 that the last policy has not been executed, in some embodiments, the control system continues to a step 702 to execute another policy. If the control system of the robotic device determines at a step 706 that the last policy has been executed, in some embodiments, the control system continues to a step 707 to select a policy based on the highest reward. In this manner, by iteratively selecting or creating policies and rewarding those policies based on performance of surface coverage of a workspace by a robotic device, surface coverage redundancy may be reduced. In some embodiments, the control system of the robotic device may not continue to step 702 to execute another policy which has not yet been executed. In some embodiments, a control system of a robotic device may determine an optimal (e.g., locally or globally) surface coverage plan of a workspace by minimizing a cost function or by maximizing a reward function. The control system of the robotic device may divide a workspace A into n zones $A_1, A_2, \ldots, A_n \subset A$ wherein the index indicates the order of surface coverage of the zones. For example, the robotic device may first provide surface coverage to zone $A_1$, followed by surface coverage to zone $A_2$, and so on. In some embodiments, zones $A_1, A_2, \ldots, A_n$ may overlap. For example, there may be indices i and j, for which i≠j and $A_i \cap A_j \neq 0$. In some embodiments, zones $A_1, A_2, \ldots, A_n$ may not collectively represent the entire area of workspace A, wherein the condition $\cup_i A_i = A$ may not be fulfilled. In some embodiments, the overall cost function C of a zone or a workspace may be calculated by the control system of a robotic device based on a travel and cleaning cost K and coverage L. In some embodiments, other factors may be inputs to the cost function. For example, $C = \omega_1 K - \omega_2 L$ may be used by the control system of a robotic device to calculate cost of surface coverage, wherein weights $\omega_1, \omega_2 \geq 0$ may be used to adjust importance of travel cost and surface coverage. The objective of the control system may be to minimize the travel and cleaning cost K and maximize coverage L. The travel and cleaning cost K may be determined by the control system by computing individual cleaning cost for each zone and adding the required driving cost between zones. The driving cost between zones may depend on where the robot ended surface coverage in one zone, and where it begins surface coverage in a following zone. A cleaning cost function F for a zone $A_i$ may be specified, such that given zone $A_i$ and starting position $g_i$ of the robotic device, the control system may compute cleaning cost $h_i$ and final position $f_i$ of the robotic device, $h_i$, $f_i$=F($A_i$, $g_i$). The cleaning cost $h_i$ may be dependent on factors such as the movement pattern of the robotic device, coverage time, etc. Upon completion of surface coverage of zone $A_i$, the control system may actuate the robotic device to move towards the closest position $$g_{i+1} = \underset{g \in A_{i+1}}{\operatorname{argmin}} D(f_i, g)$$

within the next zone $A_{i+1}$ to be covered. The function D($f_i$, g) may be used by the control system to compute distance from final position $f_i$ to every possible position $g \in A_{i+1}$. A travel cost function T for driving from final position $f_i$ of zone $A_i$ to starting position $g_{i+1}$ of zone $A_{i+1}$ may be specified, such that given final position $f_i$ and starting position $g_{i+1}$, the control system may compute travel cost $p_{i+1}$=T($f_i$, $g_{i+1}$). Therefore, the travel and cleaning cost $K_i$=$h_i$+$p_i$ for a zone $A_i$ may be computed by the control system of the robotic device. And, the total travel and cleaning cost $$K = \sum_{i=1}^{n} K_i = \sum_{i=1}^{n} h_i + p_i$$

for all zones $A_1$, $A_2$, . . . , $A_n$ of workspace A may be computed by the control system. Coverage cost L=$\|\cup_i A_i\|$ for a workspace may be defined and computed by the control system, wherein the norm may refer to the square meters of area covered by the robotic device.

Figure 8A:
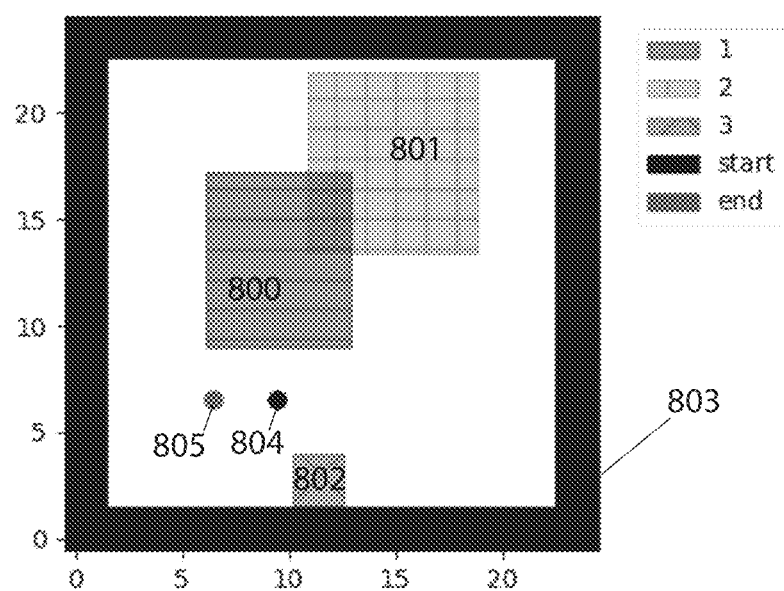
FIGS. 8A-8C illustrate embodiments of a method for optimizing surface coverage of a continuous space with rectangular zones, embodying features of the present techniques and executed by some embodiments.
Figure 8B:
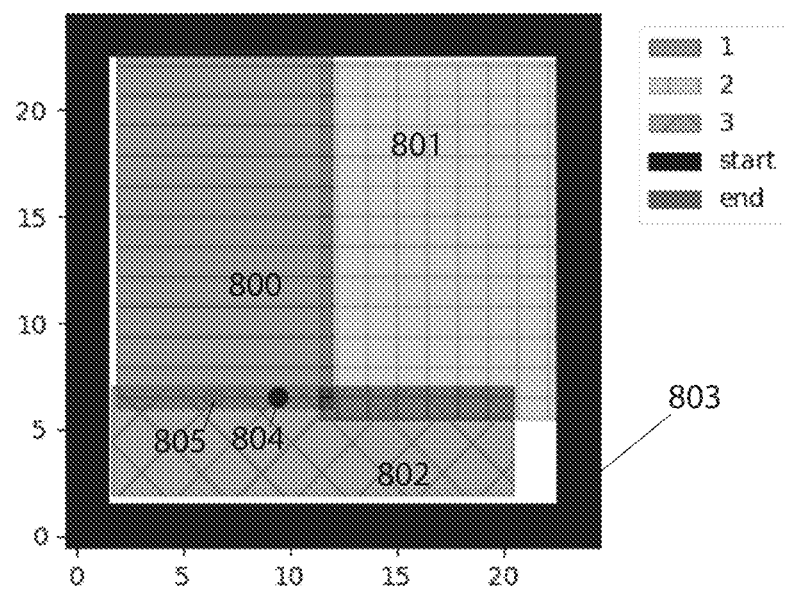
Figure 8C:
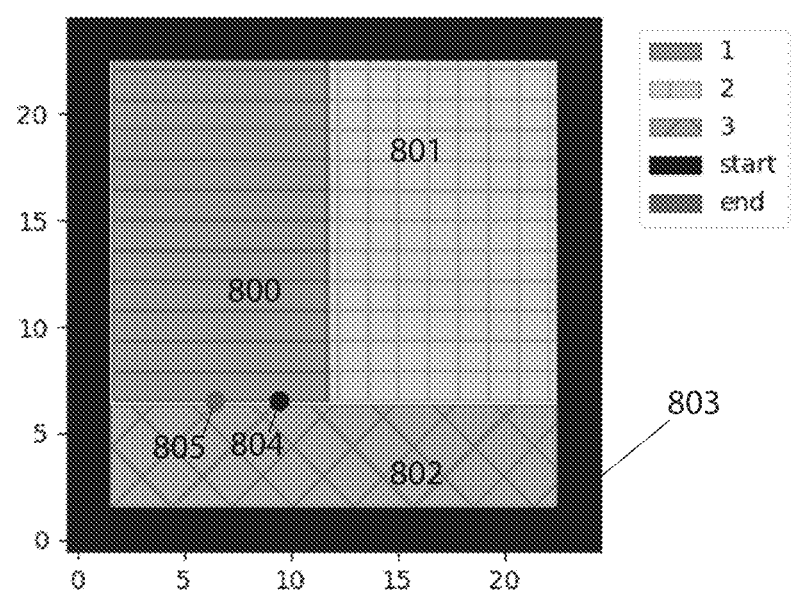

In some embodiments, the control system of a robotic device may minimize the total cost function C=$\omega_1$K−$\omega_2$L by modifying zones of workspace A by, for example, removing, adding, shrinking, expanding, moving and switching the order of coverage of zones. For example, in some embodiments the control system of the robotic device may restrict zones to having rectangular shape, allow the robotic device to enter or leave a zone at any surface point and permit overlap between rectangular zones to determine optimal zones of a workspace. In embodiments, additional conditions may be included or excluded by the control system. Since a rectangle may be defined by x, y coordinates of its center, its width and its height, zones of a workspace may be defined by the control system using an n×4 array of floating point numbers. Rectangular zones may initially be created and ordered for surface coverage by the control system of the robotic device. Gradient descent may then be used by the control system to compute the division of zones (i.e. size, location) that results in minimal cost, as defined by the cost function C, by iteratively modifying division of zones based on a partial derivative of the cost function with respect to each respective parameter defining the zones. The control system may employ gradient descent for a zone $A_i$ by computing $$A_i = A_i - h \frac{\partial C}{\partial A_i}$$

wherein h is the step size of the gradient descent. Derivatives of the cost function C may be computed by the control system with respect to each of the four variables defining the rectangle by using, in some embodiments, a finite difference approximation. FIGS. 8A-8C illustrate an implementation of gradient descent. In FIG. 8A rectangular zones 800, 801 and 802 of workspace 803 are shown. Units along the x- and y-axis may be feet or other unit of measurement. A robotic device begins at point 804 then sequentially covers the surface of zones 800, 801, and 802 and ends at point 805. The initial coverage is not ideal. To improve coverage, gradient descent may be applied by a control system of the robotic device. Since the cost function is based on coverage, the zones may be expanded by embodiments in the direction of uncovered areas and avoid overlap. For instance, embodiments may determine partial derivative of the cost function with respect to parameters of the zones that indicate such an adjustment will tend to reduce the cost locally. To lower traveling cost, the proximity of zones with respect to other zones to be covered immediately before and after is increased (i.e. distance between sequentially ordered zones is reduced) by the control system.

FIGS. 8B and 8C illustrate the steps in an iterative process of gradient descent and optimization of surface coverage by the control system of a robotic device. Some embodiments may iteratively adjust until a stopping condition is reached, e.g., until there is less than a threshold amount of change between sequential iterations in cost. FIG. 8B illustrates expansion of rectangular zones 800, 801, and 802 to improve coverage while FIG. 8C illustrates further optimization of coverage and traveling cost by the control system such that there is no overlap between zones 800, 801, and 802 and the border of each zone is adjacent to the border of those zones to be covered immediately before and after. In some embodiments, the control system of a robotic device may use various functions to further improve optimization of surface coverage of the workspace.

Figure 9A:
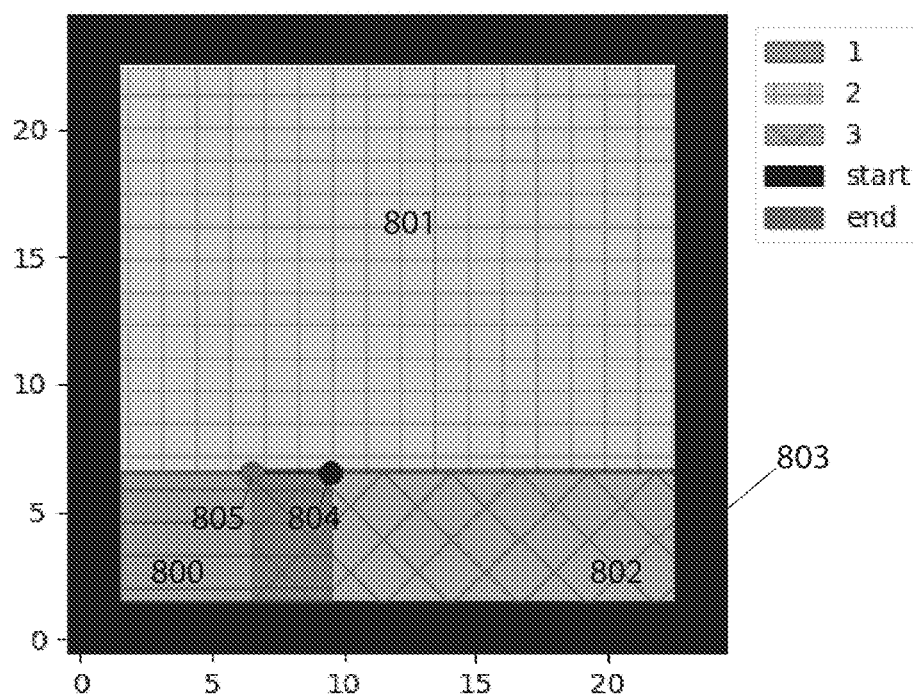
FIGS. 9A and 9B illustrate an example of deadlock encountered during optimizing surface coverage of a workspace.
Figure 9B:
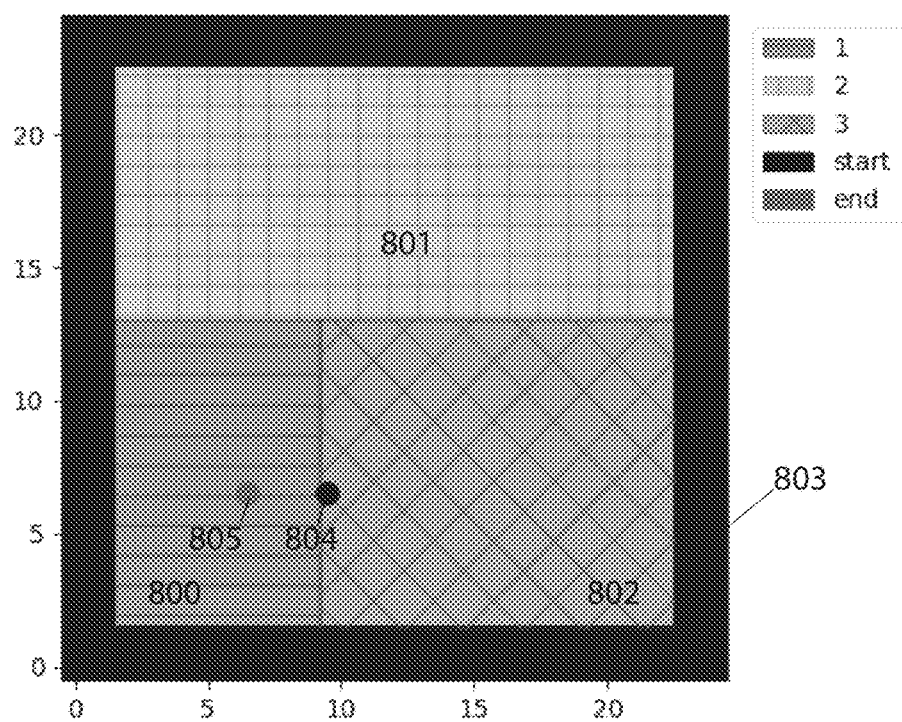

These functions may include, a discover function wherein a new small zone may be added to large and uncovered areas, a delete function wherein any zone with size below a certain threshold may be deleted, a step size control function wherein decay of step size in gradient descent may be controlled, a pessimism function wherein any zone with individual cleaning cost below a certain threshold may be deleted, and a fast grow function wherein any space adjacent to a zone that is predominantly unclaimed by any other zone may be quickly incorporated into the zone. In some embodiments, deadlocking may occur when, for example, stuck in local maximum or minimum or when driving distance measure fails to account for walls. Some embodiments may implement stochastic gradient descent to reduce the effects of local minima or maxima. Another example of deadlock is illustrated in FIG. 9A between zones 800 and 802 as they are both competing for the same area with the same priority. Zone 800 desires expansion towards starting point 804 as coverage begins in zone 800 and zone 803 desires expansions towards ending point 805 as coverage ends in zone 803. Such a situation may be avoided by beginning coverage in zone 803 and ending in zone 800. Alternatively, the weights in the cost function for coverage and travel and cleaning cost may be adjusted. For example, if more weight is given to travel and cleaning cost, zones 800, 801 and 803 may be as illustrated in FIG. 9B wherein overlap between zones 801 and 803 is observed as traveling distance between zones results in larger penalty than overlap between zones.

In some embodiments, the cost function minimized by the control system may account for additional features other than or in addition to travel and cleaning cost and coverage. Examples of features that may be inputs to the cost function may include, coverage, size, and area of the zone, zone overlap with walls, location of zones, overlap between zones, location of zones and shared boundaries between zones. In some embodiments, a hierarchy may be used by the control system to prioritize importance of features (e.g., different weights may be mapped to such features in a differentiable weighted, normalized sum). For example, tier one of a hierarchy may be location of the zones such that traveling distance between sequential zones is minimized and boundaries of sequential zones are shared, tier two may be to avoid walls, tier three may be to avoid overlap with other zones and tier four may be to increase coverage.

In some embodiments, the cost function may be integrated with MDP wherein the control system of the robotic device finds the division of zones, order of surface coverage of zones, coverage path, etc. that minimize the cost function, thereby maximizing the reward.

Figure 10A:
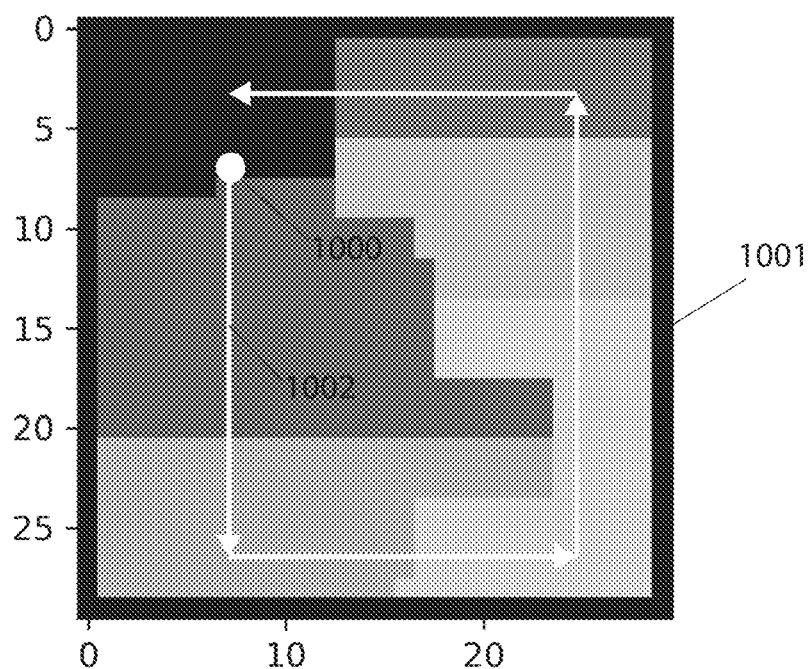
FIGS. 10A and 10B illustrate patterns followed by embodiments implementing a method for optimizing surface coverage of a discrete space with rectangular zone, in accordance with some embodiments.
Figure 10B:
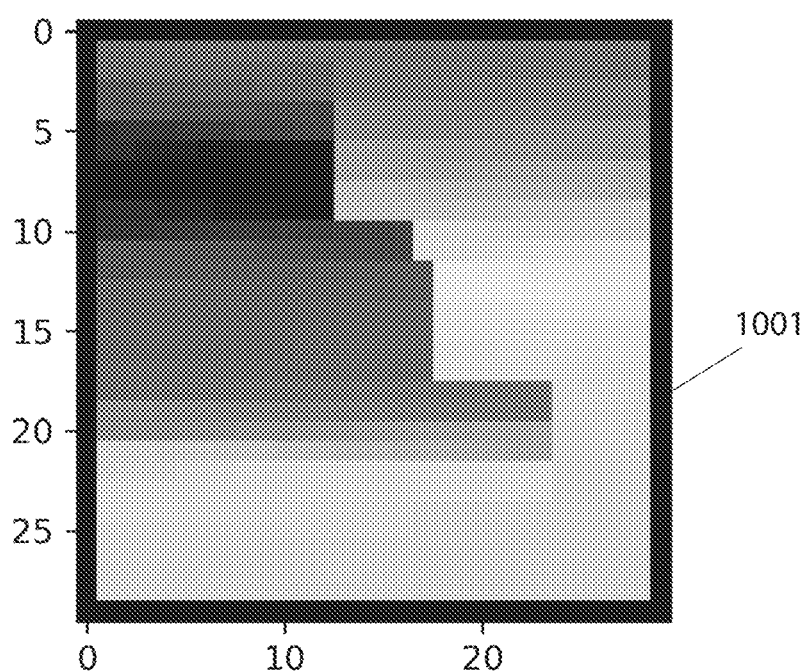

In some embodiments, a workspace of a robotic device is represented by a control system of the robotic device using a coordinate map comprising a collection of cells, and zones may have the form of any connected component on the coordinate map. In such embodiments, the coordinate map of the workspace may be represented by the control system using a matrix wherein each entry corresponds to a coordinate cell of the workspace and zones may be represented by the control system using a matrix corresponding to a portion of the coordinate cells of the workspace. In some embodiments, each cell of the workspace can only belong to a single zone, overlap between zones is avoided by construction. Entries in the matrices of zones may have a value of zero if the corresponding cell of the workspace is empty or may have a value of one if the cell is occupied by, for example, a wall or furniture. Zones may initially be created and ordered for surface coverage by the control system of the robotic device. In some embodiments, to optimize division of zones of a workspace, the control system of a robotic device may proceed through the following iteration for each zone of a sequence of zones, beginning with the first zone: expansion of the zone if neighbor cells are empty, movement of the robotic device to a point in the zone closest to the current position of the robotic device, addition of a new zone coinciding with the travel path of the robotic device from its current position to a point in the zone closest to the robotic device if the length of travel from its current position is significant, execution of a surface coverage pattern (e.g. boustrophedon) within the zone, and removal of any uncovered cells from the zone. In some embodiments, additional steps may be included in the iteration or certain steps described may be omitted, which is not to suggest that any other process herein is not also amenable to such variation. In some embodiments, additional functionalities may be used by the control system such as, placement of a new zone in any large, uncovered areas to increase discovery speed, deletion of areas with size below a certain threshold and aggressive growth of efficient zones wherein efficiency may be measured by for example, coverage time or coverage path. FIG. 10A illustrates zone segmentation resulting from execution of some examples of the iteration described herein with coverage beginning and ending at point 1000 of workspace 1001. Order of surface coverage is shown by arrow 1002. FIG. 10B illustrates the boustrophedon pattern executed for surface coverage of workspace 1001 represented by the back and forth striations within each zone and leading from one zone into another.

Figure 11A:
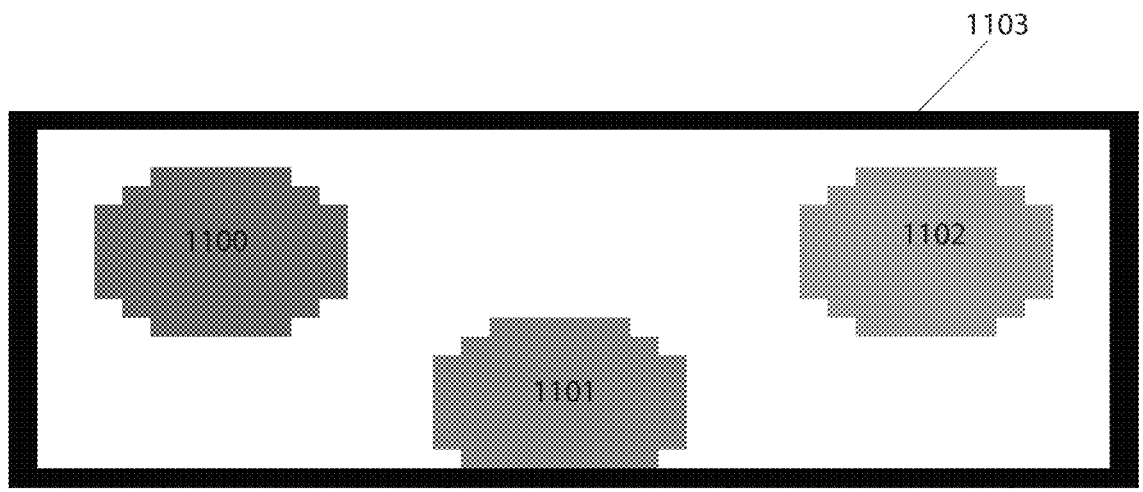
FIGS. 11A and 11B illustrate patterns followed by embodiments implementing a method for optimizing surface coverage of a discrete space with arbitrarily shaped zones, in accordance with some embodiments.
Figure 11B:
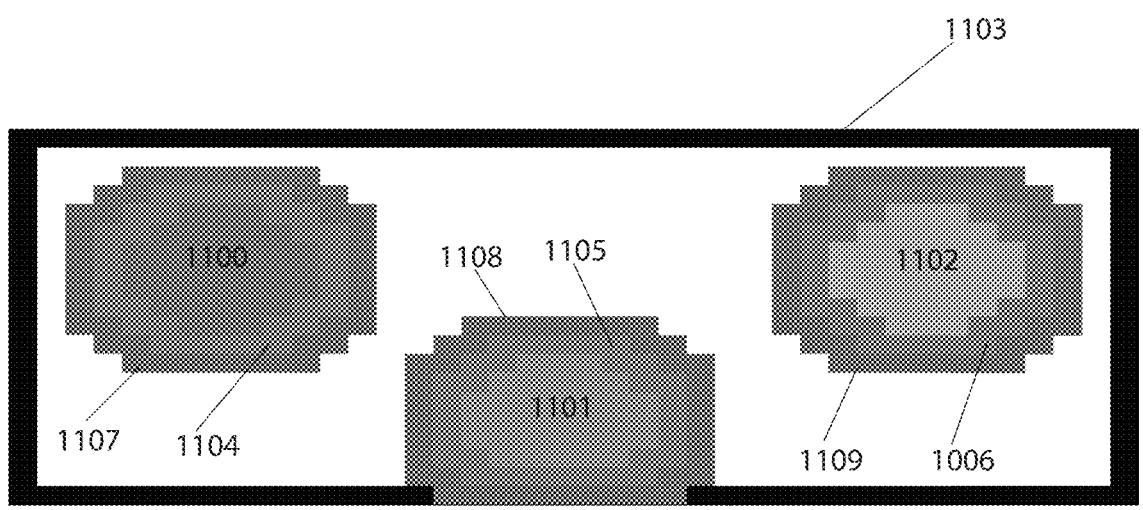

In some embodiments, optimal division of zones of a workspace of a robotic device may be determined by a control system of the robotic device by modeling zones as emulsions of liquid, such as bubbles. For instance, some embodiments may determine a Euclidean Steiner tree with Steiner vertices that define zone corners and correspond to obstacles. In some embodiments, the control system of the robotic device may create zones of arbitrary shape but of similar size, avoid overlap of zones with wall structures of the workspace and minimize surface area and travel distance between zones. Behaviors of emulsions of liquid, such as minimization of surface tension and surface area and expansion and contraction of the emulsion driven by an internal pressure may be used in modeling the zones of the workspace. To do so, in some embodiments, the workspace of the robotic device may be represented on a grid map and divided into zones by the control system of the robotic device. The grid map may be converted by the control system into a routing graph G consisting of nodes N connected by edges E. A zone A may therefore be represented by the control system using a set of nodes of the routing graph wherein $A \subset N$. The nodes may be connected and represent an area on the grid map. A zone A may be assigned a set of boundary edges E by the control system of the robotic device wherein a boundary edge $e=(n_1, n_2)$ connects a node $n_1 \in A$ with a node $n_2 \notin A$. Thus, the set of boundary edges clearly defines the set of boundary nodes $\partial A$, and gives information about the nodes, which are just inside zone A as well as the nodes just outside zone A. Boundary nodes in zone A may be denoted by $\partial A^{in}$ and boundary nodes outside zone A by $\partial A^{out}$. The collection of $\partial A^{in}$ and $\partial A^{out}$ together are all the nodes in $\partial A$. FIG. 11A illustrates zones 1100, 1101, and 1102 and wall 1103 of a workspace. FIG. 11B illustrates zones 1100, 1101, and 1102 with $\partial A^{in}$ boundary nodes 1104, 1105, and 1106 and $\partial A^{out}$ boundary nodes 1107, 1108, and 1109, respectively. In embodiments, a control system of a robotic device may expand a zone A in size by adding nodes from $\partial A^{out}$ to zone A and may reduce the zone in size by removing nodes in $\partial A^{in}$ from zone A, allowing for fluid contraction and expansion.

Figure 12A:
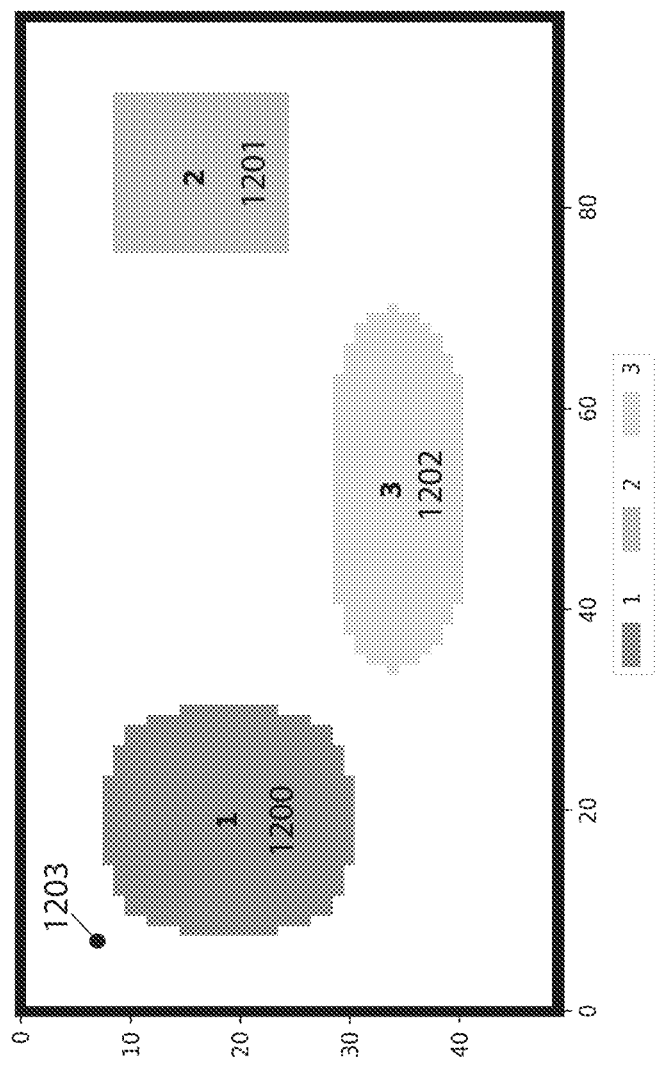
FIGS. 12A-12C illustrate example measures of area and distance from the center of a zone used in assigning a numerical value to boundary nodes of a zone, in accordance with some embodiments.
Figure 12B:
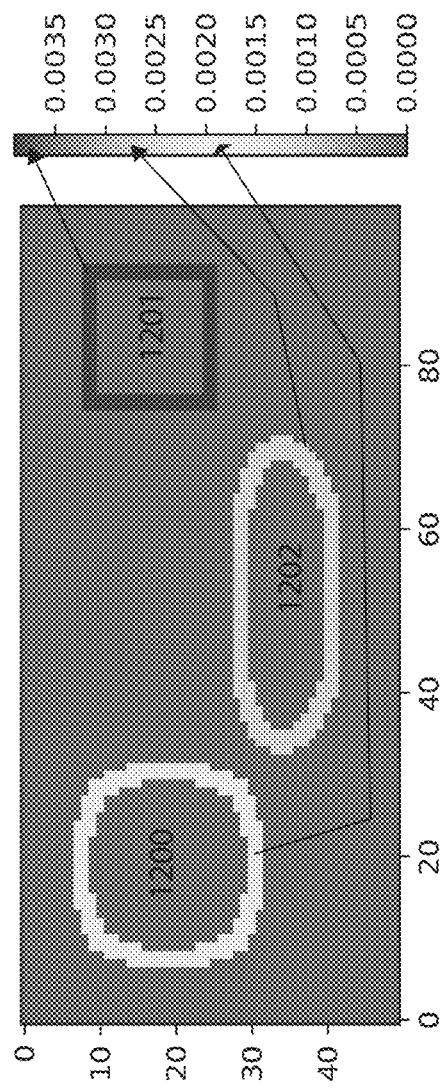
Figure 12C:
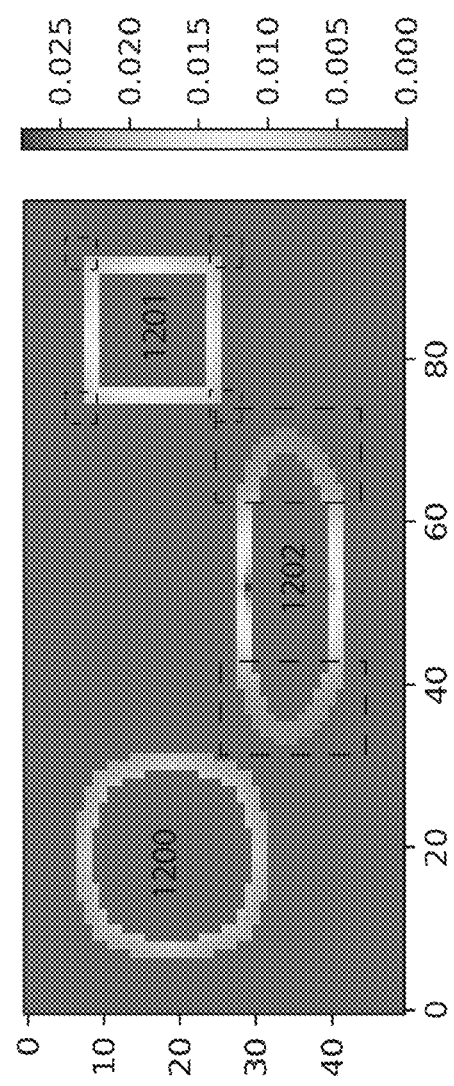

In some embodiments, a numerical value may be computed and assigned to each node in $\partial A$ by the control system of the robotic device, wherein the value of each node indicates whether to add or remove the node from zone A. The control system may, for example, compute a numerical value for each node in $\partial A$ for each zone $A_1, A_2, \ldots, A_n$, of a workspace. Depending on the value of each node in $\partial A$, each node is either removed from zone A, added to zone A or moved to another zone by the control system. In some embodiments, the numerical value computed may be dependent on growth (if the area is small) and decay (if the area is large) of the zone, distance of the node from the center of the zone, order of zone coverage, and a surface smoother score. For example, for a boundary node of a zone, growth and decay of the zone and distance of the node from the center of the zone may be evaluated by the control system of the robotic device using $$\frac{c_1}{a} + \frac{c_2}{d^2}$$

wherein a is area of the zone, d is the distance of the node from the center of the zone and $c_1$, $c_2$ are constants which dictate the importance of each term in the equation. FIG. 12A illustrates zones 1200, 1201, and 1202 with same start and end point 1203. In FIG. 12B values for are shown for boundary nodes of zones 1200, 1201 and 1202.

$$\frac{1}{a}$$

for each boundary node within the same zone is equal in value as indicated by the consistent color of boundary nodes in each zone. Arrows indicate approximate value of boundary nodes for each zone. In comparing boundary nodes from different zones, boundary nodes belonging to smaller zones result in a greater value for $$\frac{1}{a}$$

as indicated by the color or boundary nodes of different zones. Smaller areas with greater value for $$\frac{1}{a}$$

may indicate desired growth of the zone. FIG. 12C illustrates values of $$\frac{1}{d^2}$$

for boundary nodes of zones 1200, 1201, and 1202. There is not significant difference in the value of $$\frac{1}{d^2}$$

for boundary zones in zone 1200 as it is circular. For zone 1201 boundary nodes located at the corners, bounded by dashed lines, are further from the center and therefore have a smaller value for $$\frac{1}{d^2}$$

as compared to boundary nodes along the edges of zone 1202. This is indicated by the inconsistent color between boundary nodes further away from and closer to the center of the zone. Similarly, with zone 1202 being long and slender, boundary nodes located in the middle section are closer to the center of the zone and therefore have greater value for $$\frac{1}{d^2}$$

while boundary nodes on me ends of zones 1202, bounded by dashed lines, are further away and have smaller value for $$\frac{1}{d^2}.$$

In embodiments, wherein the control system of the robotic device uses the order of zone coverage to compute the numerical value of each node in ∂A, nodes closer to the previous or next zone to be covered increase the numerical value of each node in ∂A. An order score may be calculated by the control system of the robotic device using, for example, the following equation $$c\left(\frac{1}{az+1} + b\right)$$

wherein a, b, c are constants and $$z = \frac{x - x_{min}}{x_{max} - x_{min}}$$

wherein x is the distance between the boundary node of interest and the closest boundary node in the next zone to be covered, $x_{min}$ is the distance between the closest boundary nodes between the current zone and the next zone to be covered while $x_{max}$ is the distance between the furthest boundary nodes between the current zone and the next zone to be covered. In some embodiments, the order score is then computed by the control system, with z calculated using the current zone and previous zone covered and the order score calculated using the next zone to be covered and previous zone covered are combined by the control system. The constant a controls how sharp the drop of the function is between $x_{min}$ and $x_{max}$, b shifts the entire function along the y axis such that the threshold for assigning negative score may be controlled and c scales the value of the function.

Figure 13:
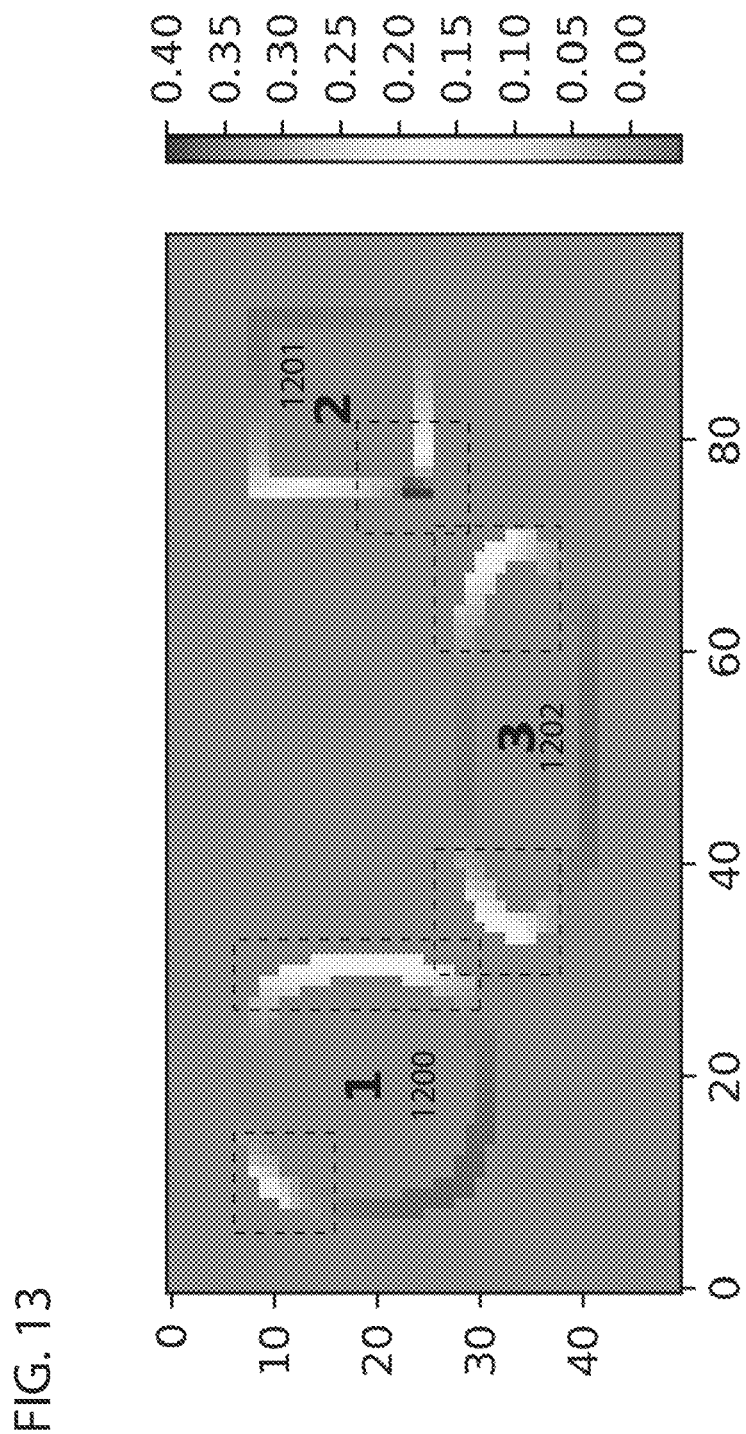
FIG. 13 illustrates an example measure for order of zone coverage used in assigning a numerical value to boundary nodes of a zone, in accordance with some embodiments.

FIG. 13 illustrates the order score for boundary nodes of zones 1200, 1201, and 1202 with same start and end point 1203 (FIG. 12A). The constants used in the illustrated example are a=15, b=−0.2, c=0.1. Boundary nodes of each zone closer to the previous zone covered (or start point) and next zone to be covered (or end point), bounded by dashed lines, have greater score. In some embodiments, individual scores based on growth and decay of the zone, distance of the node from the center of the zone and order of zone coverage are combined by the control system to determine overall numerical value of each node in ∂A, wherein areas of zone A containing nodes with high numerical value indicate expansion while those containing nodes with low numerical value indicate contraction. However, in some embodiments the result produced by the control system may be segmented and have non-smooth borders. Therefore, in embodiments a surface smoother score may also be used by the control system in determining the numerical value of each node in ∂A. For each node in ∂A, a local 3-by-3 grid may be used by the control system, wherein for example, the node is at the center of the grid. In some embodiments, other grid sizes may be used. The number of nodes within the grid within the same area (e.g. inner or outer boundary areas) as the boundary node of interest may be counted by the control system and the overall score of the boundary node may be multiplied by the counted number in order to smoothen boundaries. In some embodiments, the control system of the robot may determine the numerical value of each node in $\partial A$ of zone A by combining scores for growth and decay of the zone, distance of the node from the center of the zone, order of zone coverage and surface smoother.

Figure 14A:
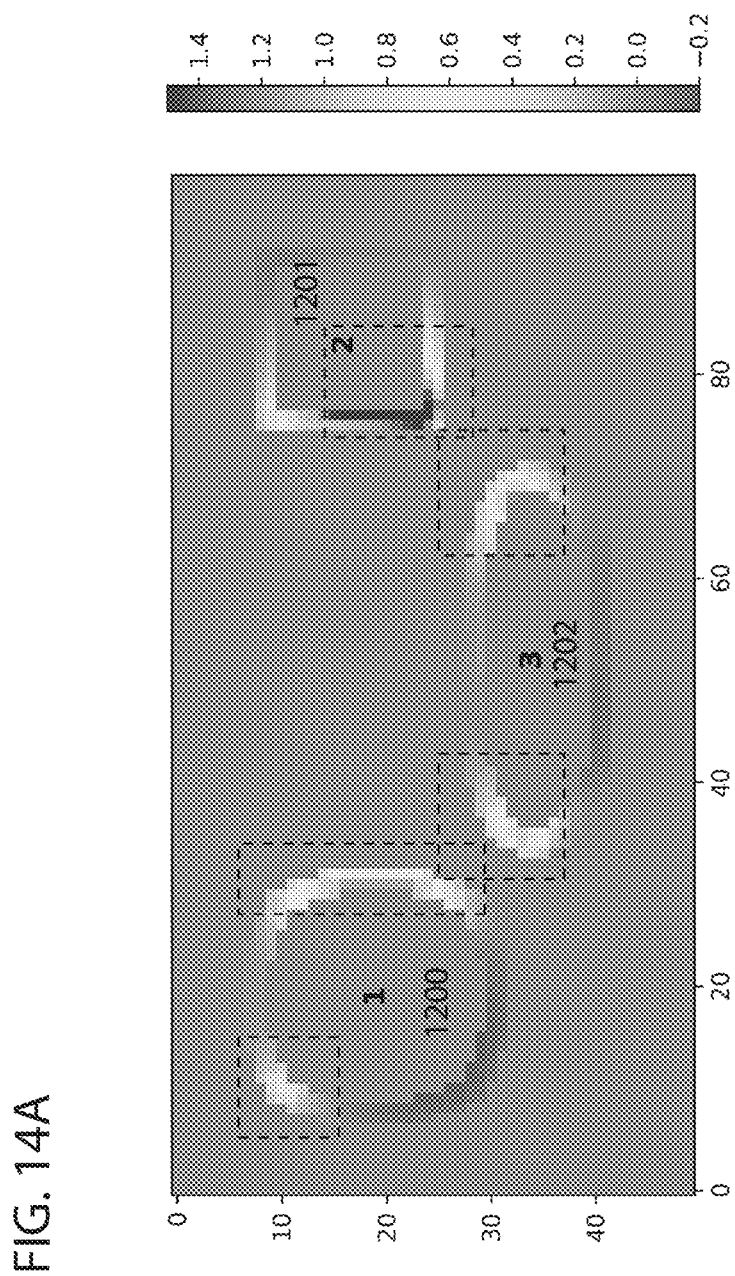
FIGS. 14A and 14B illustrate example numerical values of boundary nodes of zones and expansion/contraction of zones based on magnitude of numerical values of boundary nodes, in accordance with some embodiments.

For example, FIG. 14A illustrates numerical values of boundary nodes for zones 1200, 1201 and 1202 with start and end point 1203 (FIG. 12A) computed by the control system of a robotic device by combining scores for growth and decay of the zone, distance of the node from the center of the zone, order of zone coverage and surface smoother. Areas of zones 1200, 1201, and 1202 containing nodes with high numerical value, bounded by dashed lines, indicate expansion while nodes in other areas with low numerical value indicate contraction. For example, boundary nodes with numerical value less than some value may be removed by the control system while those with numerical value above some value may be added. In this way, the control system may expand a zone A in size by adding nodes from $\partial A^{out}$ (outer boundary nodes) to zone A and may reduce its size by removing nodes in $\partial A^{in}$ (inner boundary nodes) from zone A. Some embodiments may iteratively make such adjustments until a stopping condition, such as an equilibrium, is detected.

Figure 14B:
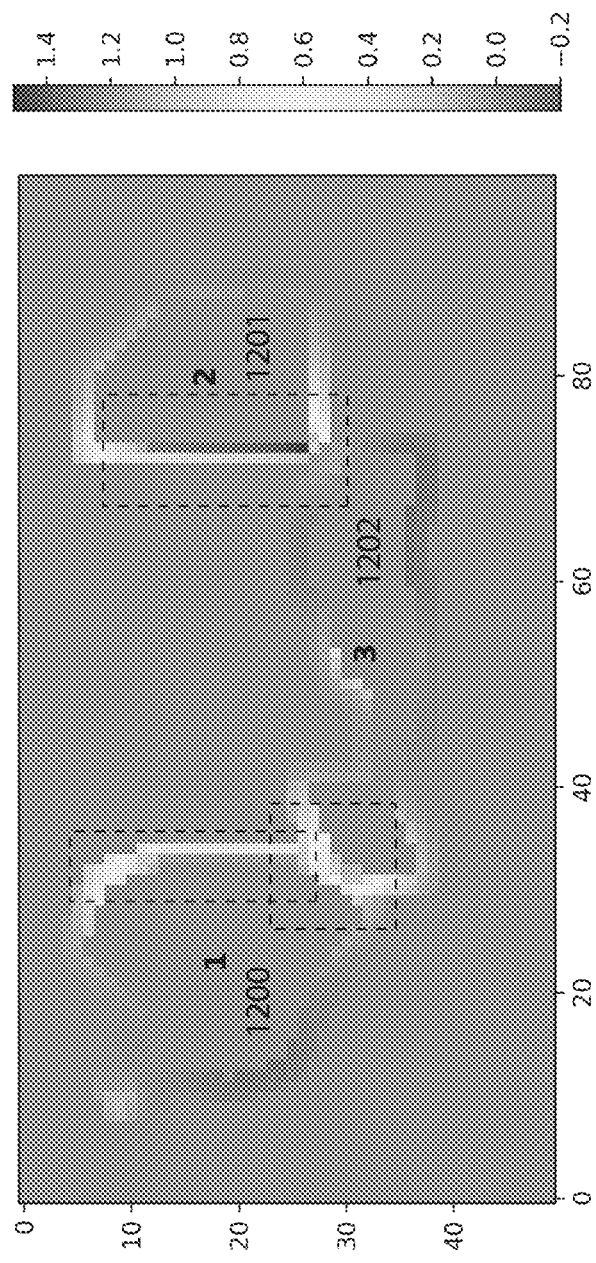

The expansion and contraction are depicted in FIG. 14B as areas of zone 1200, 1201, and 1202 containing nodes with high numerical values as shown in FIG. 14A have expanded after several iteration steps while those with low numerical values have contracted. This allows ordered zones to come closer together to reduce travel distance between sequentially ordered zones while expanding to cover more area of the workspace. Areas of zones 1200, 1201, and 1202 bounded by dashed lines in FIG. 14B contain boundary nodes with high numerical value therefore the control system will continue to expand those areas with more iterations while areas with boundary nodes with low numerical value will contract. In embodiments, additional functions may be used by the control system of the robotic device to improve performance of zone optimization such as discover, delete and aggressive growth functions described earlier. Furthermore, additional features may be used in computing the numerical value of boundary nodes, which is not to suggest that other descriptions are limiting.

In some embodiments, a control system of a robotic device may determine the best division of a workspace by minimizing a cost function defined as the difference between theoretical (e.g., modeled with uncertainty) area of the workspace and the actual area covered. The theoretical area of the workspace may be determined by the control system using a map of the workspace. The actual area covered may be determined by the control system by recorded movement of the robotic device using, for example, an odometer or gyroscope. In embodiments, the control system may determine the best division of the workspace by minimizing a cost function dependent on a path taken by the robotic device comprising the paths taken within each zone and in between zones. The control system may restrict zones to being rectangular (or having some other defined number of vertices or sides) and may restrict the robotic device to entering a zone at a corner and to driving a serpentine routine in either x- or y-direction such that the trajectory ends at another corner of the zone. The cost associated with a particular division of a workspace and order of zone coverage may be computed as the sum of the distances of the serpentine path travelled for coverage within each zone and the sum of the distances travelled in between zones (corner to corner).

Figure 15:
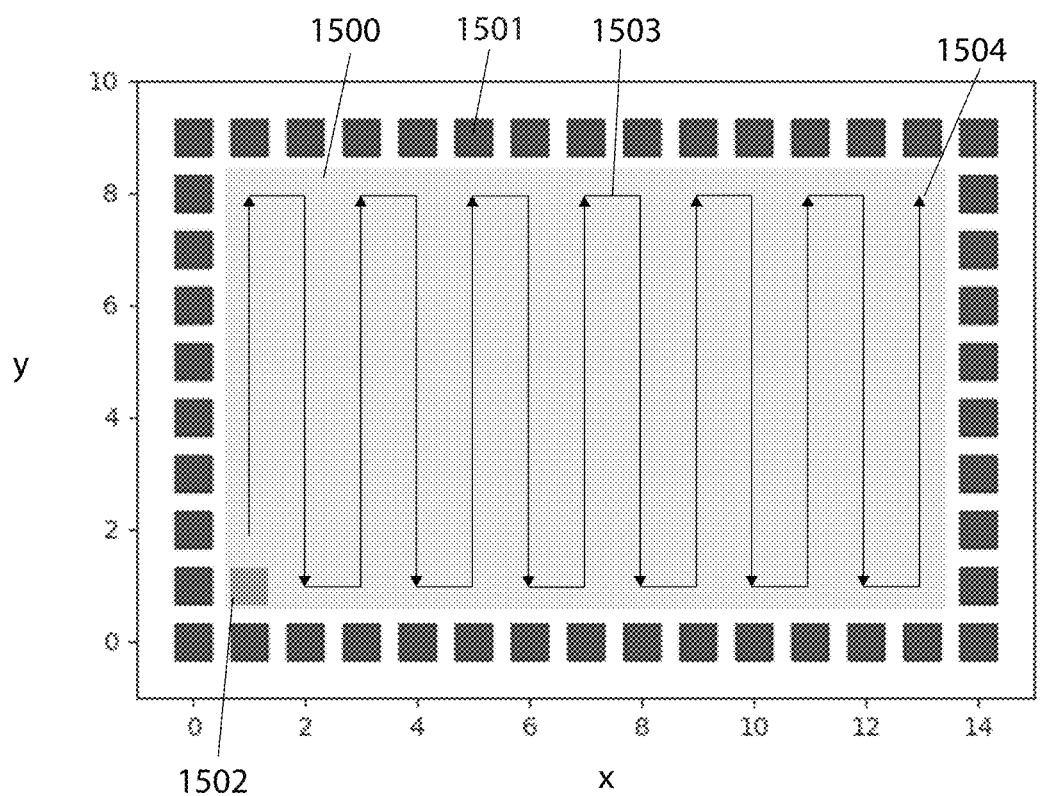
FIGS. 15-18B illustrate patterns followed by embodiments implementing a method for optimizing surface coverage of a workspace with rectangular zones, in accordance with some embodiments.

For example, FIG. 15 illustrates an example of rectangular zone 1500 of the workspace with perimeter 1501. Each square division may represent a single unit and may be used by the control system to compute distance travelled within the zone. From starting position 1502 at the lower left corner the robotic device may follow serpentine path 1503 to position 1504 at the top right corner of the zone. Assuming zone 1500 is the only zone of the workspace, the robotic device returns back to initial position 1502. The control system computes the distance of serpentine path 1503 and the return path to position 1504 as 122 units and assigns the cost to this particular division of the workspace and order of zone coverage. In some cases, a portion of the area of a zone is covered with a serpentine path, e.g., some embodiments may navigate around some or all of a perimeter of a zone before covering the interior with a serpentine path. To minimize cost function and improve surface coverage efficiency zones may be further divided, merged, reordered for coverage and entry/exit points of zones may be adjusted. In some embodiments, the control system of the robotic device may initiate these actions at random or may target them. In some embodiments, wherein actions are initiated at random (e.g., based on a pseudorandom value) by the control system, the control system may choose a random action such as, dividing, merging or reordering zones, and perform the action. The control system may then optimize entry/exit points for the chosen zones and order of zones. A difference between the new cost and old cost may be computed as $\Delta$=new cost−old cost by the control system wherein an action resulting in a difference <0 is accepted while a difference >0 is accepted with probability $\exp(-\Delta/T)$ wherein T is a scaling constant. Since cost, in some embodiments, strongly depends on randomly determined actions the control system of the robotic device, embodiments may evolve 10 different instances and after a specified number of iterations may discard a percentage of the worst instances.

Figure 16A:
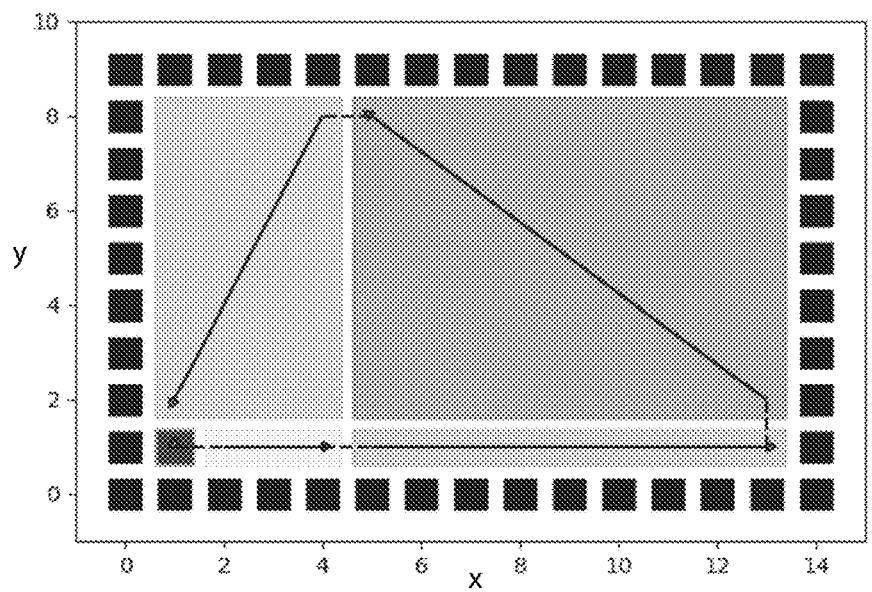
Figure 16B:
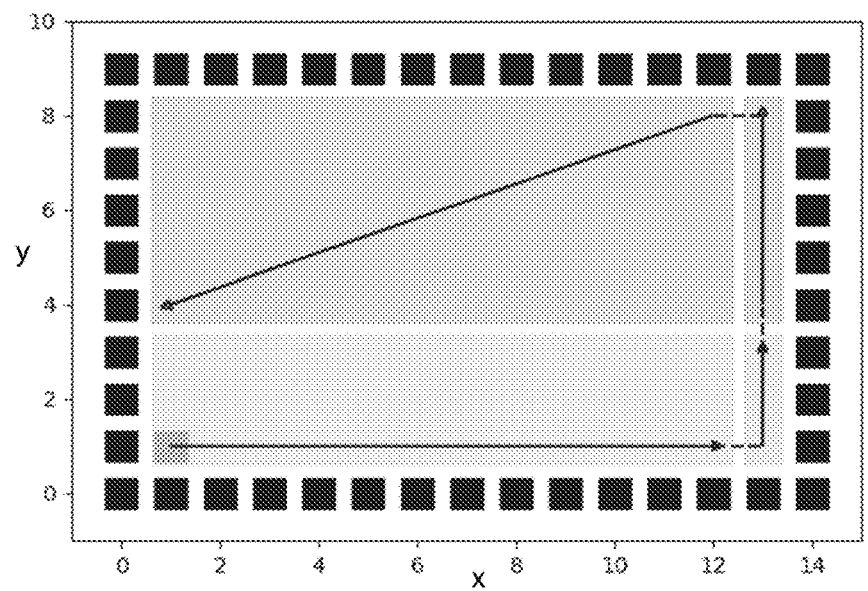
Figure 16C:
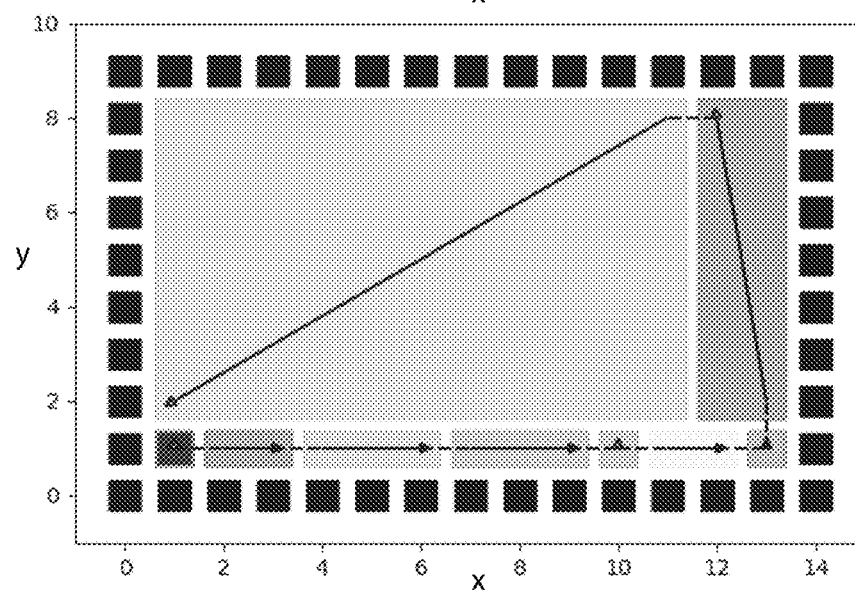
Figure 17:
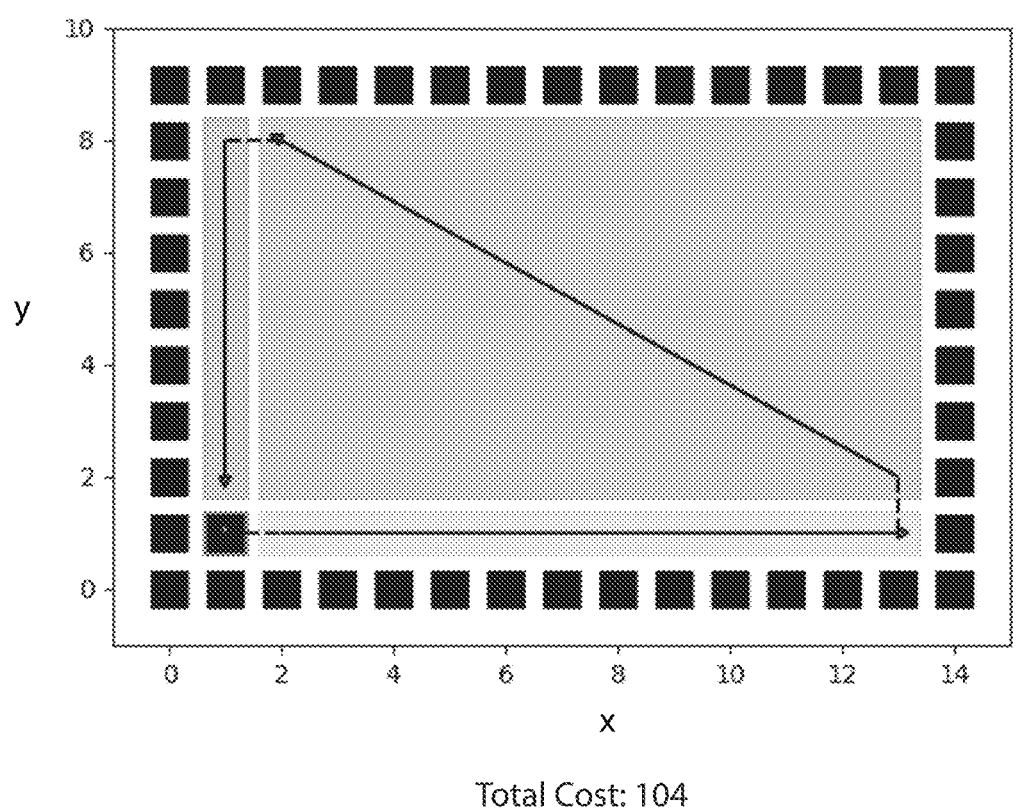
Figure 18A:
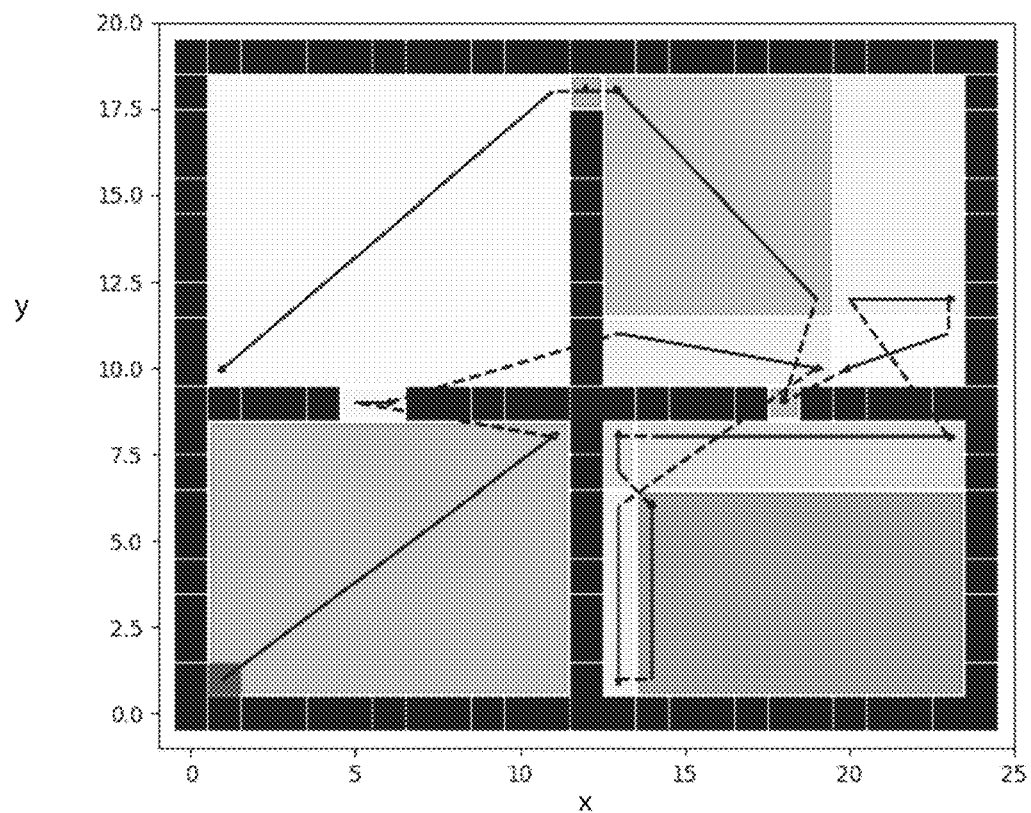
Figure 18B:
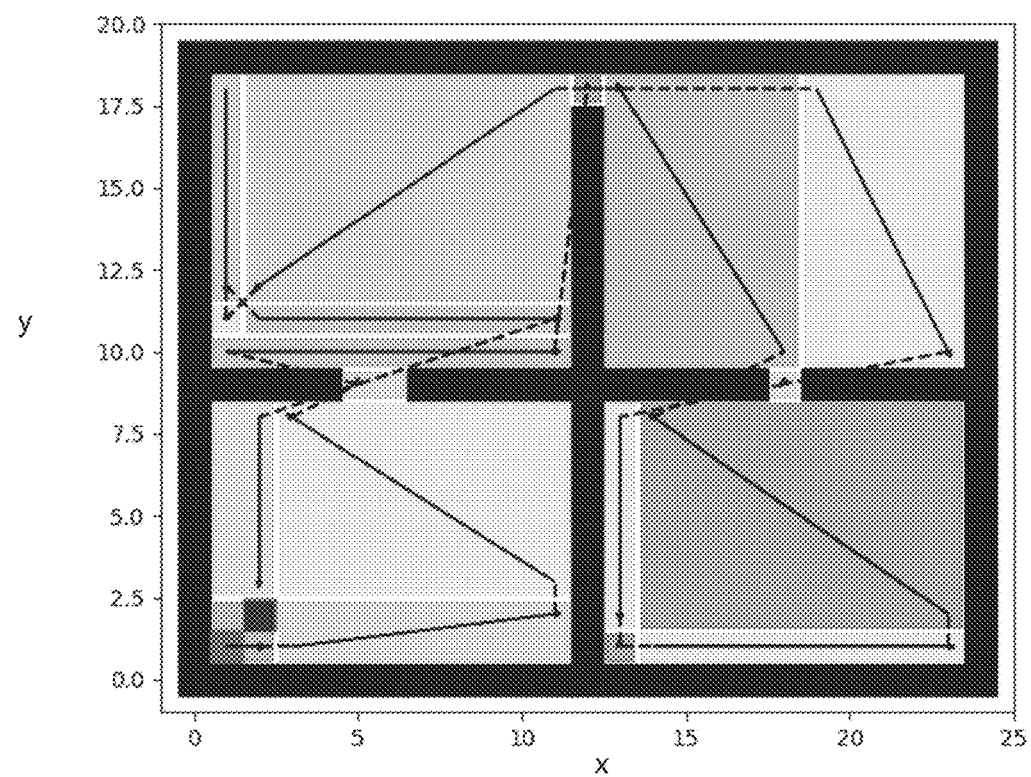

In embodiments, the control system may actuate the robotic device to execute the best or a number of the best instances and calculate actual cost. For example, FIG. 16A illustrates a random action approach to minimizing the cost function resulting in improved division and order of zones of the same workspace shown in FIG. 15. Rectangular divisions indicate different zones and arrows indicate order of coverage of the zones as well as entry and exit points of each zone. Serpentine coverage of each zone is not shown, but may be implemented. The new cost is 104 as compared to 122 for the zone coverage in FIG. 15 and avoids repeat coverage of areas. FIGS. 16B and 16C illustrate other instances resulting from random action approach to minimizing the cost function, with cost 106 and 104, respectively. In embodiments, wherein actions are targeted, the control system may find the greatest cost contributor, such as the largest travel cost, and initiate a targeted action to reduce the greatest cost contributor. For example, FIG. 17 illustrates a targeted action approach to minimizing the cost function wherein greatest cost generator in FIG. 15, caused by travel distance from end point 1503 back to starting position 1501, is identified and eliminated by the control system resulting in improved division and order of zones of the same workspace. The new cost is 104 as compared to 122 for zone coverage shown in FIG. 15 and avoids repeat coverage of areas. In embodiments, random and targeted action approaches to minimizing the cost function may be applied to workspaces comprising multiple rooms by the control system of the robotic device. For example, FIGS. 18A and 18B illustrate zone division and order of zone coverage of a workspace comprising four rooms determined by the control system from minimizing the cost function by random and targeted action approaches, respectively. Arrows illustrate the order of zone coverage and entry/exit points of each zone. Serpentine paths within each zone are not illustrated. In embodiments, the control system may directly actuate the robotic device to execute coverage for a specific division of the workspace and order of zone coverage without first evaluating different possible divisions and orders of zone coverage by simulation. In embodiments, the control system may determine the best division of the workspace by minimizing a cost function comprising some measure of the theoretical area of the workspace, the actual area covered, and the path taken by the robotic device within each zone and in between zones.

Figure 19A:
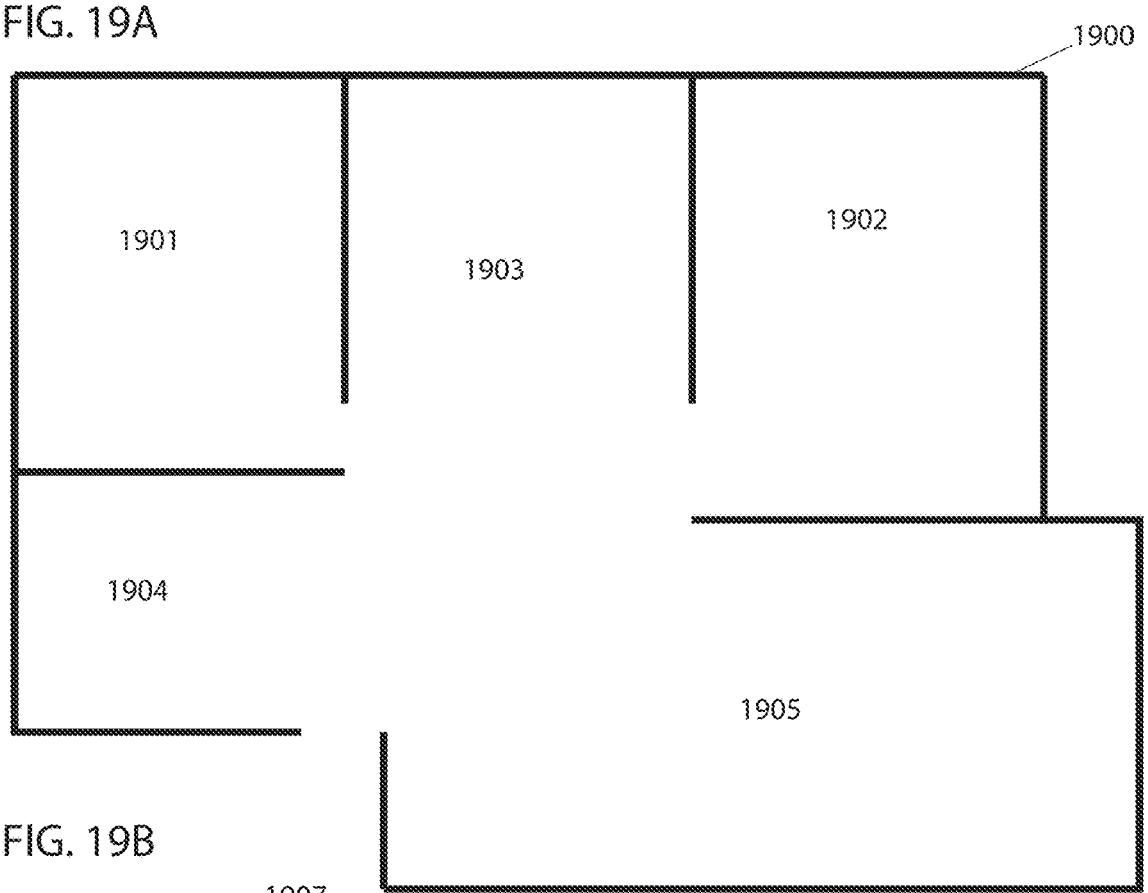
FIG. 19A-19C illustrates optimization of zone division and order of zone coverage of a workspace, in accordance with some embodiments.
Figure 19B:
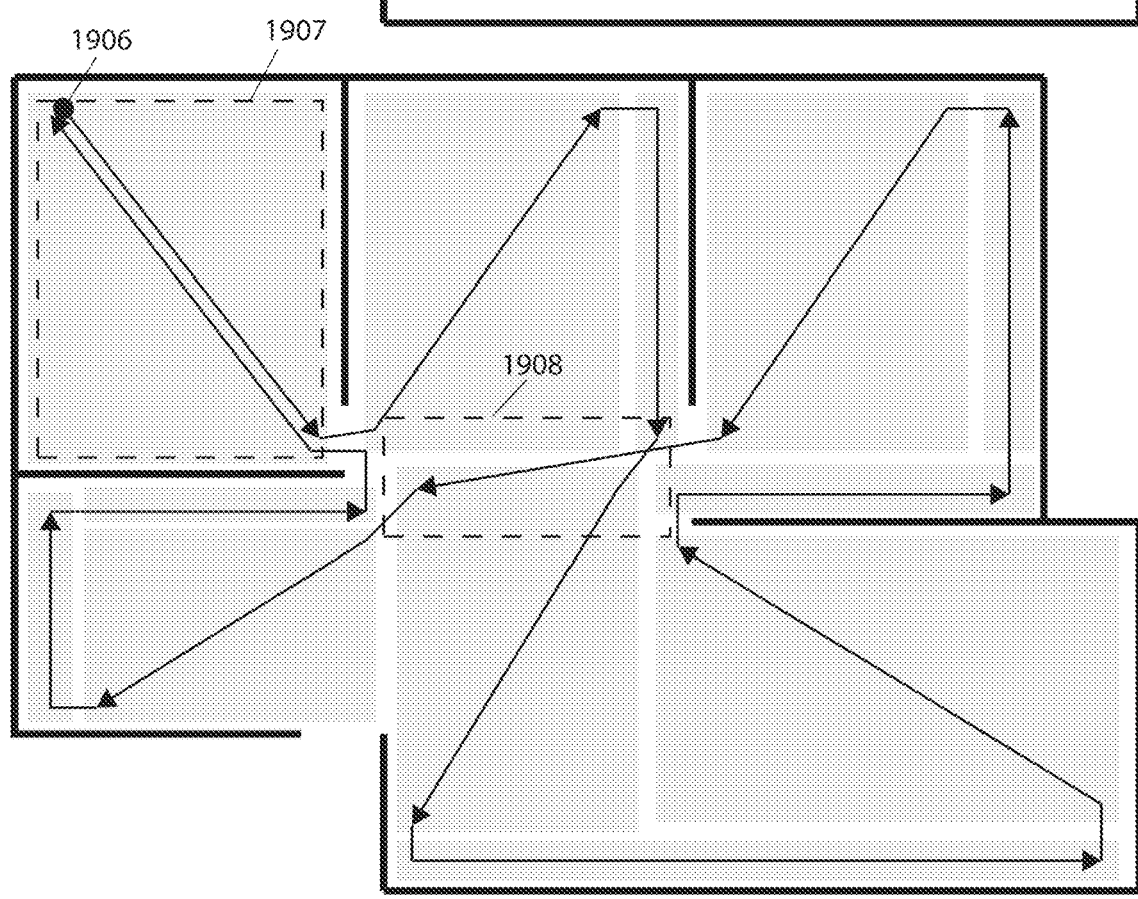
Figure 19C:
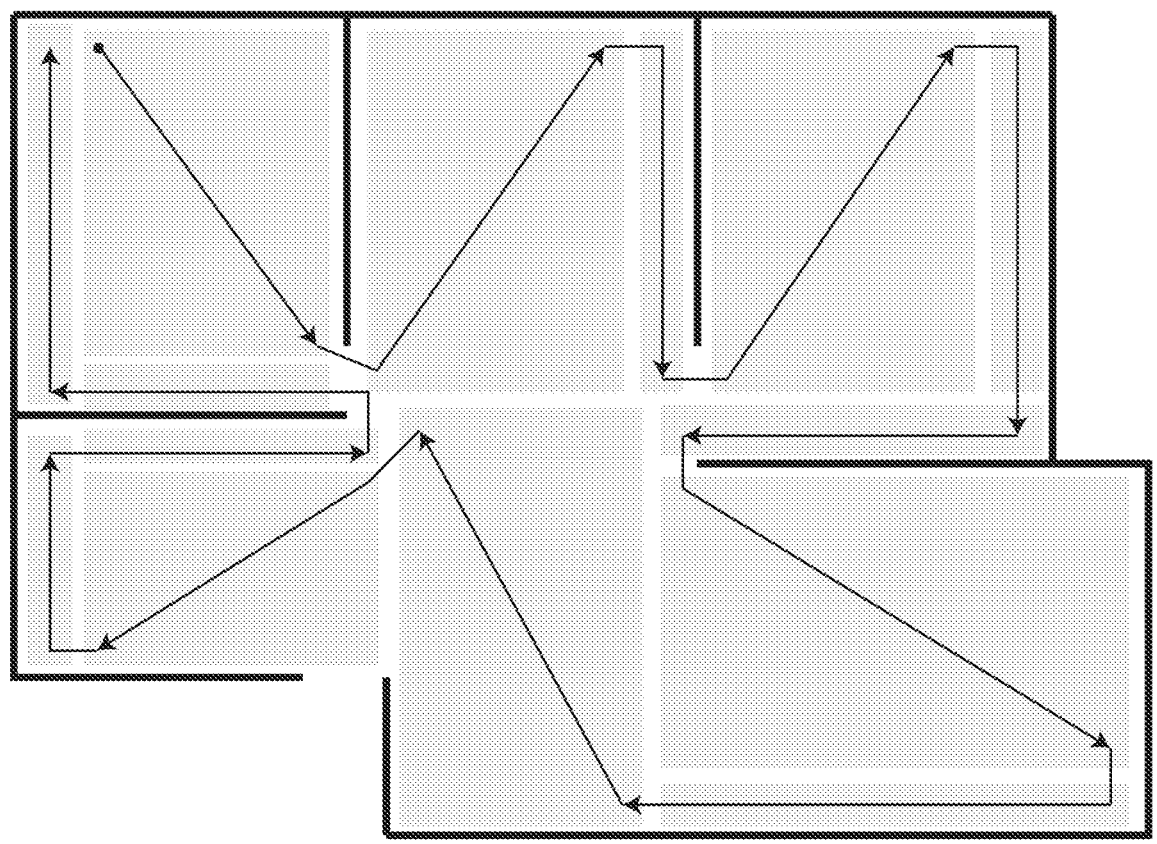

In embodiments, a control system of a robotic device may evaluate different divisions of a workspace while offline. For example, workspace 1900 in FIG. 19A includes bedrooms 1901 and 1902, living room 1903, entry area 1904 and kitchen/dining area 1905. While offline, the control system may initially divide and order zones of workspace 1900 for coverage as shown in FIG. 19B, wherein zones are shown by rectangular divisions and the order of zone coverage as well as entry/exit points of each zone is indicated by arrows with starting position 1906. Before starting coverage of workspace 1900 the control system may iterate through divisions of the workspace and order of zone coverage to find the division and order of zone coverage that optimizes (e.g., locally or globally) the route for an objective function like those described above. For example, the order of zone coverage in FIG. 19B is not efficient as the robotic device would need to back track resulting in repeat coverage in areas within dashed lines 1907 and 1908. The control system may iterate and divide and order zones of the workspace for coverage as shown in FIG. 19C, wherein back tracking and hence repeat coverage of areas is minimized.

In some embodiments, the control system of the robotic device may divide the workspace into zones using one or more generated points on the map of the workspace. In some embodiments, each zone may be considered a zone having a subset of the plurality of cells as described herein. In some embodiments, the control system positions points at strategic locations, such as at the interface between a wall and a door, along a wall, adjacent to furniture, or at locations adjacent to other possible dividers within the workspace. Such strategic locations may be selected with a variety of techniques. Some embodiments may iteratively shift a perimeter of a map inward until edges make contact and designate the source locations of the perimeter on the original map for the points of contact as strategic locations. Some embodiments may select an arbitrary vertex (e.g., one with a largest or smallest value of one or more coordinates) of a perimeter of a map (which may include multiple nested perimeters in some cases, and some embodiments may repeat this process for each perimeter). Some embodiments may then traverse the perimeter in a clockwise direction and designate vertices as convex or concave based on whether the vertex is a turn to the right (e.g., convex) or left (e.g., concave), or vice versa for counter clockwise transits. Right and left turns may be determined based whether an angle of the vertex is greater or less than 180 degrees. Some embodiments may select strategic points based on whether vertices are concave, e.g., by selecting the concave vertices or selecting a subset of the concave vertices more than a threshold distance from an adjacent convex vertex. In some embodiments, the points are randomly positioned within the workspace. In some embodiments, for each generated (or otherwise selected, e.g., with the aforementioned techniques) point, the control system of the robotic device measures (e.g., determines from the map) distances from the point to perimeters of the workspace (e.g., of a ray extending from the point) within a 360-degree angular range. In some embodiments, for each point, the control system compares measured distances within the 360-degree range and selects the perimeter location closest to the respective point (e.g., a point where a shortest ray intersects the perimeter). In other instances, other factors are considered in selecting the line used to divide the workspace. For example, the control system may consider (e.g., perform computations based on) the size and/or shape of the zone created (e.g., some embodiments may constrain the aspect ratio or cumulative area to less than a maximum value or more than a minimum value). In some embodiments, the control system measures distances from each point to perimeters of the workspace within any angular range between 0 to 360 degrees. In some embodiments, the control system generates a line from each respective point to the chosen perimeter location, thereby dividing the workspace into zones. Some embodiments may divide the workspace into zones that are meaningful to a human (as opposed to arbitrary division of spaces into something like grid squares), e.g., some embodiments may segment spaces in maps into rooms, like areas separated from other areas by a doorway, areas a perimeter of a map indicates have distinct geometries (like those separated from other such areas by narrowing areas of the perimeter), and areas in which internal obstacles indicate have a distinct function (like obstacles in the form a dining table and chairs that indicate a dining room). In some embodiments, a variety of other techniques may be implemented to partition a plane in such a manner, e.g., with a Voroni plane partition seeded by points determined to be furthest from perimeters and each other, or with various other morphological segmentation techniques used in computer vision based on erosion and dilation of map features until openings or closings are detected. In some cases, areas may be divided hierarchically, e.g., with sub-areas corresponding to different uses detected with the techniques above, like into a tree with 2, 3, 4, or more levels of hierarchy.

Figure 20A:
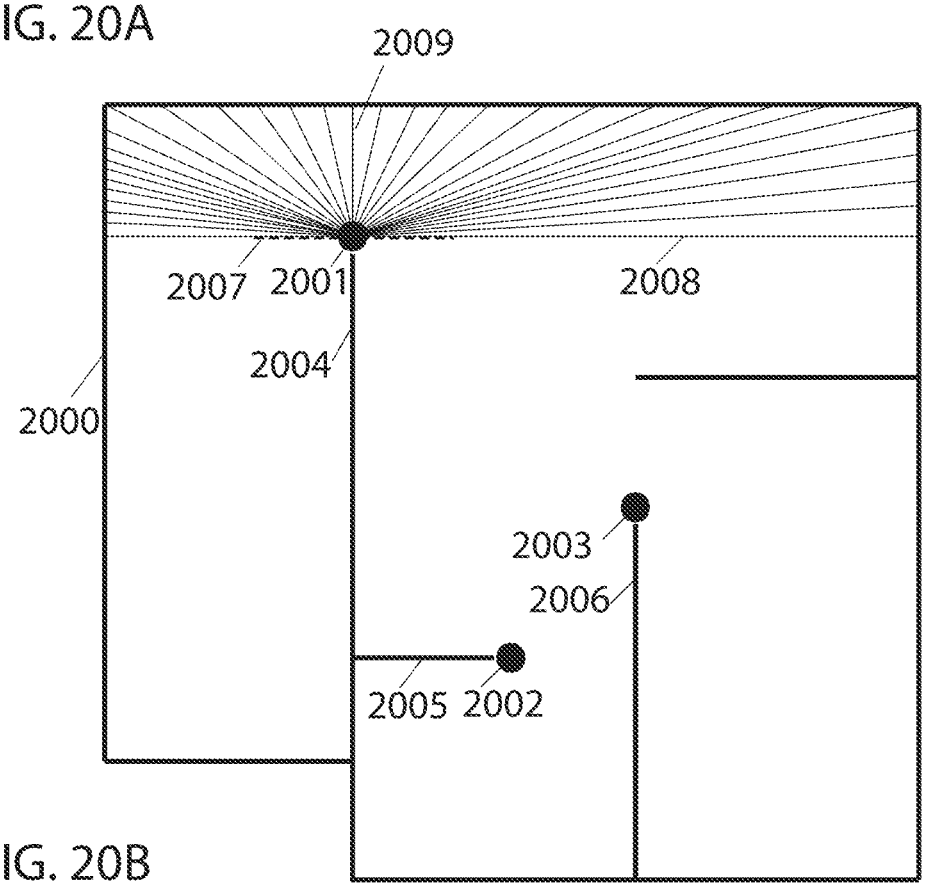
FIGS. 20A and 20B illustrate an example of a method for dividing a workspace into zones, in accordance with some embodiments.
Figure 20B:
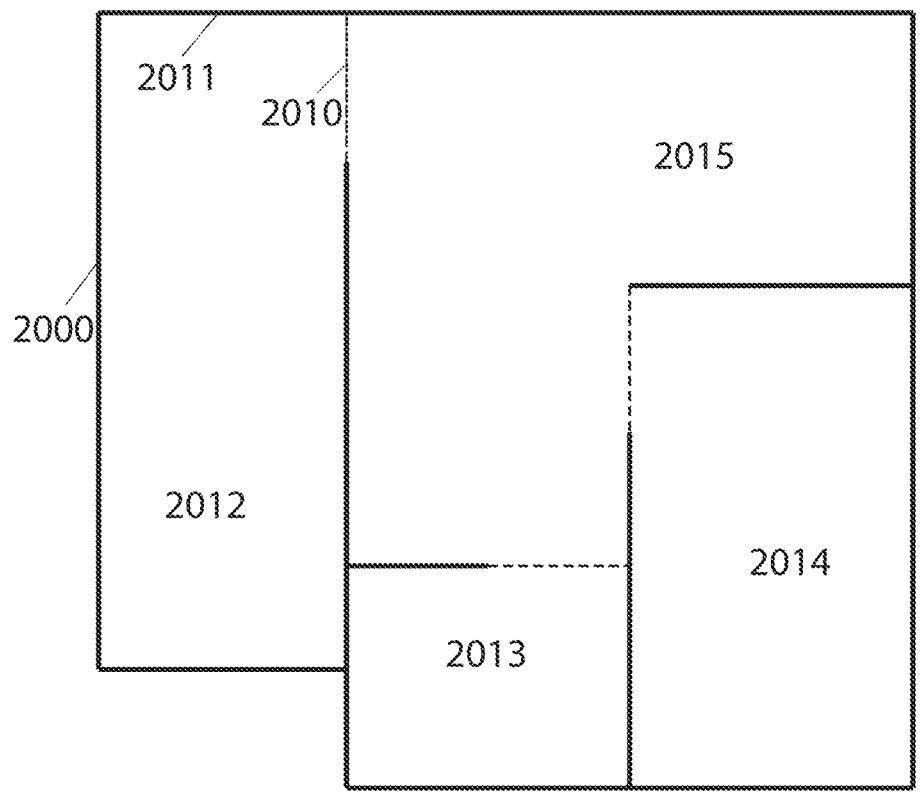

For example, FIG. 20A illustrates a map of a workspace 2000 with points 2001, 2002, and 2003 strategically located at the end of perimeter lines 2004, 2005, and 2006, respectively, that interface with doors of the workspace. In this example, the control system generates a line 2007 perpendicular to the respective perimeter line 2104 and calculates distances 2008 from the respective point 2001 to perimeters of the workspace within a 180-degree angular range spanning the side of the perpendicular line 2007 that is facing towards the opening in the perimeter. Given that the points are generated at interfaces between walls and doors, measuring distances on the other side of the perpendicular line are not considered because unfavorable zones are likely to result. The control system, chooses the smallest measured distance 2009 and divides the workspace by creating a line 2010 connecting the point 2001 to the perimeter line 2011, corresponding with the smallest measured distance, as shown in FIG. 20B. The same method is executed for points 2102 and 2103, resulting in the workspace divided into zones 2012, 2013, 2014, and 2015. In some embodiments, the control system divides the workspace into zones by creating lines in the map of the workspace at random. In some embodiments, the control system divides the workspace into zones by creating strategic lines in the map of the workspace, such as at gaps created by, for example, doors. In some embodiments, there is a predetermined minimum and maximum number of zones that can be created for a particular surface area. Further details of these methods for dividing a workspace into zones are described in U.S. Patent App. No. 62/590,205, the entirety of the contents of which are incorporated herein by reference. In some embodiments, the different possible divisions of the workspace are evaluated using the methods described herein. For example, zones (i.e., the placement of a points and the chosen perimeter locations to which the points are connected to create zones) may be chosen based on maximizing a reward (e.g., an aggregate score, like an ordinal or cardinal value) computed based on actual surface coverage, repeat coverage, total coverage time, travel distance between zones, etc., and the control system assigns the reward to a policy that includes (e.g., by having a copy of, or the same instance as discussed above of) the zones created (e.g. size, shape, location), the order in which they were covered and coverage path to determine the most optimal coverage of a workspace, as described above.

Embodiments of the method disclosed herein are expected to improve surface coverage of a workspace by a robotic device relative to conventional approaches by, for example, reducing repeat coverage of areas and/or by reducing total coverage time. Repeat coverage may occur when the robotic device travels from its end point in one zone to its starting point in the next zone. Repeat coverage may also occur as a result of movement noise wherein the actual position of the robotic device does not coincide with the position perceived by the control system of the robotic device. The robotic device moves in a continuous world; however, the map and sensors of the robotic device used by the control system in perceiving its position are subject to resolution and accuracy constraints in some cases. For example, the control system may perceive the position of the robotic device to be at a perimeter of a zone when in fact it is still positioned within the zone. This may lead to zones overlapping and repeat coverage. In some instances, the control system of the robotic device may be configured to actuate the robotic device to cover all areas of a workspace. For example, in cases wherein the position of the robotic device drifts and areas remain uncovered, the robotic device may be actuated by the control system to return and cover such areas. In some embodiments, the control system of the robotic device may include some degree of repeat coverage of areas by the robotic device to avoid uncovered areas in between zones.

In some embodiments, the control system of the robotic device may use distance sensors, LIDAR sensors, LADAR sensors, depth cameras or other types of sensors capable of perceiving the workspace to create a map of the workspace. In other embodiments, a map may be preloaded into a memory of the robotic device or may be created by an external component, such as a base station of the robotic device, and the map may be shared with the control system of the robotic device. In some embodiments, the control system of the robotic device may map the workspace while performing a task, such as cleaning. In some embodiments, the control system of the robotic device may first create a map prior to performing any tasks and may then improve the map in future runs while performing a task, which in some cases may provide for more efficient mapping. Upon completion of the map, the control system of the robotic device may provide notice to a user. Methods for constructing a map of the workspace include those described in U.S. patent application Ser. Nos. 16/048,179, 16/048,185, 16/163,541, 16/163,562, 16/163,508, 62/614,449, 62/618,964, 62/613,005, 62/599,216, 62/573,579, 62/573,598, 62/591,217, 62/573,591, 62/637,185, the entirety of the contents of which are incorporated herein by reference. For example, in some embodiments, the control system of the robotic device uses data from various sensors, such as cameras, LIDAR, and other depth sensing devices (or depth perceiving devices), to generate a map of the workspace. In some embodiments, a camera captures spatial data while the robotic device moves within the workspace. In some embodiments, the robotic device moves back and forth across the workspace in straight lines, such as in a boustrophedon pattern. In some embodiments, the camera captures spatial data while the robotic device rotates 360 degrees. In some embodiments, spatial data of the workspace are captured continuously as the robotic device moves around the workspace or rotates in one or more different positions in the workspace. In some embodiments, the camera captures objects within a first field of view. In some embodiments, the spatial data captured is a depth image, the depth image being any image containing data which may be related to the distance from the camera to objects captured in the image (e.g., pixel brightness, intensity, and color, time for light to reflect and return back to sensor, depth vector, etc.). In one embodiment, the camera measures vectors from the camera to objects in the workspace and the control system calculates the L2 norm of the vectors using $\|x\|_P=(\Sigma_i|x_i|^P)^{1/P}$ with P=2 to estimate depths to objects. In some embodiments, the camera rotates to observe a second field of view partly overlapping the first field of view and captures a depth image of objects within the second field of view (e.g., differing from the first field of view due to a difference in camera pose). In some embodiments, the control system compares the depth readings for the second field of view to those of the first field of view and identifies an area of overlap when a number of consecutive readings from the first and second fields of view are similar. The area of overlap between two consecutive fields of view correlates with the angular movement of the camera (relative to a static frame of reference of a room, for example) from one field of view to the next field of view. By ensuring the frame rate of the camera is fast enough to capture more than one frame of readings in the time it takes the camera to rotate the width of the frame, there is always overlap between the readings taken within two consecutive fields of view. The amount of overlap between frames may vary depending on the angular (and in some cases, linear) displacement of the camera, where a larger area of overlap is expected to provide data by which some of the present techniques generate a more accurate segment of the map relative to operations on data with less overlap. In some embodiments, the control system infers the angular disposition of the robotic device from the size of the area of overlap and uses the angular disposition to adjust odometer information to overcome the inherent noise of an odometer.

Prior to capturing images of objects within each new field of view and estimating depths, the control system may adjust previous readings to account for the measured movement of the robotic device as it moves from observing one field of view to the next (e.g., differing from one another due to a difference in camera pose). This adjustment accounts for the movement of the coordinate system observed by the camera with respect to a stationary coordinate system that may or may not coincide with the first field of view of the camera. In instances wherein the camera and robotic device move as a single unit, the observed coordinate system of the camera moves with respect to the stationary coordinate system as the robotic device moves. In some embodiments, a movement measuring device such as an odometer, gyroscope, optical flow sensor, etc. measures the movement of the robotic device and hence the camera (assuming the two move as a single unit) as the camera moves to observe new fields of view with corresponding new observed coordinate systems. In some embodiments, the control system stores the movement data in a movement vector and transforms all perimeter and object coordinates to correspond to, for example, the initial coordinate system observed by the camera coinciding with the stationary coordinate system. For example, in an embodiment wherein C is a stationary Cartesian coordinate system, C0 may be the observed coordinate system of the camera fixed to the robotic device at time t0 with state S and coinciding with stationary coordinate system C. The robotic device with attached camera displaces and the camera observes coordinate system C1 at time t1 with state S'. A movement measuring device measures the movement vector V with values (x, y, theta) and the control system uses the movement vector V to transform coordinates observed in coordinate system C1 to corresponding coordinates in coordinate system C0, coinciding with static coordinate system C. The movement vector V allows all coordinates corresponding to different coordinate systems to be transformed to a single coordinate system, such as the static coordinate system C, thereby allowing the entire perimeter and objects to correspond to a single coordinate system. Some embodiments of the present techniques reduce a non-trivial problem to simple addition of vectors. Embodiments of this approach may be a lossy compression of the state world; but, by adjusting resolutions and creatively using mathematical estimations, acceptable results may be achieved for most home environments. With a holistic, stationary, or global coordinate system in which the camera of the robotic device observes a local coordinate system, a function that relates the local observations of the camera to the stationary or global observation may be created. A challenge may be estimating a reliable function that can provide high accuracy. For example, accounting for scenarios wherein the surface on which the robotic device operates is unlevelled whereby the odometer may measure a depth greater or smaller than the true 2D displacement. Methods for eradicating such issues include the control system monitoring declining depth measurements as a depth measurement device of the robotic device moves towards a stationary object. If the steady decline of measurements is interrupted by a predetermined number of measurements that are a predetermined percentage greater than the measurements immediately before and after the interruption, the control system discards the interrupting measurements.

In some embodiments, the control system identifies (e.g., determines) an area of overlap between two fields of view when (e.g., during evaluation a plurality of candidate overlaps) a number of consecutive (e.g., adjacent in pixel space) readings from the first and second fields of view are equal or close in value. Although the value of overlapping readings from the first and second fields of view may not be exactly the same, readings with similar values, to within a tolerance range of one another, can be identified (e.g., determined to correspond based on similarity of the values). Furthermore, identifying matching patterns in the value of readings captured within the first and second fields of view may also be used in identifying the area of overlap. For example, a sudden increase then decrease in the readings values observed in both depth images may be used to identify the area of overlap. Other patterns, such as increasing values followed by constant values or constant values followed by decreasing values or any other pattern in the values of the readings, can also be used to estimate the area of overlap. A Jacobian and Hessian matrix may be used to identify such similarities. In some embodiments, thresholding may be used in identifying the area of overlap wherein areas or objects of interest within an image may be identified using thresholding as different areas or objects have different ranges of pixel intensity. For example, an object captured in an image, the object having high range of intensity, can be separated from a background having low range of intensity by thresholding wherein all pixel intensities below a certain threshold are discarded or segmented, leaving only the pixels of interest. In some embodiments, a metric, such as the Szymkiewicz-Simpson coefficient, may be used to indicate how good of an overlap there is between the two sets of readings. Or some embodiments may determine an overlap with a convolution. Some embodiments may implement a kernel function that determines an aggregate measure of differences (e.g., a root mean square value) between some or all of a collection of adjacent readings in one image relative to a portion of the other image to which the kernel function is applied. Some embodiments may then determine the convolution of this kernel function over the other image, e.g., in some cases with a stride of greater than one pixel value. Some embodiments may then select a minimum value of the convolution as an area of identified overlap that aligns the portion of the image from which the kernel function was formed with the image to which the convolution was applied. In some embodiments, the control system determines the area of overlap based on translation and rotation of the camera between consecutive frames measured by an inertial measurement unit (IMU). In some embodiments, the translation and rotation of the camera between frames is measured by two separate movement measurement devices (e.g., optical encoder and gyroscope of the robotic device) and the movement of the robotic device is the average of the measurements from the two separate devices. In some embodiments, the data from one movement measurement device is the movement data used and the data from the second movement measurement device is used to confirm the data of the first movement measurement device. In some embodiments, the control system uses movement of the camera between consecutive frames to validate the area of overlap identified between readings. Or, in some embodiments, comparison between the values of readings is used to validate the area of overlap determined based on measured movement of the camera between consecutive frames.

One example identifies an area of overlap using raw pixel intensity data and combines data at overlapping points. The overlapping area between a first image captured in a first field of view and a second image captured in a second field of view may be determined by comparing pixel intensity values of each captured image (or transformation thereof, such as the output of a pipeline that includes normalizing pixel intensities, applying Gaussian blur to reduce the effect of noise, detecting edges in the blurred output (such as Canny or Haar edge detection), and thresholding the output of edge detection algorithms to produce a bitmap like that shown) and identifying matching patterns in the pixel intensity values of the two images, for instance by executing the above-described operations by which some embodiments determine an overlap with a convolution. For example, a line of a number of pixels with high pixel intensity values (such as those above a certain threshold) may be identified in each image, indicating the same area of the workspace captured in each image. After identifying matching patterns in pixel intensity values in the first and second image, an overlapping area between both images may be determined. The images are combined at the overlapping area to form a larger image of the workspace. In some cases, data corresponding to the images may be combined. For instance, depth values may be aligned based on alignment determined with the image.

In some embodiments, the area of overlap between readings taken within the two field of views is estimated based on the measured movement of the robotic device and is used as a method of verifying the identified area of overlap. In some embodiments, measured movement may be used as the primary method of identifying the area of overlap. In some embodiments, devices such as an odometer, gyroscope, and optical flow sensor may be used to measure movement. For example, the angular displacement provided by an odometer and gyroscope and/or the mathematical convolution of the two may be used to estimate the area of overlap. In some embodiments, the readings from the odometer, gyroscope and optical sensor may be combined to produce more accurate readings, e.g., with data fusion techniques and a Kalman filter. Gyroscopes and odometers provide similar readings (e.g., in vector form indicating magnitude of distance and direction). However, since each measurement device is subject to a different type of noise and different errors, combining readings from both measurement devices through a mathematical process can produce more accurate readings. In some embodiments, the robotic device may have more than one movement measuring device in order to measure movement between each time step or fields of view observed. For example, the robotic device may have gyroscopes and odometers that simultaneously provide redundant information. In many implementations, only one set of information is used by the control system of the robotic device while the other is discarded. In other implementations, the control system combines the two readings by, for example, using a moving average (or some other measure of central tendency may be applied, like a median or mode) or a more complex method. Due to measurement noise, the type of measurement device used, etc. discrepancies between the measurements by a first device and a second device may exist and may not be the exact same. In such cases, the control system calculates movement of the robotic device by combining the measurements from the first and second device, or selects measurements from one device as more accurate than the others. For example, the control system may combine measurements from the first device and the second device (or measurements from more devices, like more than three, more than five, or more than 10) using a moving average (or some other measure of central tendency may be applied, like a median or mode). The control system may also use minimum sum of errors to adjust and calculate movement of the robotic device to compensate for the lack of precision between the measurements from the first and second device. By way of further example, the control system may use minimum mean squared error to provide a more precise estimate of the movement of the robotic device. The control system may also use other mathematical methods to further process measured movement of the robotic device by the first and second device, such as split and merge algorithm, incremental algorithm, Hough Transform, line regression, Random Sample Consensus, Expectation-Maximization algorithm, or curve fitting, for example, to estimate more realistic movement of the robotic device. In another embodiment, the control system may use the k-nearest neighbors algorithm where each movement measurement is calculated as the average of its k-nearest neighbors.

Due to measurement noise, discrepancies between the value of readings within the area of overlap from the first field of view and the second field of view may exist and the values of the overlapping readings may not be the exact same. In such cases, new readings may be calculated, or some of the readings may be selected as more accurate than others. For example, the overlapping readings from the first field of view and the second field of view (or more fields of view where more images overlap, like more than three, more than five, or more than 10) may be combined using a moving average (or some other measure of central tendency may be applied, like a median or mode) and adopted as the new readings for the area of overlap. The minimum sum of errors may also be used to adjust and calculate new readings for the overlapping area to compensate for the lack of precision between overlapping readings perceived within the first and second fields of view. By way of further example, the minimum mean squared error may be used to provide a more precise estimate of readings within the overlapping area. Other mathematical methods may also be used to further process the readings within the area of overlap, such as split and merge algorithm, incremental algorithm, Hough Transform, line regression, Random Sample Consensus, Expectation-Maximization algorithm, or curve fitting, for example, to estimate more realistic readings given the overlapping readings perceived within the first and second fields of view. The calculated readings are used as the new readings for the overlapping area. In another embodiment, the k-nearest neighbors algorithm can be used where each new reading is calculated as the average of the values of its k-nearest neighbors. Some embodiments may implement DB-SCAN on readings and related values like pixel intensity, e.g., in a vector space that includes both depths and pixel intensities corresponding to those depths, to determine a plurality of clusters, each corresponding to readings of the same feature of an object. In some embodiments, a first set of readings is fixed and used as a reference while the second set of readings, overlapping with the first set of readings, is transformed to match the fixed reference. In some embodiments, the control system expands the area of overlap to include a number of readings immediately before and after (or spatially adjacent) readings within the identified area of overlap.

Structure of spatial data may have various forms. For example, a matrix containing pixel position, color, brightness, and intensity or a finite ordered list containing x, y position and norm of vectors measured from the camera to objects in a two-dimensional plane or a list containing time-of-flight of light signals emitted in a two-dimensional plane between camera and objects in the workspace. For ease of visualization, data from which depth is inferred may be converted and reported in the format of millimeters or inches of depth; however, this is not a requirement, which is not to suggest that other described features are required. For example, pixel intensities from which depth may be inferred may be converted into meters of depth for ease of visualization, or they may be used directly given that the relation between pixel intensity and depth is known. To reduce computational expense, the extra step of converting data from which depth may be inferred into a specific format can be eliminated, which is not to suggest that any other feature here may not also be omitted in some embodiments. It is noted that each step taken in the process of transforming raw readings into a depth value in millimeters or inches is a loss and computationally expensive compression and further reduces the state space in each step when digitizing each quality. In order to reduce the loss and computational expenses, it is desired and useful to omit intermediary steps if the goal can be accomplished without them. Based on information theory principal, it is beneficial to increase content for a given number of bits. For example, reporting depth in specific formats, such as metric units, is only necessary for human visualization. In implementation, such steps can be avoided to save computational expense and loss of information. The amount of compression and the amount of information captured and processed is a trade-off, which a person of ordinary skill in the art can balance to get the desired result with the benefit of this disclosure. Depths may be perceived (e.g., measured or otherwise inferred) in any form and be reported in any format. The methods of perceiving or otherwise inferring depths and the formats of reporting depths used herein are for illustrative purposes and are not intended to limit the invention, again which is not to suggest that other descriptions are limiting.

In some embodiments, two classes of sensors are used, one acting as a predictor and the other confirming perimeter points of a work space. The predictor sensor predicts a specific coordinate as a perimeter point. The second set of sensors may either confirm or refute the prediction. For example, a predicted coordinate is proven to be false if the second set of sensors detects the robotic device occupying the area within which the coordinate is found. If the second set of sensors detects that coordinate is within an area the robotic device cannot access, the prediction is found true. In some embodiments, this is implemented with a low range sensor array. The second set of sensors may be, but is not limited to, a low range IR sensor, a distance sensor, a tactile sensor, a bumper sensor, or other types of sensors.

The control system of the robotic device may use the map of the workspace to autonomously navigate the workspace during operation. In some embodiments, the map (e.g., mapped, e.g., in vector or bitmap form) is stored in memory for future use. Storage of the map may be in temporary memory such that a map is only available during an operational session or in more permanent forms of memory such that the map is available at the next session or startup. In some embodiments, the map is further processed to identify rooms and other segments. In some embodiments, a new map is constructed at each use. In some embodiments, the map may be externally stored on another device such as the docking station or other base station of the robotic device or in the cloud (e.g., in memory of a server at a remote data center) or other remote storage device. In some embodiments, a map of the workspace may be, for example, a Cartesian coordinate map, a polar coordinate map, a homogenous coordinate map or various other types of coordinate system map.

In some embodiments, the control system of the robotic device determines a coverage path for each zone using methods such as those described in U.S. patent application Ser. Nos. 16/041,286, 15/406,890, 14/673,633, 16/163,530, and U.S. Pat. No. 9,764,472, the entirety of the contents of which are incorporated herein by reference. For example, In some embodiments, the control system of the robotic device generates a movement path in real-time based on the observed workspace. In some embodiments, the control system determines a movement path in real-time based on sensor observations captured by sensors. In some embodiments, a topological graph represents the movement path and is described with a set of vertices and edges, the vertices being linked by edges. Vertices may be represented as distinct points while edges may be lines, arcs or curves. The properties of each vertex and edge may be provided as arguments at run-time based on real-time sensory input of the workspace. The topological graph may define the next actions of the robotic device as it follows along edges linked at vertices. While executing the movement path, in some embodiments, rewards may be assigned by the control system as the robotic device takes actions to transition between states and uses the net cumulative reward to evaluate a particular movement path comprised of actions and states. A state-action value function may be iteratively calculated during execution of the movement path based on the current reward and maximum future reward at the next state. One goal is to find optimal state-action value function and optimal policy by identifying the highest valued action for each state. As different topological graphs including vertices and edges with different properties are executed over time, the number of states experienced, actions taken from each state, and transitions increase. The path devised by the control system of the robotic device iteratively evolves to become more efficient by choosing transitions that result in most favorable outcomes and by avoiding situations that previously resulted in low net reward. After convergence, the evolved movement path is determined to be more efficient than alternate paths that may be devised using real-time sensory input of the workspace. In some embodiments, the reward is determined individually for the robotic device, or the reward is a cumulative reward of each of the two or more robotic devices collaborating with another. For example, the movement path chosen for each of the two or more robotic devices collectively maximizes the cumulative reward. Further, the states, actions, and outcomes experienced by one robotic device may be shared with other robotic devices operating within the same workspace such that actions that resulted in poor outcome may be avoided. For example, if one robotic device finds that the action of transitioning to a particular state results in the robotic device becoming stuck, this information may be shared with other control systems of other robotic devices such that they may avoid that particular action.

In some embodiments, the properties of the vertices and edges of the topological graph describing the movement path of the robotic device may be provided at run-time as an argument based on sensory input of the robotic device or other collaborating robotic devices or from external sensors. A property of a vertex may be, for example, its position and the number and position of vertices linked via edges. A property of an edge may be, for example, edge type such as a line or arc, edge length or radius depending on edge type, angular orientation and connecting vertices. In some embodiments, vertices and edges may also include other properties such as driving surface type (e.g., gravel, paved, hard wood floor, carpet, tile, etc.), area identifier (e.g., excavation area, soil dump site, parking lot, highway, bedroom, kitchen, etc.) and/or driving conditions (e.g., maximum speed). In some embodiments, the number of roots or nodes of the topological graph is limited to one. A vertex designated as a root within the topological graph by the control system of the robotic device is capable of reaching the whole graph from the designated vertex, i.e. there is a path from the root to all other vertices and edges within the graph.

As the control system receives sensory input (from a local or remote sources), in some embodiments, it creates a representation of the map in a taxicab coordinate system and begins to devise a topological path within discovered areas, i.e. areas for which sensory input has been collected, the edges of the path being lines following along the gridlines of the taxicab coordinate system. Sensory input may be, for example, a collection of distance measurements. In some embodiments, distance measurements may be taken using distance measurement devices such as LIDAR, camera, laser, sonar, ultrasonic, stereo vision, structured light vision devices or chip-based depth sensors using CMOS or CCD imagers, IR sensors, and such. In some embodiments, other sensory input may be used, for example, data indicating driving surface type or obstacle detection. For example, optical driving surface sensors may detect a pattern of reflected light emitted onto the driving surface, which upon multiple stages of signal processing and machine learning embodiments may determine to a degree of certainty the type of driving surface upon which the robotic device drives. As a further example, obstacles may be detected by embodiments based on a sensed reflection of emitted light from an obstacle sensor. Tactile sensors may also be used by embodiments to provide sensory input to the control system when physical contact is made with an object. The devised topological path may be based on estimates of suitable properties for vertices and edges based on sensory input received. The next action or movement of the robotic device may be along a path defined by the estimated properties of the vertices and edges. As the robotic device executes the action, it transitions from its current state to a new state. After completing each action and transitioning to a new state, in embodiments, a reward may be assigned by the control system and a state-action value function may be iteratively calculated based on the current reward and the maximum future reward at the next state. In some embodiments, e.g., where time is not considered discrete, the value of the reward may be dependent on sequential time required to complete the action and transition to the new state, where a greater negative reward is assigned for longer times. As such, in some embodiments, the robotic device incurs a negative reward at all times. Since the robotic device is penalized for time, any event that may reduce the efficiency of the robotic device in terms of time to complete its task increases its overall penalty. These events may include collisions with obstacles, number of U-turns, repeat actions, driving distance, and driving on particular types of driving surfaces. In some embodiments, the control system uses these events to directly assign negative reward thereby acting as optimization factors themselves. In some embodiments, the control system uses other efficiency metrics, such as percentage or level of task completion. Once the robotic device completes its task and hence the topological movement path required to complete the task, a positive reward value (e.g., predetermined or dynamically determined) may be assigned. A net reward value for the executed movement path, consisting of a sequence of states and actions, may then be calculated as the sum of the cumulative negative reward from the multiple actions taken while transitioning from one state to another and the positive reward upon completion of the task. In some embodiments, the state is a collection of current states of two or more robotic devices collaborating with one another and the reward is a cumulative reward of each of the two or more robotic devices collaborating.

As multiple work sessions are executed over time, in embodiments, optimal state-action value function and optimal policy from which actions from different states are selected may be determined. From a single state, there may be several actions that may be executed. The sequence of states and actions that result in the maximum net reward, in some embodiments, provides the optimal state-action value function. The action from a state which results in the highest reward provides the optimal policy for the given state. As different movement paths are executed over time, the number of states experienced, actions taken from each state, and transitions increase. In some embodiments, the control system devises a path for the robotic device iteratively over multiple work sessions, evolving to become more efficient by choosing transitions that result in most favorable outcomes and by avoiding situations that previously resulted in low net reward. In some embodiments, properties for each movement path are selected within an assigned work cycle such that the cumulative penalty value for consecutive work cycles have a lowering trend over time. In some embodiments, convergence to a particular movement path may be executed by the control system of the robotic device when the reward is maximized or a target reward is achieved or a period of time has passed after which the control system may converge the movement path to the path with highest reward. After convergence, assuming the system did not fall into a local minimum or is able to get out of a local minimum, the evolved movement path may be deemed by the control system of the robotic device to likely be more efficient than alternate paths that may possibly be devised using real-time sensory input of the workspace.

The states and actions of the robotic device devising and executing the movement path may be represented by a Markov Chain comprised of a sequence of random variables $s_1, s_2, s_3, \ldots$. The random variables are states the robotic device may experience and form a set S called the state space. The topological graph defining the movement path of the robotic device may therefore be thought of as a sequence of states $s \in S$, where states are connected by paths and are each defined with a discrete time stamp $t \in T$. For the robotic device to transition from a current state s to next state s', the robotic device performs an action $a \in A$ over a time span of t to t', displacing a distance d along an edge of the topological graph. When the state space is defined by a taxicab coordinate system, the distance d is given by the rectilinear distance or L1 norm and displacement is along a line. For a Markov chain, having Markov property, the probability of moving to a next state $P(s'|s)$. is dependent only on the present state. A Markov chain may, therefore, be represented by a topological graph, where the edges of graph t are labelled by the probabilities of transitioning from one state at time t to another at time t'. A Markov chain may be extended to a Markov Decision Process (MDP) through the addition of actions (choices) and rewards (motivation), such that there are multiple actions that may be chosen from a single state and a different reward associated with each action. MDP is a five-tuple comprising a finite set of states S, a finite set of actions A, the probability that action a will lead to state s' at time t' given by $P(s'|s)$, the immediate reward after transitioning from state s to state s' given by r, and the discount factor $\gamma$, representing the difference in importance between future and present rewards. The goal of the MDP is to find an optimal state-action value function by identifying sequence of states and actions with highest net reward. Since multiple actions may be taken from each state, the goal is to also find an optimal policy that indicates the action from each state with the highest reward value.

In a MDP actions are taken to transition from one state to another and after transitioning to each new state a reward is assigned. For a sequence of states and actions, the net reward is the sum of rewards received for the sequence of states and actions, with future rewards discounted. The expected net reward for the execution of a sequence of states and actions is given by a state-action value function. The goal is to find an optimal state-action value function by identifying sequence of states and actions with highest net reward. Since multiple actions can be taken from each state, the goal is to also find an optimal policy that indicates the action from each state with the highest reward value. Consider a sequence of states s and actions a followed by rewards r, $s_t$, $a_t$, $r_{t+1}$, $s_{t+1}$, $a_{t+1}$, $r_{t+2}$, $s_{t+2}$, $a_{t+2}$, $r_{t+3}$, $\ldots a_T$, $r_T$, $s_T$. The net return $R_T = r_{t+1} + \gamma^1 r_{t+2} + \ldots + \gamma^{T-t-1} r_T$ to be expected in the future is the sum of the rewards received for the sequence of states and actions beginning from state $s_t$ and ending with terminal state $s_T$, wherein $0 \leq \gamma < 1$ is a discount factor applied as distant rewards are less important. The value of a state-action pair $Q(s, a) = E[R_T|s_t=s, a_t=a]$ is defined as equivalent to the expected return $R_T$ for the sequence of states and actions beginning with state $s_t$ and action $a_t$ and ending with terminal state $s_T$. By finding the sequence of states and actions which maximize the state-action value function $Q(s, a)$, the optimal value function $Q^*(s, a) = \max E[R_T|s_t=s, a_t=a]$ is identified. And the optimal policy $\pi^*(s) = \text{argmax } Q^*(s, a)$ for each state may be derived by identifying the highest valued action which can be taken from each state. To iteratively calculate the state-action value function for a given state s and action a, the Bellman Optimality equation may be applied. The optimal value function obeys Bellman Optimality equation and may be expressed as $Q^*(s, a) = E[r + \gamma \max Q^*(s', a')]$. The equation expresses that the value for a given state s and action a should represent the current reward r observed at state s plus the maximum discounted $\gamma$ future reward for the next state s' the robotic device would end up in. This equation can be used by the control system to iteratively calculate the state-action value $Q_{i+1}(s, a) = E[r + \gamma \max Q_i(s', a')]$ for a given state s and action a as the sequence of states and action are executed. i is the iteration number and begins at i=0, with $Q_0(s', a')$ being initially assumed based, for example, on previous experience, the midpoint of the min and max value possible, or an arbitrary value. Based on the definition of an expected value, the equation is equivalent to $Q_{i+1}(s, a) = \Sigma P(s'|s)[r + \gamma \max Q_i(s', a')]$, wherein $P(s'|s)$ is the probability that action a will lead to state s', as previously described above. In the particular application of determining optimal movement path, the sequence of states and actions corresponds to the states visited and actions taken while executing the movement path from start to finish, where actions are defined by the properties of vertices and edges chosen based on sensory input from sensors of the robotic device or sensors of other robotic devices or fixed sensing devices. Over time, as more states are visited and different actions from each state are evaluated the system will converge to find the most optimal action to take from each state thereby forming an optimal policy. Further, as different sequences of states and actions, i.e. movement paths, are evaluated over time, the control system will converge to the most optimal sequence of states and actions.

In another path planning example, space within the map may be marked as free where no obstacles are present, occupied where obstacles are detected, and unknown, where it is unknown if obstacles are present. The free space may be divided into a grid of predetermined cell size. The axis of the grid may be rotated until such a point as the maximum number of free cells result. In some embodiments, grid cells may be approximately two times the width of the robotic device or of a component thereof, for example, a vacuuming port. A first spanning tree may be constructed within the grid by connecting the centers of all free cells in a loop-free graph tree. That is, none of the branches of the graph tree are connected, or looped together. In some cases, any grid cells that are marked as unknown, partially free, and partially occupied may be discarded. In some embodiments, spanning trees may be constructed in such a way as to minimize the number of corners or turns found in a path resulting from following the outside edge of the spanning tree. The robotic device may be caused to drive along the outside edge of the spanning tree. While driving on the path, the control system of the robotic device monitors performance in various ways.

In some embodiments, the robotic device includes at least one touch sensor to detect collisions, and the control system counts the number of collisions incurred during each work session. The control system may also monitor the amount of area retraced (covered more than once) and the amount of area left uncovered (if any) by the robotic device. The control system may also monitor the amount of time to complete the entire path. Upon completion of the path, the monitored parameters may be saved into a database and associated with the particular spanning tree. A value of a particular spanning tree used may be quantified by using a positive and negative reward system. For instance, each time a touch sensor detects a collision, a negative reward may be assigned to the spanning tree in use. In a like manner, negative rewards may also be assigned for area retraced, area left uncovered, and time to complete the job. In some embodiments, the control system creates a new spanning tree for each new working session for a first predetermined number of working sessions, each new spanning tree with at least some variation from the previously used spanning trees. In this way, the control system may gain performance data about various surface coverage patterns. The control system may then compare the value of the particular spanning tree used in each working session and determine which spanning tree produced the best results (and thereby has the highest value). As the robotic device completes more workings sessions, each with different spanning trees, more data is gathered and a value is assigned to each spanning tree used. Once values have been assigned to spanning trees, the control system may determine a policy to maximize rewards. The control system may develop a policy which defines the best spanning tree yet discovered.

One example of a path planning method includes causing the control system to establish a zone; measuring distances to all obstacles in the zone thereby detecting all obstacles in the zone; establishing a coverage path that accounts for all detected obstacles; executing the coverage path such the robotic device covers the zone at least once; if a new obstacle is detected, establishing an adapted coverage path that accounts for the new obstacle; and executing the adapted coverage path. In some embodiments, methods further include bypassing the new obstacle; and returning to the coverage path. In some embodiments, a timer is activated after an obstacle is encountered, and the robotic device only reacts after the timer reaches zero. If the obstacle no longer obstructs the path after the timer reaches zero, the robotic device may continue its prior coverage path. In some embodiments, the control system creates virtual zones to divide the workspace into manageable areas that can be cleaned systematically. Each zone may be calculated by measuring the distance between the robotic device and all obstacles on relative axes (e.g., X, −X and Y, −Y axes), followed by creation of a virtual zone. In some cases, the robotic device rotates 360 degrees while capturing spatial data with the sensor before determining a zone. In some instances, the control system proceeds to determining a next zone without the robotic device performing any coverage in a current zone when the current zone is less than a predetermined size. In some cases, the coverage path within a zone includes a plurality of collision-free paths comprising a plurality of straight lines in a back and forth pattern. In some instances, the robotic device establishes its work from the center point of each zone before moving to a next adjacent zone, which promotes more efficient management of the surroundings. Minimum and maximum acceptable distance variables may be preprogrammed or manipulated by the user to divide the area into suitably-sized zones. Some embodiments include collision mitigation, or open surface recognition method, wherein the control system may consider the robotic device as the center of an imaginary circle. The control system may identify the radius of the circle as the smallest measured number before it detects an obstacle, and may then begin work within the circle with minimal or virtually no chance of colliding with other objects.

In another path planning example, the robotic device determines a movement path based on debris within the workspace. In some embodiments, the control system uses data from a debris sensor of the robotic device to determine which areas of the workspace have a higher likelihood of accumulating debris. In some embodiments, the control system associates a location of the robotic device with each reading of the debris sensor to determine to which area of the workspace the data belongs. In some embodiments, other information is associated with each debris sensor reading, such as date, time and type of debris (e.g., hair, food, dust, etc.). In some embodiments, the control system instructs the robotic device to perform cleaning in areas with higher levels of debris accumulation more frequently. In some embodiments, the frequency is proportional to the level of debris accumulation. In some embodiments, the control system may further infer the size and shape the debris collected. In some embodiments, the memory of the robotic device contains an internal database of types of debris likely to be encountered within the workspace. In some embodiments, the control system identifies the type of debris collected in the workspace by using the data of various sensors capturing the features of the debris (e.g., camera, pressure sensor, acoustic sensor, etc.) and comparing those features with features of different types of debris stored in the internal database. In some embodiments, the control system of the robotic device determines the likelihood of collecting a particular type of debris in different areas of the workspace based on, for example, current and historical data. In some embodiments, the control system determines if the type of debris encountered may be cleaned by the robotic device. In some embodiments, the control system of the robotic device incapable of cleaning the particular type of debris identified communicates with a control system or another robotic device capable of cleaning the debris. In some embodiments, the control system marks the level of debris accumulation expected in different areas of the workspace within the map based on, for example, current and historical data (e.g. sensor data, cleaning history, etc.). In some embodiments, the control system adjusts the level of debris marked within different areas of the map based on historical data on debris accumulation in the particular areas and/or cleaning history of particular areas (e.g., last time an area was cleaned). In some embodiments, the control system marks the type of debris expected in different areas of the workspace within the map based on, for example, current and historical data (e.g. sensor data, cleaning history, etc.). In some embodiments, the control system stores all or a portion of the data relating to debris accumulation collected and/or processed by the control system of the robotic device or control system of other robotic devices operating within the same workspace in the memory of the robotic device. In some embodiments, the control system determines a path and/or the order of areas to be cleaned and/or cleaning schedule and/or other instructions of the robotic device based on the estimated levels of debris accumulation in different areas of the workspace determined from all or a portion of the data relating to debris accumulation. In some embodiments, the control system prioritizes areas based on the type of debris. In instances wherein the cleaning time of the robotic device is limited, the control system of the robotic device prioritizes cleaning areas with higher levels of accumulated debris. In some embodiments, the control system determines the cleaning schedule based on the level of dust accumulation in different areas of the workspace. In some instances, the control system stores other information, such as, cleaning time, repeat coverage, date and time of cleaning an area, the number of times an area is cleaned, and the like, in the memory. In some embodiments, the control system uses such information to adjust the estimated level of dust accumulation or likelihood of different levels of dust accumulation in a particular area of the workspace. In some embodiments, the map includes information such as, likelihood of different levels of dust accumulation in different locations of the workspace, the likelihood of encountering different types of debris in different locations of the workspace, the frequency of encountering a particular level of debris accumulation and/or type of debris in different locations, and the date and/or time of encountering a particular level of debris accumulation and/or type of debris in different locations. In some embodiments, the map of is a grid map wherein the map is divided into cells, each cell representing a different area or location within the workspace. In some embodiments, the control system generates a new grid map with new debris-related information associated with each or a portion of the cells of the grid map at each work session. In some embodiments, the control system compiles the map generated at the end of a work session with an aggregate map comprised of a combination of maps generated during each or a portion of prior work sessions. In some embodiments, the control system uses information from the aggregate map when determining a cleaning path and/or work functions (or actions) and/or settings of the robotic device. Work functions (or actions) may include, but are not limited to, vacuuming, sweeping, mopping, UV treatment, etc. Settings may include, but are not limited to, speed of the robotic device, speed of brushes, speed of impeller, cleaning schedule, cleaning plan (e.g., which areas to clean), etc. In some embodiments, the control system or an application of a communication device instructs the robotic device to cover areas or cells with debris accumulation greater than a predetermined threshold one or more times during a cleaning session. In some embodiments, a robotic device may be controlled or directed to operate on a cell or in an area for a predetermined amount of time. In embodiments, the control system or an application of a communication device instructs the robotic device to operate on cells or areas of the workspace at a particular frequency (e.g., one, three, or five times a week).

In some embodiments, multiple robotic devices may be used to collaborate together in servicing one large workspace. An example of a method for collaboration between robotic devices is described in U.S. patent application Ser. Nos. 16/185,000, 15/048,827, 15/981,643, and 15/986,670, the disclosure of which is hereby incorporated by reference. For example, in some embodiments, collaborating robotic devices communicate their coverage matrices with one another. In some embodiments, robotic devices may avoid the areas already covered or to be covered by other robotic devices. Therefore, control systems of robotic devices may avoid creating zones that encompass areas already covered or selected by other control systems of robotic devices for coverage. The policy of a robotic device and the reward assigned may be dependent on the policies executed by other robotic devices. Over time, the policies of all robotic devices may converge such that the policy executed by each robotic device maximizes the overall reward. Nash's existence theorem demonstrates that because there is a finite number of robotic devices, and each robotic device can choose from a finite number of pure strategies, and strategies are mixed by definition, there will be at least one Nash equilibrium. In some embodiments, multiple robotic devices may compete to service uncovered areas, so the policy created incorporates values from the sessions of all participating robotic devices. In some cases, the robotic devices may be configured at setup to give them some basic information, such as how many robotic devices exist in the system. If there is no configuration, the system of robotic devices may converge and select the best possible solutions as explained above. As Nash's existence theorem explains, because there are a finite number of robotic devices and each robotic device can choose from a finite number of pure strategies, and strategies are mixed by definition, there will be at least one Nash equilibrium that is comprised in the converged policy.

In another example, control systems of robotic devices may collaborate to generate a map of the workspace. In some embodiments, two or more robots collaborate to generate a map of the workspace. In some embodiments, sensors measure the distance to objects (or to collect data from which distance to objects may be inferred) within the workspace within their respective fields of view. A control system of each robot shares their respective distance measurements with the control system of all or a select group of other robots operating within the same workspace. In some embodiments, other or additional sensor data is shared among the control systems of the robots (e.g., odometry data, obstacle data, debris data, floor type data, localization data, status, tasks completed, upcoming tasks, movement path, weather data, etc.). In some embodiments, the control system of each robot adjusts the distance data received from a remote source based on the location of the remote source with respect to the location of the robot receiving the distance data. To form a larger field of view, the control system of each robot stores at least a portion of local and remote (i.e., from other robots) measurements and uses them to create a larger field of view of the map by combining overlapping measurements taken within separate fields of view, using overlapping readings as attachment points. The method of sharing and combining local and remote readings taken by sensing devices mounted on various robots operating within the same workspace is repeated, such that control systems may construct an extended map of the workspace by combining readings collected locally and remotely by multiple sensing devices positioned at different locations throughout the workspace, allowing each robot to see beyond the surroundings it has discovered itself. In some embodiments, control systems construct the map in a horizontal and/or vertical direction as measurements are combined. The direction in which the map expands depends on the field of view of the sensing devices by which the measurements to be combined were taken. In some embodiments, the map of the workspace is constructed using data collected locally and/or remotely from at least one sensing device. In some embodiments, the at least one sensing device is of the same type or of different types. In some embodiments, the data is collected over a period of time. In some embodiments, control systems of fixed sensing devices monitoring the workspace (e.g., closed circuit television camera) and sensory devices that have previously operated within the same workspace (e.g., data collected by sensors of a dump truck that previously worked within the workspace six months ago) may also share their sensor readings. In some embodiments, a control system of one or more robots share data from a previously constructed map of the workspace. In some embodiments, the control system of one robot constructs the map of the workspace from local and/or remote data and shares the constructed map with control systems of other robots.

In some embodiments, the control system identify overlap between readings captured in separate fields of view using similar methods as described above. In some embodiments, the control system considers multiple variations of combinations when checking for overlap, each combination having different overlap, in order to filter through the data (local and/or remote), determine if and where there is overlap, and if so, the combination which results in measurements with the highest confidence level. In some embodiments, the confidence level of the measurements from a local source have higher confidence level than readings received from remote sources or vice versa. In some embodiments, the control system assigns readings from different sources different confidence levels. In some embodiments, the control system implements a combination which results in measurements with higher confidence level into the map, otherwise the control system stores the (local or remote) data for future combinations. For example, if the control system of a robot receives a set of readings from a remote source which has a number of consecutive readings with values similar to the same number of consecutive readings within its own map, the control system combines the readings and if their combination results in readings with a higher confidence level the control system implements the combination into the map. If a third set of readings happen to overlap with the two sets of readings as well, the control system considers multiple variations of combinations between the three sets of data, and if the control system finds a combination which results in readings with higher confidence level than what is currently in the map, the control system implements the combination into the map. In some embodiments, the control system determines a probability of overlap between the two or more sets of data for multiple versions of combination between the two or more sets of data, each combination having a different area of overlap between the sets of data and uses the overlap with highest probability of overlap for stitching the two or more sets of data together. In some embodiments, two or more sets of data having a probability of overlap below a specified threshold are not combined. In some embodiments, the control system replaces local measurements with low confidence level or noise with measurements observed remotely with higher confidence level and vice versa. For example, a control system replaces measurements of an area obstructed by a moving object by measurements from a fixed monitoring device, such as a CCTV camera, observing the same area as that captured in the obstructed frame. In some embodiments, the control system associates confidence level with resolution of a sensor, rate of capturing data, speed of transfer, time stamp, time-to-live, the number of hops of the information, etc.

In some cases, robots exchange wireless signals to connect and authenticate one another. Robotic devices may maintain a database of authenticated robotic devices in their network. Within a network, information regarding the environment gathered from sensors or tools on different robotic devices may be shared with other network members. Instructions or information may be pushed or pulled from one robotic device to another to more efficiently execute the tasks assigned to a group of robotic devices. In embodiments, robotic devices may be actuated or non-actuated. In some embodiments, signals sent between robotic devices may include either environmental or operational data. Environmental data may include data gathered by sensors positioned on a robotic device regarding the environment, such as the location of obstacles, the type of surface in the workspace, the location of a charging station, or any other information regarding the surroundings. Operational data may include data related to the activity or functions of a robotic device, such as instructions, the status of various functions of a robotic device, the current task of a robotic device, the completed tasks of a robotic device, next tasks of a robotic device, etc. In some embodiments, robotic devices may be assigned rankings during an initial set-up phase that dictate what signals may be distributed to and from certain robotic devices. Some robotic devices may be assigned a ranking that disallows them from assigning instructions to other robotic devices. Some robotic devices may be assigned rankings that permit them to delegate tasks to other robotic devices. Rankings may also be used to resolve conflicts between robotic devices carrying out conflicting tasks. In some embodiments, pairs of robotic devices may be assigned master and slave roles and work together to complete a task. A master robotic device may provide instructions to a slave robotic device, the slave robotic device being configured to accept and execute instructions provided by a master robotic device.

In some embodiments, control systems of robots employ collaborative intelligence and artificial intelligence. In some embodiments, collaborative intelligence includes robots learning from one another and artificial intelligence includes the control system of a robot learning from the environment (e.g., user feedback). For instance, a control system of a home control unit capable of learning preferences of a user (e.g. home temperature, music genre, cleaning schedule, alarm setting, etc.) based on their actions over time may be an example of artificial intelligence. Based on the preferences of the user learned over time, the control system of the home control unit may therefore, play a specific genre of music or set the shower to a specific temperature. If a second home control unit was introduced into the home, the control system of the first home control unit may share its intelligence with the control system of the second home control unit such that the control system of the second home control unit may learn the preferences of the user from the control system of the first home control unit, which may be considered collaborative intelligence. In some embodiments, the control system of each robot operating within the environment may learn from the environment (e.g., user feedback) and in some embodiments, may share their learned intelligence with the control systems of other robots to complete tasks more efficiently. For example, the control system of the second home control unit may learn from the control system of the first home control unit that the user prefers playing jazz music in the evening while the control system of the first home control unit may learn from the control system of the second home control unit what time the user prefers to wake up. In some embodiments, the control systems of robots may autonomously split tasks. For example, the control system of one home control unit may control home temperature while the control system of the other home control unit may control lighting in the home. In another example, a control system of a first surface cleaning robot shares its intelligence (e.g., user preferences learned, a map of the environment, the location of obstacles, etc.) with a control system of a second surface cleaning robot and vice versa. In particular, the control system of the first surface cleaning robot may share with the control system of the second surface cleaning robot that the user likes the house cleaned at 8:00 AM. In one example, the control system of a first robot learns that user A prefers a home temperature of 75° F. while the control system of a second robot learns that a user B prefers the home temperate at 73° F. The control systems of the robots may autonomously share intelligence and collaborate and may infer based on shared intelligence that a home temperature of 74° F. is best when both users are present and to set the temperature to the preferred temperature of each individual user when they are only present. In other instances, a control system of a robot may receive one or more settings from a user. For example, control systems of two cleaning robots introduced into a same environment and with separate user preferences stored may share their respective stored user preferences with one another however a user may choose the new preferences if preferences chosen by the collaborating robots are not desired. The control systems of the robots may then learn the new user preferences for the future.

In some embodiments, the control system of a robot may make inferences from shared intelligence. For instance, a control system of a robotic coffee machine may learn that a user typically gets home from a jog every morning at 5:00 AM and to therefore brew a cup of the coffee preferred by the user at 5:00 AM. If one day at 4:45 AM the control system of a collaborating robotic vacuum cleaner detects the front door opening, it may share this data with the control system of the robotic coffee machine and the control system of the robotic coffee machine may infer that the user is home early from their jog and may therefor brew a cup of coffee earlier than usual. In another example, the control system of a robotic tooth brush may collaborate with the control system of a robotic coffee maker, such that operation of the robotic tooth brush in the morning may be shared with the control system of the robotic coffee maker. The robotic coffee maker may therefore infer the user is awake and brew a cup of the preferred coffee of the user before the user reaches the kitchen. If there are two users within the home, the control system of the robotic coffee machine may infer the user based on probabilities and statistics of information in order to maximize comfort without wasting energy. For instance, if the control system of the robotic coffee machine infers both users are awake it may brew a medium roast in order to appease both users if one prefers light roast and the other dark roast. In some embodiments, control systems of robots may share data of multiple users in order to learn to make decisions benefiting all present users. For example, if two users prefer a robot to clean at 8:00 AM but one prefers mopping while the other prefers sweeping, the control system of the robot may decide to clean at 8:00 AM using both cleaning functionalities to benefit both users. In another example, an AI system that suggests movies based on learned movie preferences of a user may compile movie preferences of all present users in order to suggest movies that all users may enjoy.

In some embodiments, the control system of a robot may provide suggestions to a user based on learned preferences of the user. For example, a control system of a robot may combine music preferences of a large group of individuals attending an event and suggest songs to play. In another example, control systems of housekeeping robots working at separate locations of a hotel chain may learn room preferences of an individual that often travels for work and stays within the same hotel chain and may prepare the room for the individual based on statistical information and probabilities from shared data collected by sensors of the housekeeping robots or may provide suggestions to the user. For instance, the control system of a robot may decide to turn on a warm shower for the user at 6:15 AM based on previous intelligence on the time the user woke up and the temperature of the shower the user used. Or the control system of the robot may provide the user with a suggestion to set the alarm for 6:15 AM based on previous intelligence on the time the user woke up. In some embodiments, robots may learn from each other or share information in real time during operation and/or while offline and/or while some robots are offline and others are online.

In some embodiments, the relationship between collaborating robots may be assigned a loyalty index by the control systems of the robots, the value of which indicates the strength of the relationship. In some embodiments, the loyalty index may be increased or decreased by the control systems of the robots depending on the number of times the robots have authenticated one another, the outcomes of their interactions, the length of their relationship, and other factors. For example, if a first robot commands a second robot to vacuum a hallway and the second robot fails to or does a poor job of vacuuming the hallway the processor of the first robot may consider the second robot unreliable and therefore lower its loyalty index. Alternatively, if the second robot succeeds at cleaning the hallway the processor of the first robot may increase its loyalty index. In some embodiments, the value of the loyalty index may determine the type of interaction permitted between the robots. In some embodiments, processors of robots use loyalty index thresholds to determine the type of interactions permitted with other collaborating robots. For example, a low loyalty index between robots may permit authentication and the exchange of information while a high loyalty index may additionally permit robots to collaborate to complete a task together or permit one robot to command the other. For example, a commanding robotic device may command a laboring robotic vacuum to clean a room or complete a task. As another example, multiple robotic vacuums may complete a work task together in order to complete the task in a more quick and efficient manner. The level of loyalty previously achieved between robotic devices may determine how they interact with one other. Over time, as robotic devices interact with one other, robotic devices may learn to rely on one other. For example, a user may verbally instruct a voice activated robotic device to instruct the robotic vacuum to clean the rug in the living room. The voice activated robotic device may search for a robotic vacuum. The voice activated robotic device may connect with the robotic vacuum and the two robotic devices may share their information and authenticate one other. The voice activated robotic device may then instruct the robotic vacuum to clean the rug in the living room. Over time, as the two robots continue to interact, the voice activated robotic device may learn that the robotic vacuum performs cleaning functions. Thus, after repeated interactions, if a user provides a less specific command, such as, clean the kitchen floor, the voice activated robotic device may know it can rely on the robotic vacuum to conduct such action even though the user did not specify which robotic device they wished to clean the kitchen floor. In some embodiments, robotic devices do not need to be previously acquainted with each other, previously paired, or introduced by a user in order to interact with each other for a first time. So long as the robotic devices are able to connect, interact, and share information with each other, this will suffice. Robotic devices may have the ability to scan the environment to search for other robotic devices in the area, including newly introduced robotic devices, with whom a first acquaintance has not occurred. Further, the robotic devices do not need to have similar functions, the functionalities of different robotic devices may be completely separate and distinct from one other. When robotic devices interact with one other, they may store the information regarding the abilities of the other robotic devices in order to understand how to interact with other robotic devices in the future. In some embodiments, wherein a robot interacts with multiple other robots, the robot with whom the highest loyalty index is established is considered to have the highest level of trust. For example, if a robot interacts with two other robots having conflicting commands, the robot with whom the higher loyalty index is established is trusted by the processor of the robot. In some embodiments, the loyalty index may act a security measure against intruding robots as interactions between robots are limited until different levels of loyalty index thresholds are achieved.

Figure 21:
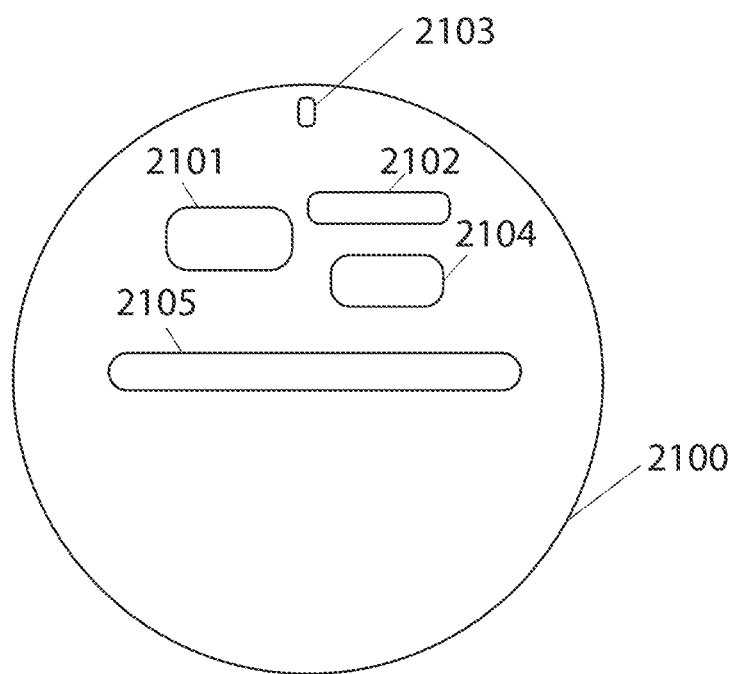
FIG. 21 is a schematic diagram of an example of a robot with which the present techniques may be implemented.

FIG. 21 depicts an example of a robotic device 2100 with control system (such as a processor) 2101, memory 2102, sensor 2103, actuator 2104, and cleaning tool 2105. In some embodiments, the robot may include the features of a robot described herein. In some embodiments, program code stored in the memory 2102 and executed by the control system 2101 may effectuate the operations described herein. The robot may also include other components and features not shown, such as additional sensors and processors, cameras, odometers, etc.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpindicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct.

What is claimed is:

1. A system for robotic coverage of a workspace, comprising:

a robot, comprising:

an actuator configured to move the robot in the workspace;
at least one sensor configured to sense the workspace;
a processor configured to at least obtain data from the at least one sensor and control the actuator; and
memory communicatively coupled with the processor and storing instructions that when executed by the processor effectuates operations comprising:
capturing, with the at least one sensor, first data indicative of a position of the robot relative to objects within the workspace and second data indicative of movement of the robot;
generating or updating, with the processor, a map of the workspace based on at least one of: at least a part of the first data and at least a part of the second data, comprising:
obtaining, with the processor, a first part of the first data captured in a first field of view and a second part of the first data captured in a second field of view, wherein the first part and the second part of the first data are captured from different positions;
determining, with the processor, an overlapping area of the first field of view and the second field of view by comparing the first part of the first data captured in the first field of view to the second part of the first data captured in the second field of view;
spatially aligning, with the processor, the first part and the second part of the first data based on the overlapping area; and
generating, with the processor, the map of the workspace based on the spatially aligned first part and second part of the first data;
segmenting, with the processor, the map into a plurality of zones;
transmitting, with the processor, the map to an application of a communication device;
receiving, with the processor, an updated map of the workspace from the application of the communication device;
generating, with the processor, a movement path based on the map or the updated map; and
actuating, with the processor, the robot to traverse the movement path; and
the application of the communication device, configured to:
receive the map from the processor of the robot;
display the map;
receive at least one input for the map designating at least one of: a new, modification, or deletion of a boundary; a new, modification, or deletion of a zone; a new, modification, or deletion of a no-entry zone; a new, modification, or deletion of a zone name; a new, modification, or deletion of an object; a new, modification, or deletion of a floor type; and a new, modification, or deletion of a debris accumulation level;
implement the at least one input into the map to generate the updated map; and
transmit the updated map to the processor of the robot.

2. The system of claim 1,
wherein the operations further comprise:
recording, with the processor, locations of the workspace covered by the robot while traversing the movement path based on at least a part of the data; and
transmitting, with the processor, the locations of the workspace covered by the robot to the application of the communication device; and
wherein the application of the communication device is further configured to:
receive the locations of the workspace covered by the robot from the processor of the robot; and
display a surface coverage map of the workspace, wherein the surface coverage map indicates locations of the workspace covered by the robot.

3. The system of claim 2, wherein the transmitted locations of the workspace covered by the robot comprise the surface coverage map of the workspace.

4. The system of claim 2,
wherein the transmitted locations of the workspace covered by the robot comprise a data set or a coverage matrix, wherein each entry of the data set or the coverage matrix corresponds to a location of the workspace and wherein the value of each entry is indicative of coverage of the corresponding location, and
wherein the application of the communication device is further configured to:
generate the surface coverage map based on at least the data set or the coverage matrix.

5. The system of claim 1, wherein the operations further comprise:
actuating, with the processor, at least one cleaning tool while the robot traverses the movement path.

6. The system of claim 5, wherein the processor of the robot generates or updates the map while the robot traverses the movement path.

7. The system of claim 1, wherein the operations further comprise:
recording, with the processor, locations of the workspace covered by the robot based on at least one of: a part of the first data and a part of the second data; and
determining, with the processor, at least one of: the segmentation of the workspace into the plurality of zones, a sequence of coverage of the plurality of zones, and the movement path covering each zone.

8. The system of claim 7, wherein determining the at least one of: the segmentation of the workspace into the plurality of zones, a sequence of coverage of the plurality of zones, and the movement path covering each zone is based on at least one of: the locations of the workspace covered by the robot, a travel distance between consecutively covered zones, duplicate coverage of locations of the workspace, a coverage time of the workspace, starting or ending locations of a movement path covering each zone, and a current location of the robot.

9. The system of claim 1, wherein segmenting the workspace into the plurality of zones comprises:
identifying, with the processor, a doorway within the workspace based on at least part of the data; and
creating, with the processor, a boundary at a location of the doorway between a first zone and a second zone among the plurality of zones.

10. The system of claim 9, wherein detecting the doorway within the workspace comprises:
fitting, with the processor, a line model to the at least part of the first data;
detecting, with the processor, a deviation of a portion of the at least part of the first data from the line model; and
identifying, with the processor, the doorway at locations of the workspace corresponding with the portion of the at least part of the first data.

11. The system of claim 9, wherein detecting the doorway within the workspace comprises:
  determining, with the processor, entropy of the at least part of the first data;
  detecting, with the processor, high entropy values for a portion of the at least part of the first data; and
  identifying, with the processor, the doorway at locations of the workspace corresponding with the portion of the at least part of the first data.

12. The system of claim 1, wherein the operations further comprise:
  receiving, with the processor, at least one of: an instruction to execute a task in a zone or in the workspace on a specified day and time and an instruction to execute a task in a zone or in the workspace following receipt of the instruction from the application of the communication device; and
  actuating, with the processor, the robot to execute the at least one instruction received; and
  wherein the application of the communication device is further configured to:
    display at least one of: a status of the robot and a battery level of the robot;
    receive an input designating at least one of: a schedule to execute a task by the robot and a zone within which a task is to be executed by the robot; and
    transmit at least one of: an instruction to execute a task in a zone or in the workspace on a day and a time and an instruction to execute a task in a zone or in the workspace immediately to the processor of the robot.

13. The system of claim 12, wherein the input designating the schedule comprises at least one of: a task, a day and a time, a frequency, a zone within which the task is to be executed, and cleaning preferences.

14. The system of claim 13, wherein the cleaning preferences comprise at least one of: a cleaning intensity comprising at least a deep cleaning and a light cleaning, an impeller speed or a suctioning power, a brush speed, a number of passes of an area, an amount of time to clean an area, a cleaning tool, a movement path, and a driving speed.

15. The system of claim 1, wherein the robot completes coverage in a first zone before beginning coverage in a second zone.

16. The system of claim 1, wherein the operations further comprise:
  detecting, with the processor, an object based on at least part of the first data;
  determining, with the processor, an object type of the object; and
  actuating, with the processor, the robot to execute an object-specific behavior based on the object type.

17. The system of claim 16, wherein the object-specific behavior comprises at least one of: updating a movement path, driving over the obstacle, and driving around the obstacle and resuming a movement path.

18. The system of claim 1, further comprising:
  a voice activated robotic device, comprising:
    at least one sensor;
    a processor; and
    memory communicatively coupled with the processor and storing instructions that when executed by the processor effectuates operations comprising:
      receiving, with the processor, a verbal instruction from a user comprising at least one of: an instruction to execute a task in a zone or in the workspace on a specified day and time and an instruction to execute a task in a zone or in the workspace after receipt of the instruction; and
      transmitting, with the processor, the verbal instruction to the processor of the robot; and
  wherein the operations of the robot further comprise:
    receiving, with the processor, the verbal instruction; and
    actuating, with the processor, the robot to execute the verbal instruction.

19. A method for robotic coverage of a workspace, comprising:
  capturing, with at least one sensor of a robot, first data indicative of a position of the robot relative to objects within the workspace and second data indicative of movement of the robot;
  generating or updating, with a processor of the robot, a map of the workspace based on at least one of: at least a part of the first data and at least a part of the second data;
  segmenting, with the processor of the robot, the map into a plurality of zones;
  transmitting, with the processor of the robot, the map to an application of a communication device;
  receiving, with the application, the map;
  displaying, with the application, the map;
  receiving, with the application, at least one input for the map designating at least one of: a new, modification, or deletion of a boundary; a new, modification, or deletion of a zone; a new, modification, or deletion of a no-entry zone; a new, modification, or deletion of a zone name;
  implementing, with the application, the at least one input into the map to generate an updated map of the workspace;
  transmitting, with the application, the updated map to the processor of the robot;
  receiving, with the processor of the robot, the updated map;
  generating, with the processor of the robot, a movement path based on the map or the updated map; and
  actuating, with the processor of the robot, the robot to traverse the movement path;
  detecting, with the processor of the robot, an object based on at least part of the first data;
  determining, with the processor, an object type of the object; and
  actuating, with the processor of the robot, the robot to execute an object-specific behavior based on the object type, wherein the object-specific behavior comprises at least one of:
    updating a movement path,
    driving over the obstacle, and
    driving around the obstacle and resuming a movement path,
  wherein generating or updating the map of the workspace further comprises:
    obtaining, with the processor of the robot, a first part of the first data captured in a first field of view and a second part of the first data captured in a second field of view, wherein the first part and the second part of the first data are captured from different positions;
    determining, with the processor of the robot, an overlapping area of the first field of view and the second field of view by comparing the first part of the first data captured in the first field of view to the second part of the first data captured in the second field of view;

spatially aligning, with the processor of the robot, the first part and the second part of the first data based on the overlapping area; and generating, with the processor of the robot, the map of the workspace based on the spatially aligned first part and second part of the first data.

* * * * *